United States Patent

[11] 3,575,085

[72] Inventor William E. McAdam, Jr.
 Thousand Oaks, Calif.
[21] Appl. No. 754,344
[22] Filed Aug. 21, 1968
[45] Patented Apr. 13, 1971
[73] Assignee Hughes Aircraft Company
 Culver City, Calif.

[54] ADVANCED FIRE CONTROL SYSTEM
 36 Claims, 40 Drawing Figs.
[52] U.S. Cl. .................................................. 89/41R,
 89/41E, 235/61.5DF
[51] Int. Cl. ...................................................... F41f 3/08,
 F41f 3/12, F41f 3/00
[50] Field of Search .......................................... 89/41.6,
 41.7; 244/3.16; 235/61.5

[56] References Cited
UNITED STATES PATENTS
3,339,457  9/1967  Pun .............................. 89/41;41.7UX Primary Examiner—Samuel Feinberg
Assistant Examiner—Thomas H. Webb
Attorneys—James K. Haskell and Walter J. Adam ABSTRACT: A fire control system for vehicle or tank control that provides a high first hit probability. The system is highly stable because of a sampling concept and is highly accurate because of the handling of nonstandard conditions. Reliable operation is provided for a moving tank or target, or both, and for noncoaltitude conditions.

Patented April 13, 1971

INVENTOR.
WILLIAM E. McADAM, JR.,
BY
Walter J. Adam
ATTORNEY

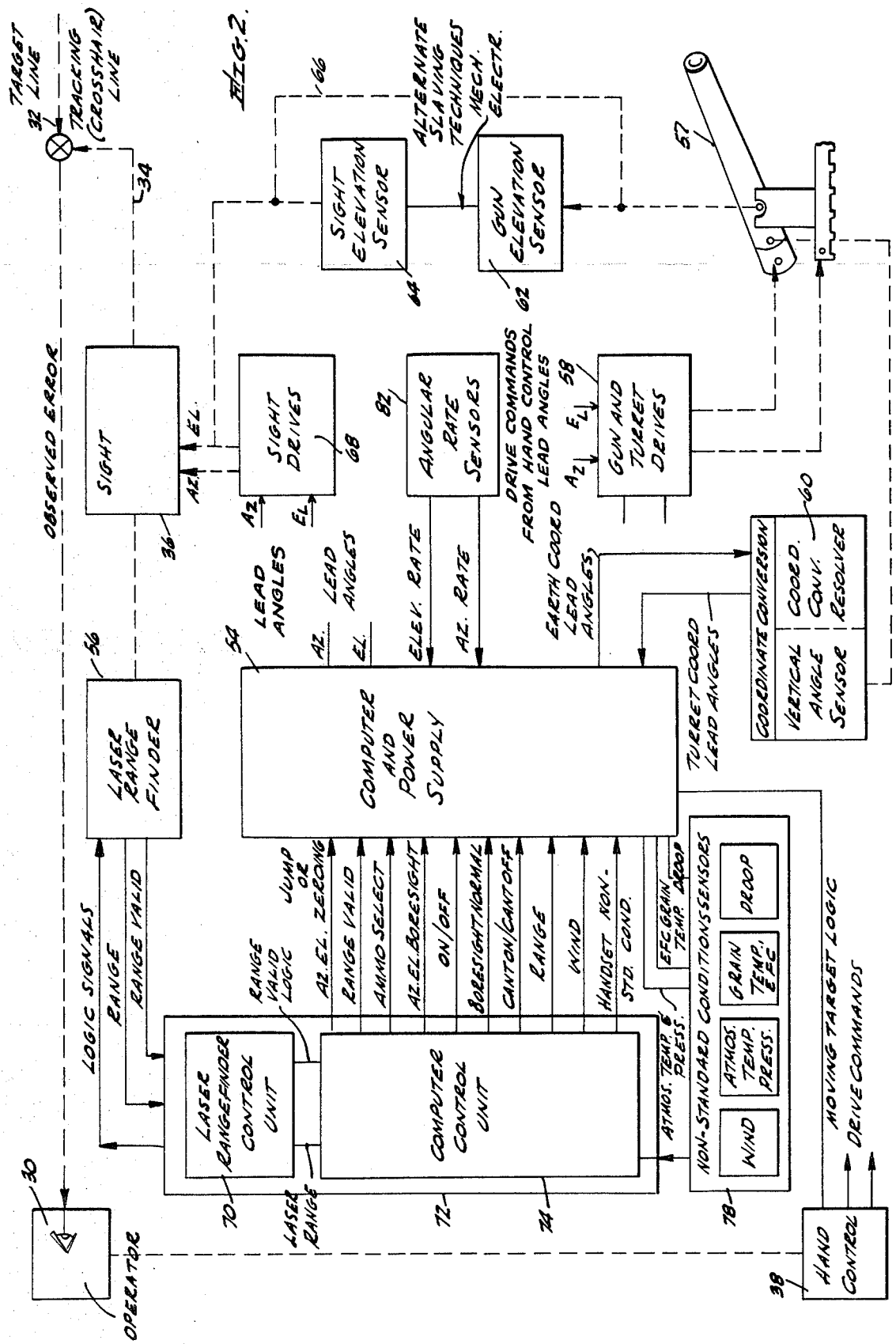

DISTURBED — NON-DISTURBED

DIRECTOR

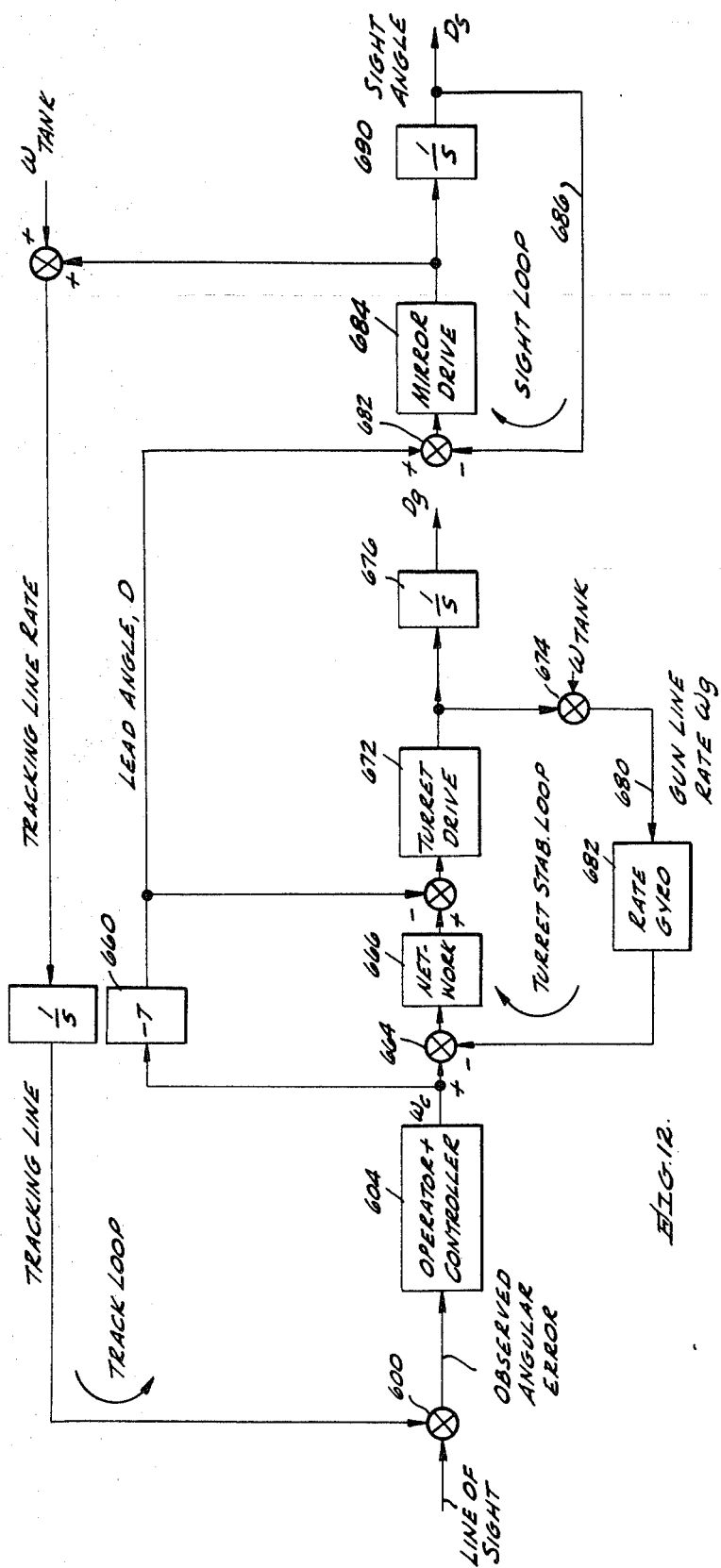

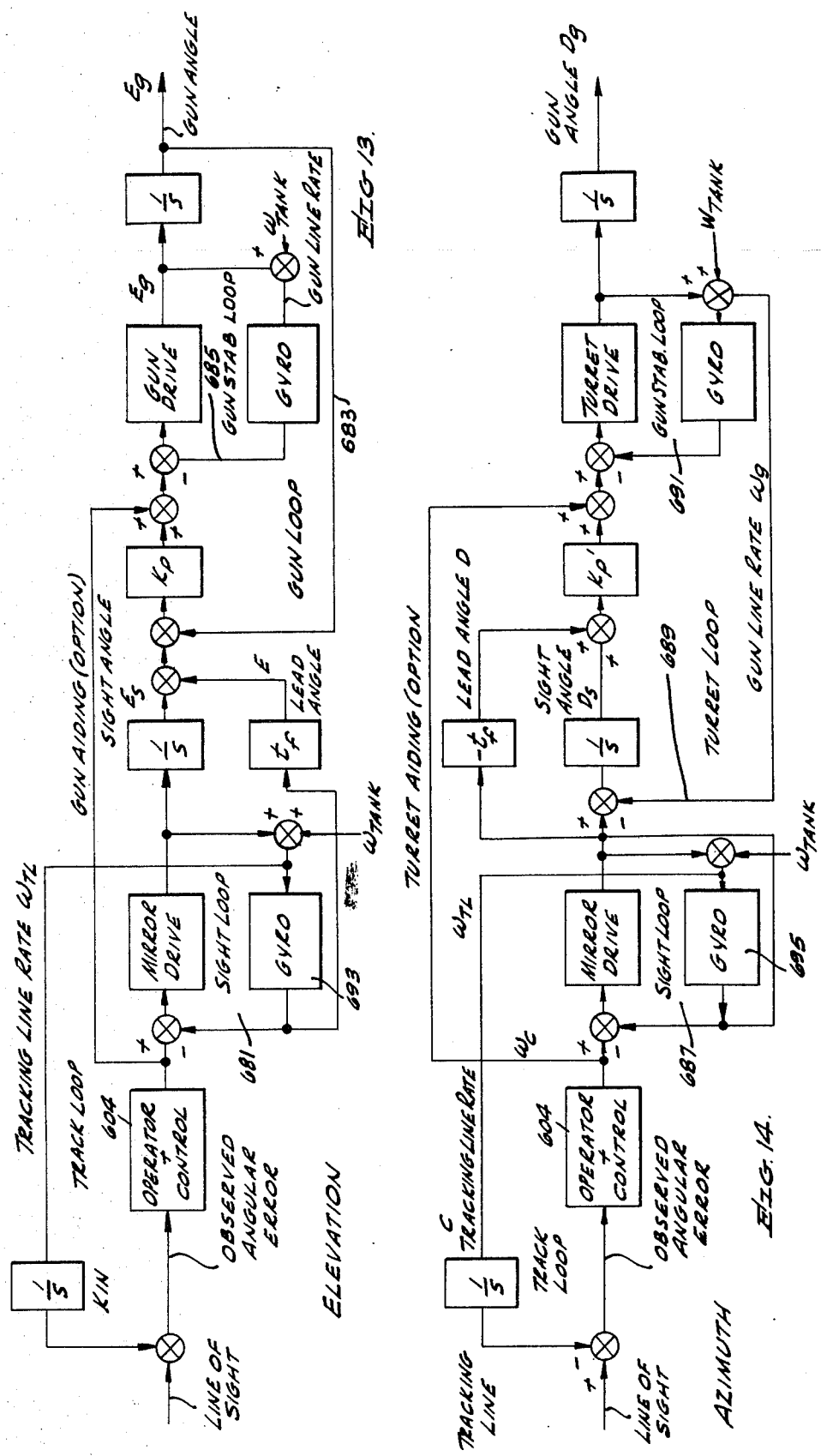

Patented April 13, 1971
3,575,085
31 Sheets-Sheet 21
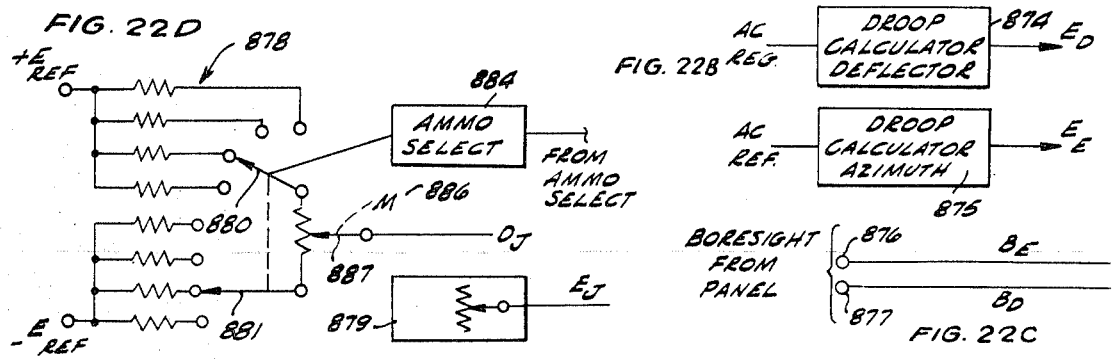
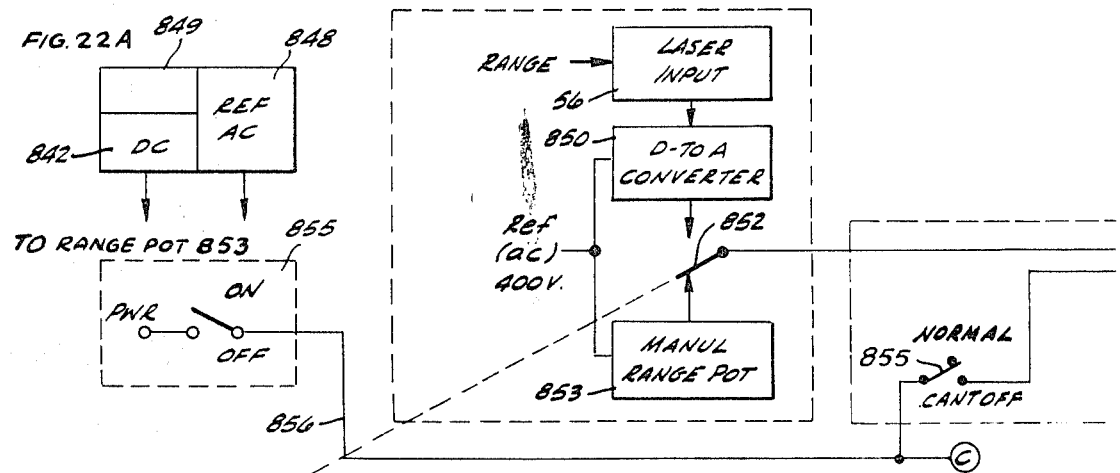
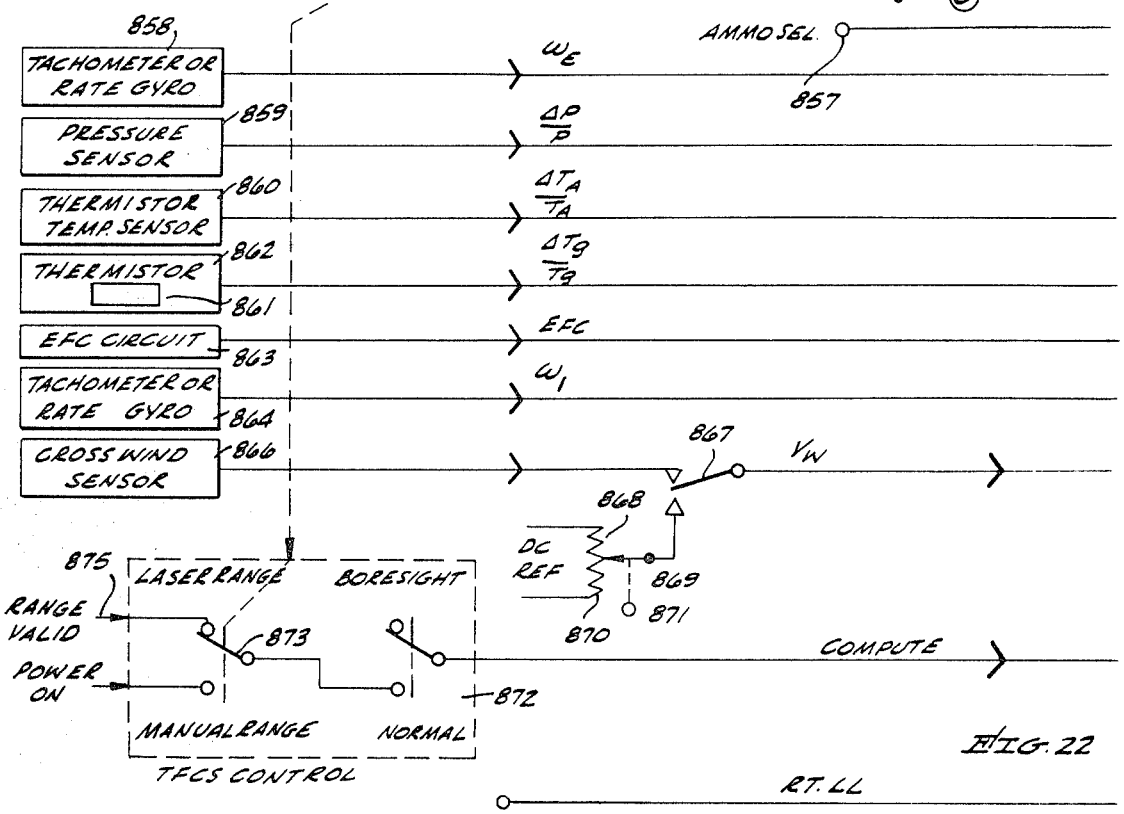

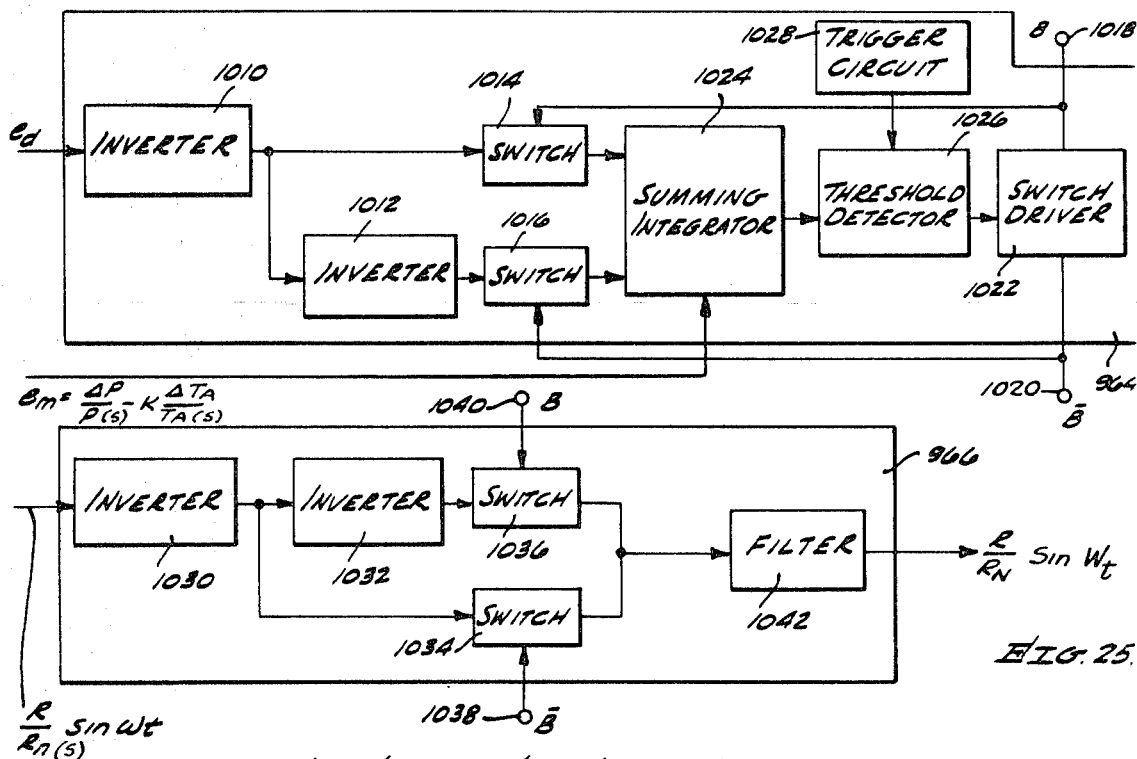
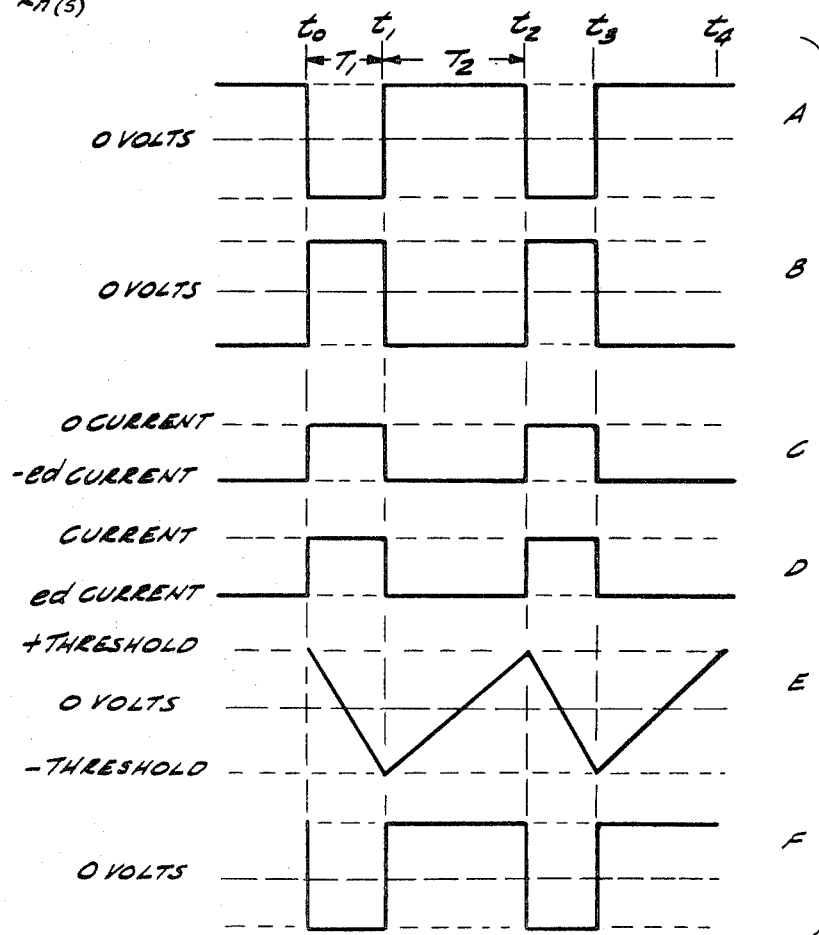
FIG. 25.
FIG. 26.

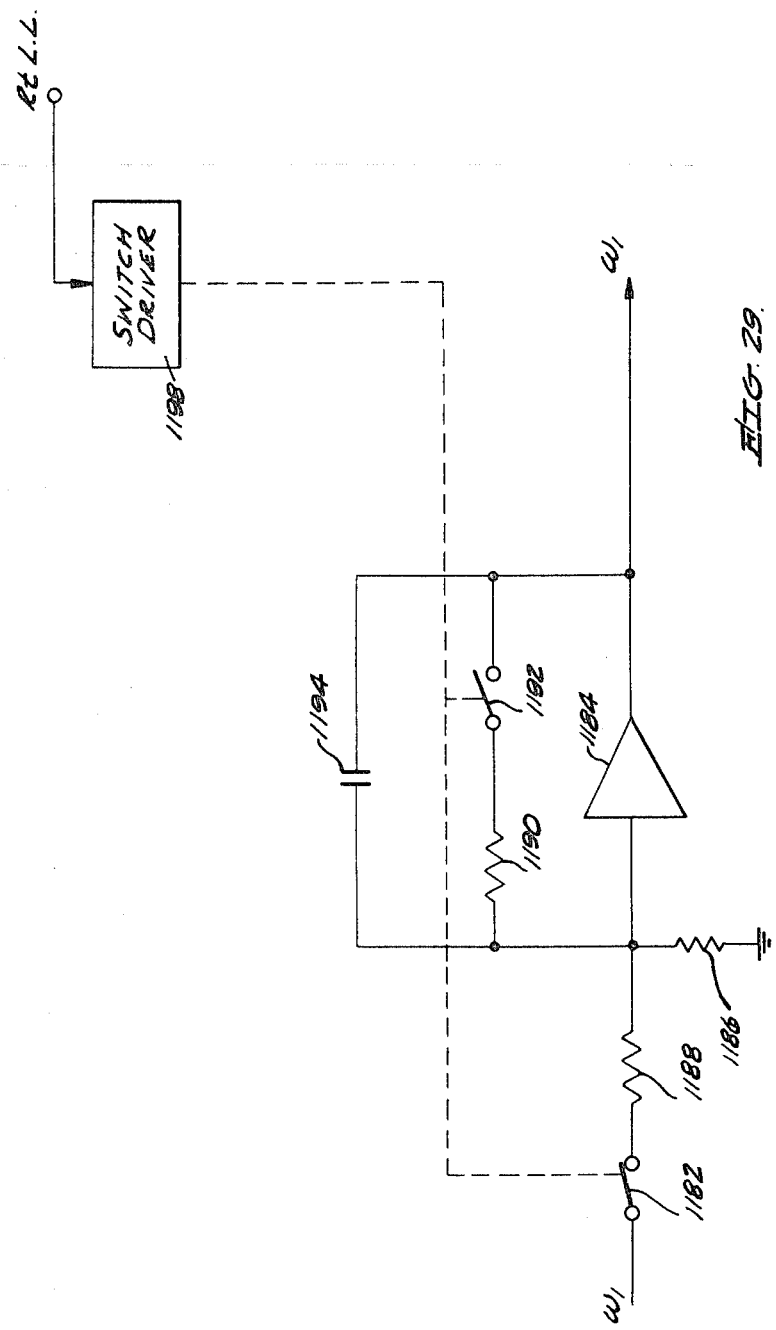

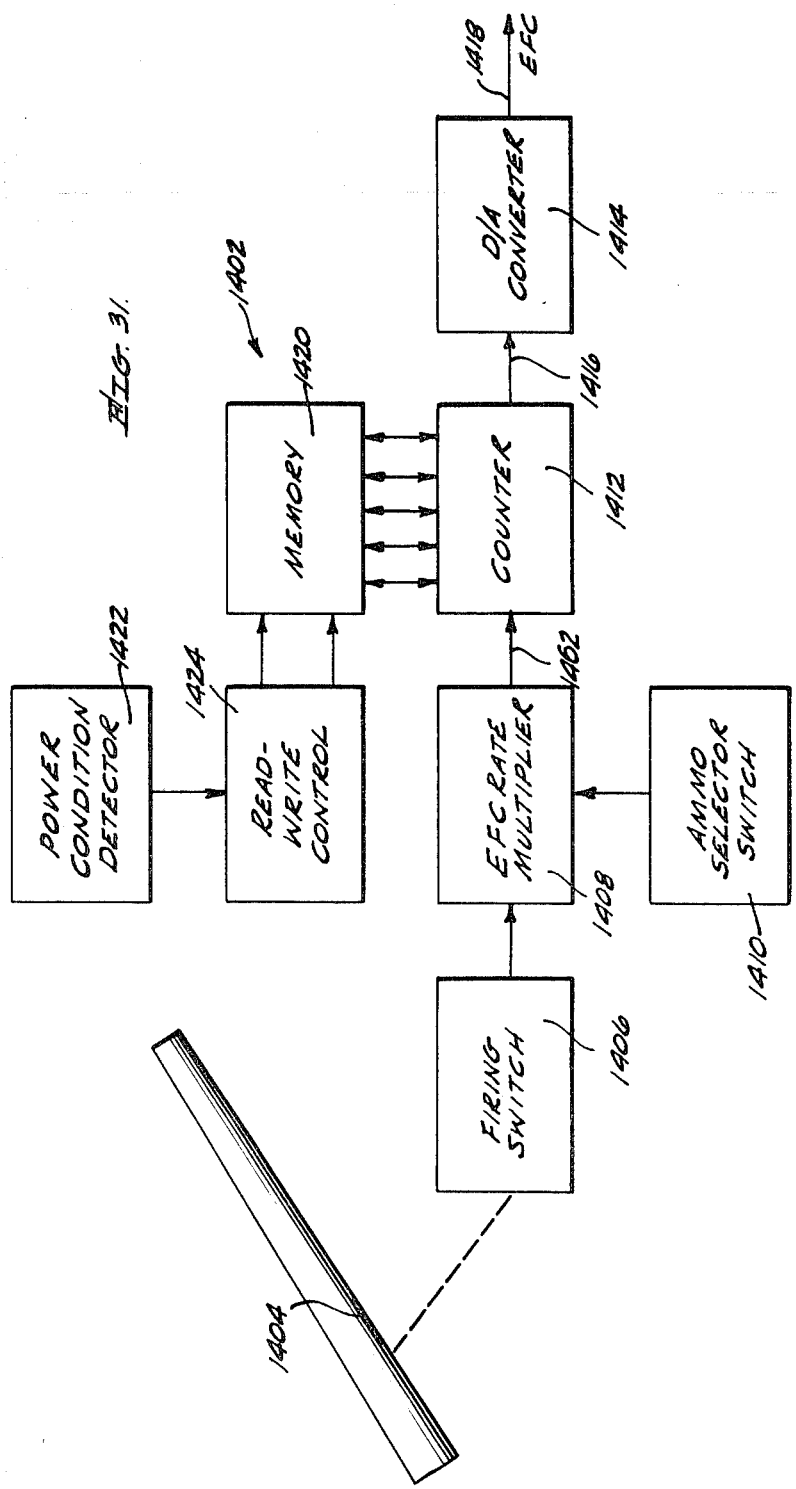

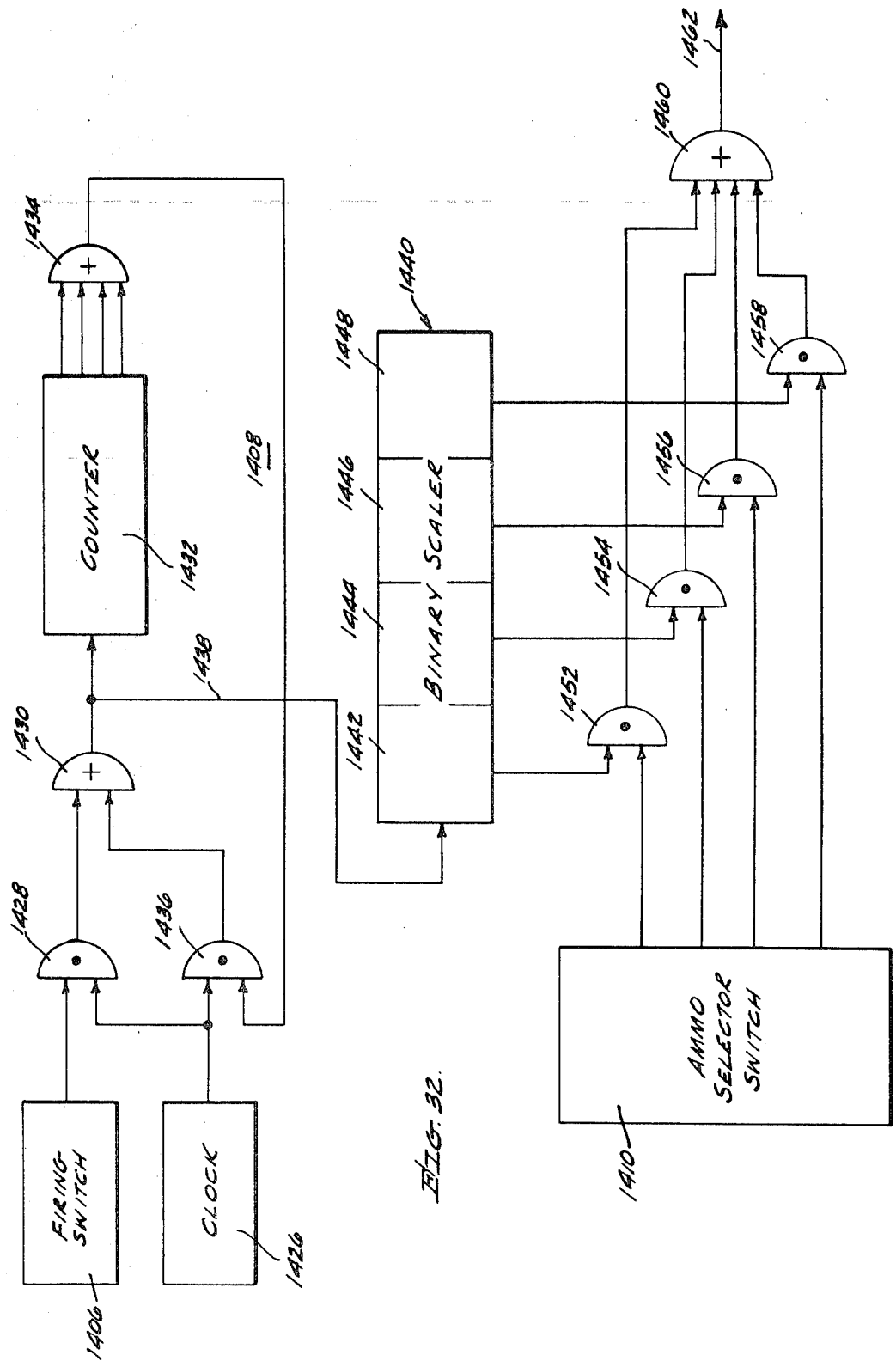

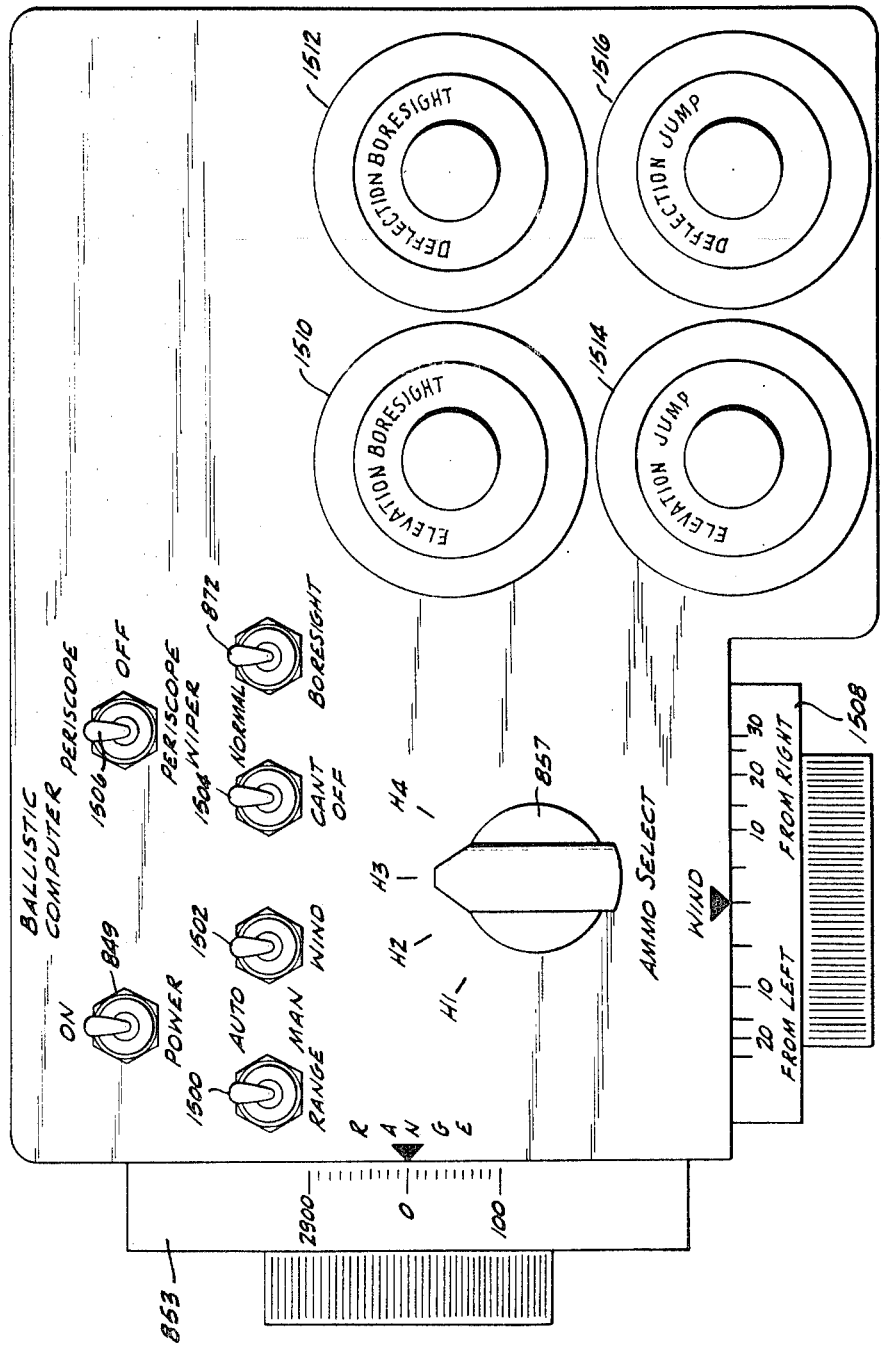

ADVANCED FIRE CONTROL SYSTEM

BACKGROUND OF THE INVENTION

This invention relates to fire control systems and particularly to a system that provides accurate gun and fire control such as from a moving or stationary vehicle or platform and that responds to a plurality of variable parameters.

Previous fire control systems such as in vehicles or tanks have a limited accuracy because of the many positions that the tank may assume, the continuously variable atmospheric conditions, the changes of the gun characteristics, the problems of range information and the movement of the tank and target. Also, the different ammunitions that may be utilized provide a wide range of ballistic performance. A system to control firing must also be highly reliable as well as simple to operate. Conventional systems utilize optical range finders to determine target range which has been a substantial contributor to inaccuracies because trajectory is a highly dependent function of range. Prior systems utilizing computers have been limited in accuracy and reliability because of the mechanical components required to perform the computations. Some systems utilize an electromechanical range followup servo and range function potentiometers which have been found to be relatively unreliable for field use. Conventional tank fire control systems have a limitation in that they are only applicable to a single set of sensed or calculated parameters. As systems are often expanded after construction, it would be desirable if the system philosophy provided a high degree of expandability or modularity. Another requirement of tank fire control systems that has not previously been met satisfactorily is rapid firing and high first-round hit capability from a stationary or moving tank firing against stationary or moving ground targets.

It is therefore an object of this invention to provide a fire control system having a high degree of accuracy and reliability.

It is another object of this invention to provide a highly repeatable and stable fire control system.

It is another object of this invention to provide improved fire control system that is readily expandable to handle different parameters or for increased accuracy.

It is another object of this invention to provide a vehicle fire control system that operates accurately and reliably with different types of ammunition or projectiles.

It is another object of this invention to provide a tank fire control system that provides hardware simplicity while still providing a high degree of accuracy and reliability.

It is another object of this invention to provide an improved vehicle fire control system utilizing a highly accurate range determination and a solid-state computer to develop improved operation.

Another object of this invention is to provide an improved tank fire control system that will operate when the vehicle and target have a common altitude condition or when the altitude of the target is substantially different than that of the vehicle.

It is another object of this invention to provide a fire control system operable from a stationary or moving platform or vehicle against a stationary target.

It is an object of this invention to provide an improved fire control system operable from a stationary or moving platform or vehicle against a moving target.

It is another object of this invention to provide a fire control system taking in consideration the operator's function so as to develop a high degree of system accuracy.

It is another object of this invention to provide a tank fire control system having a rapid reaction time for the entire system between target acquisition and firing.

It is another object of this invention to provide a tank fire control system having sufficient accuracy to insure a high first-round hit probability.

It is another object of this invention to provide a stable fire control system.

It is another object of this invention to provide an improved fire control system utilizing substantially accurate approximations for drift and wind velocity effects.

It is a further object of this invention to provide a tank fire control system responsive to both standard and nonstandard conditions.

DESCRIPTION OF THE DRAWINGS

The novel features of this invention, as well as the invention itself, both as to its organization and method of operation, will best be understood from the accompanying drawings, taken in connection with the accompanying description, in which like reference characters refer to like parts and in which:

FIG. 2 is a block diagram showing the fire control system in accordance with the principles of the invention in greater detail than shown in FIG. 1;

FIG. 12 is a schematic block diagram for explaining the nondisturbed system in the azimuth dimension;

FIG. 13 is a schematic functional diagram for explaining the director system in the elevation dimension;

FIG. 14 is a schematic functional diagram for explaining the director system in the azimuth dimension;

FIG. 22 is a schematic circuit and block diagram of the sensors and controls that may be utilized with the computer system in accordance with the invention;

FIG. 22A is a block diagram of a DC power source for use in the system of the invention;

FIG. 22B is a schematic block diagram of a droop calculator detecting unit in accordance with the invention;

FIG. 22C is a schematic circuit diagram of the manual boresighting arrangement in accordance with the invention;

FIG. 22D is a schematic block and circuit diagram showing a source of boresighting signals in accordance with the invention;

FIG. 25 is a block diagram of two embodiments of the master-slave multipliers in the computer of FIGS. 23A and 23B in which the master multiplier receives a DC input signal and the slave multiplier receives an AC input signal in one embodiment or in which the master multiplier receives an AC input signal and the slave multiplier receives a DC input signal;

FIG. 26 is a timing diagram of the waveforms of signals produced by the master-slave multipliers of FIG. 25;

FIG. 29 is a schematic block and circuit diagram of the follow and hold system in accordance with the invention;

FIG. 31 is a schematic block diagram of the effective full charge circuit in accordance with the invention;

FIG. 32 is a schematic block diagram for further explaining the effective full charge circuit of FIG. 30;

FIG. 33 is a schematic diagram of the gunner's control panel; and

SUMMARY OF THE INVENTION

Figure 1:
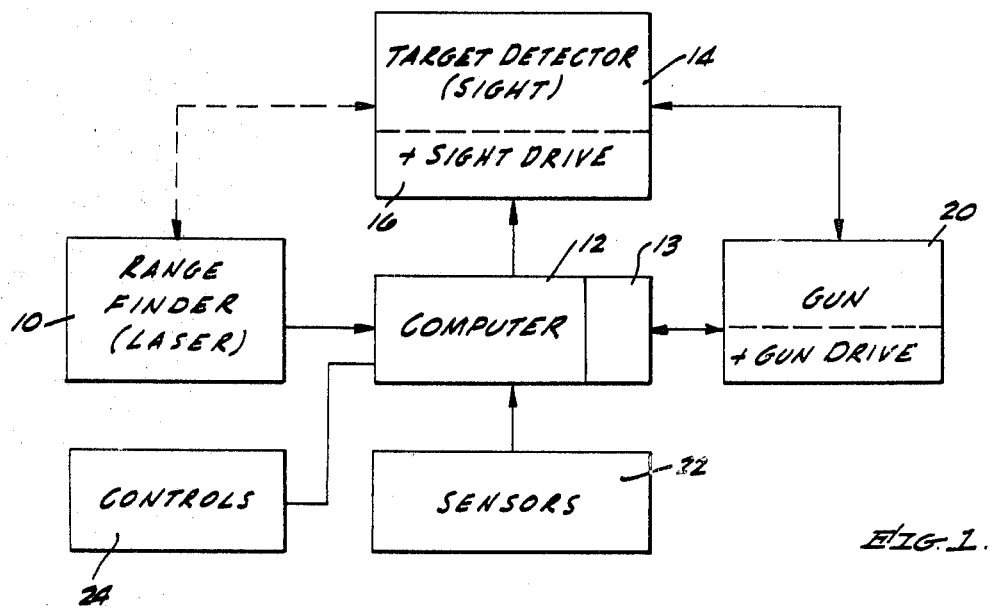
FIG. 1 is a block diagram showing the main elements of the fire control system in accordance with the invention.

Briefly, the fire control system in accordance with the principles of the invention operable on a stationary or moving platform such as from a stationary position or from a moving vehicle such as a tank, provides improved fire control with rapid reaction and a high hit probability. The system may include an integrated laser and sight system and a solid-state analog-type computer. The computer operates with improved multiple ammunition capability against moving and against noncoaltitude targets. The computer is arranged so that it provides general purpose operation and the system is arranged so that with minor modification different coordinate systems may be provided. The system provides an external loop in which the operator observes the error between a target line on a tracking or crosshair line and tries to minimize his error by commanding the sight or both the gun and the turret drive. The computer includes an internal loop which receives signals from sensors and other entry sources and provides a lead angle computation. The elevation and azimuth deflection signals are then developed after correction for both standard and nonstandard conditions and the sight drive provides a displacement of the reticle. For providing desired degrees of system operation, the principles of the invention provide disturbed and nondisturbed control and director-type control. The system includes a highly reliable storage-type element for establishing a highly stable operation. The laser ranger responds to the operator firing signal which, in turn, develops a highly accurate range signal.

In operation, the gunner or commander simply tracks the target with the sight in azimuth and elevation utilizing a hand control. When the target is centered in the field of view the laser is pointed at the target and target range is obtained by depressing the laser trigger control. In response to the target range and other parameters, the computer determines the precise superelevation and azimuth or deflection lead angles required for the selected type of ammunition in order to hit the target. After ranging on the target, the operator continues to track the target while the computed lead angles are introduced into the system and may fire whenever the target is centered in the crosshairs (a short period of time after ranging). Depending on the type of system mechanization, the computed lead angles are used to automatically drive the sight, or gun, or both, to the proper angular position with respect to each other. In a disturbed-type system mechanization in accordance with the invention, the computed lead angles drive the sight with respect to the gun. In a nondisturbed-type system mechanization also in accordance with the invention, the sight is again driven with respect to the gun, but in addition the signals corresponding to the lead angles are applied simultaneously and with opposite polarity to the gun and turret drives so that the effect is to maintain the sight crosshair centered on the target. In a director-type system in accordance with the invention, the computer controls the sight and the gun follows the sight.

DESCRIPTION OF THE PREFERRED EMBODIMENT

Referring now to FIG. 1, the fire control system of the invention includes a range finder 10 which may be a laser range finder or any type of range determining system having suitable accuracy and a computer 12 which may be a solid-state analog computer which in one arrangement in accordance with the invention, may be a computer that provides multiplication by time division so as to eliminate mechanical components. A target detector or fire control sight 14 including a sight drive 16 is provided in a loop which includes the operator for maintaining the target aligned with the sight. The system of the invention may utilize an integrated laser and sight to provide improved accuracy and simplicity. It is to be understood that the principles of the invention are not to be limited to integrated detectors and range finders but are operable to separately controlled arrangements. The target detector 14 and the gun 20 are linked one to another mechanically or electrically and are also displaced with respect to each other in response to the computer 12 which provides elevation and deflection error correction or lead angle signals. The computer 12 effectively calculates these lead angles by combining ballistic factors and converting them into the proper coordinate system in a coordinate conversion unit 13. The computer 12 responds to standard and nonstandard conditions sensed by sensors in sensor unit 22, some of the terms going to the computer proper and some going to the conversion unit 13. Other input signals or terms are provided by manual entries from a control unit 24 which may also include firing control and angular rate sampling in accordance with the invention. For example, the control unit 24 may contain range select, gun wear adjust, laser firing knobs and range readout. The computer 12 in accordance with the invention is adaptable to different guns, different ammunitions, and different degrees of accuracy with substantially few modifications. The arrangement of the computer, as will be explained subsequently, allows additional nonstandard conditions to be added as desired thus providing a highly flexible fire control system.

Referring now to FIG. 2 which shows a typical fire control system in accordance with the principles of the invention, an external loop is provided which includes an operator 30 observing a target line or line of sight LOS 32 which is summed in the operator's eye by the changing position of the tracking crosshair line 34 provided in a target detector or optical sight 36. To maintain the tracking line on the target line, the operator 30 controls a hand control unit 38 which may include a movable control that develops drive commands and also applies moving target logic to a computer and power supply unit 54. A gun 57 is controlled by a gun and turret drive unit 58 and applies information to a coordinate converter unit 60 which includes a vertical angle sensor and a coordinate converter resolver. A gun elevation sensor 62 is responsive to the gun 57 in the elevation dimension and sight elevation sensor 64 is responsive to a sight drive in the elevation dimension for electrical linkage or slaving of the gun and sight. A line 66 is also shown to represent an alternate mechanical means for linking the sight 36 and the gun 57. The sight 36 responds to a sight drive unit 68 applying both azimuth and elevation driving signals thereto and may provide an optical path for a laser range finder unit 56 which may be mechanically coupled to said sight 36. A laser range finder control unit 70 is included in a control unit 72 to apply laser range and range valid logic signals to a computer control unit 74. The laser range finder 56 receives logic or control signals from the control unit 70 and applies range and range valid signals to the control unit 74. A sensor unit 78, senses wind, atmospheric temperature and pressure, powder grain temperature, gun tube wear or equivalent full charge EFC, and droop as nonstandard conditions, with the wind condition being applied to the computer control unit 74 and the other conditions being applied to the computer of unit 54. An angular rate sensor unit 82 applies elevation rate and azimuth rate signals to the computer of unit 54. The computer control unit 74 applies azimuth and elevation jump or zeroing signals, range valid signals, ammo select signals, azimuth and elevation boresight signals, on/off signals, boresight/normal signals, cant on/cant off, range, wind, and hand set nonstandard condition signals to the computer and power supply of unit 54.

The drive commands from the hand control unit 38 are applied to the sight for a director system and to the gun and turret drive 58 for a disturbed or nondisturbed-type system. The azimuth and elevation lead angles from the computer of unit 54 are applied to the gun for a director-type system, to the sight for a disturbed-type system, and to both the sight and the gun for a nondisturbed-type system.

The angular rate sensors of the unit 82 are of the following types and are mounted on the sight or gun for the director-type system, disturbed- or nondisturbed-type system, or for a system utilizing a single gyro as will be explained in further detail subsequently:

98 to apply sight angle commands to the sight drive unit 68 which in turn, controls the crosshair line 34. In this type of system, a gyro unit 116 is coupled between the motors 106 and the summing unit 90 to provide a stable gun and turret drive unit. As an alternate source of rate information for the computer, a dotted line 120 is coupled between the output of the gyro unit 116 and the input of the lead angle computation unit 94.

Figure 4:
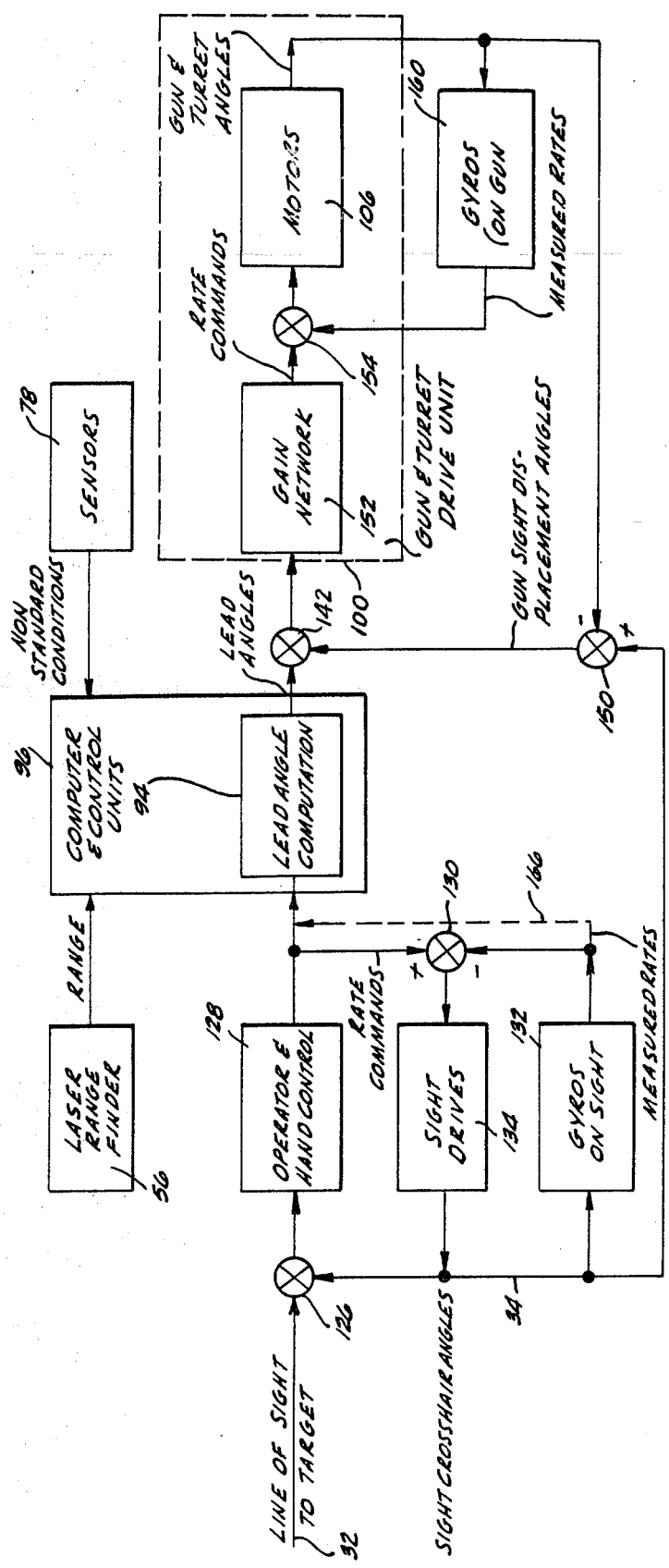
FIG. 4 is a block and circuit diagram showing a director-type fire control system in accordance with the invention.

Referring now to FIG. 4, which is a block diagram of a director system in accordance with the invention, a line of sight to target 32 and a crosshair sight line 34 are observed and reacted to by an operator in an operator and hand control unit 128 to maintain coincidence between the line of sight to the target and the sight crosshair reticle. In response to the operator's hand control unit, rate command signals are applied to a summing unit 130 in combination with received measured rate signals from a gyro 132 to apply sight drive signals to a sight drive unit 134 which, in turn, controls the crosshair line 34. The computer and control unit 96 includes the lead angle computation unit 94 responsive to rate signals from the hand control unit 128 to apply lead angle signals to a summing point 142 in the gun and turret drive unit 100. The computer and control unit 96 receives range information from the laser range finder unit 56 and receives nonstandard condition signals from the sensor unit 78. The sight angular position signals on the lead 34 are also applied to a summing unit 150 which develops a gun sight displacement angle that is applied to the summing unit 142, which in turn, applies a signal through a gain network 152 to develop a rate command signal through a gain network 152 to develop a rate command signal which is passed into a summing point 154. The motor unit 106 of a gun and turret drive unit 100 applied gun and turret angle signals to a gyro unit 160 which, in turn, applies measured rate signals to the summing point 154. The gun and turret angle signals from the motor unit 106 are applied to the summing unit 150 to develop the displacement angle signals.

|  | Director | Disturbed or nondisturbed | Single gyro |
|---|---|---|---|
| Moving tank and target | Sight gyros or hand control | Gun gyros or hand control | |
| Moving target only | {Sight gyros or hand control<br>{Sight tachometers | Gun gyros or hand control<br>Sight or gun tachometers | Gun azimuth gyro.<br>Gun azimuth tachometer. |

For the coordinate converter resolver of unit 60, a coordinate converter providing a function of desired accuracy, the following table is descriptive thereof for a director-type and for a disturbed- or nondisturbed-type system with decreasing reliability, decreasing accuracy and decreasing cost extending downward in the table.

Vertical Gyro   2 Axis on Gun
Pendulum   2 Axis on Gun
Pendulum   1 Axis on Gun
Pendulum   1 Axis on Turret Limited performance and accuracy may be obtained by using pendulum devices in moving tank and moving target situations, however, the preferred use of pendulum devices is against moving targets only (stationary tank).

Figure 3:
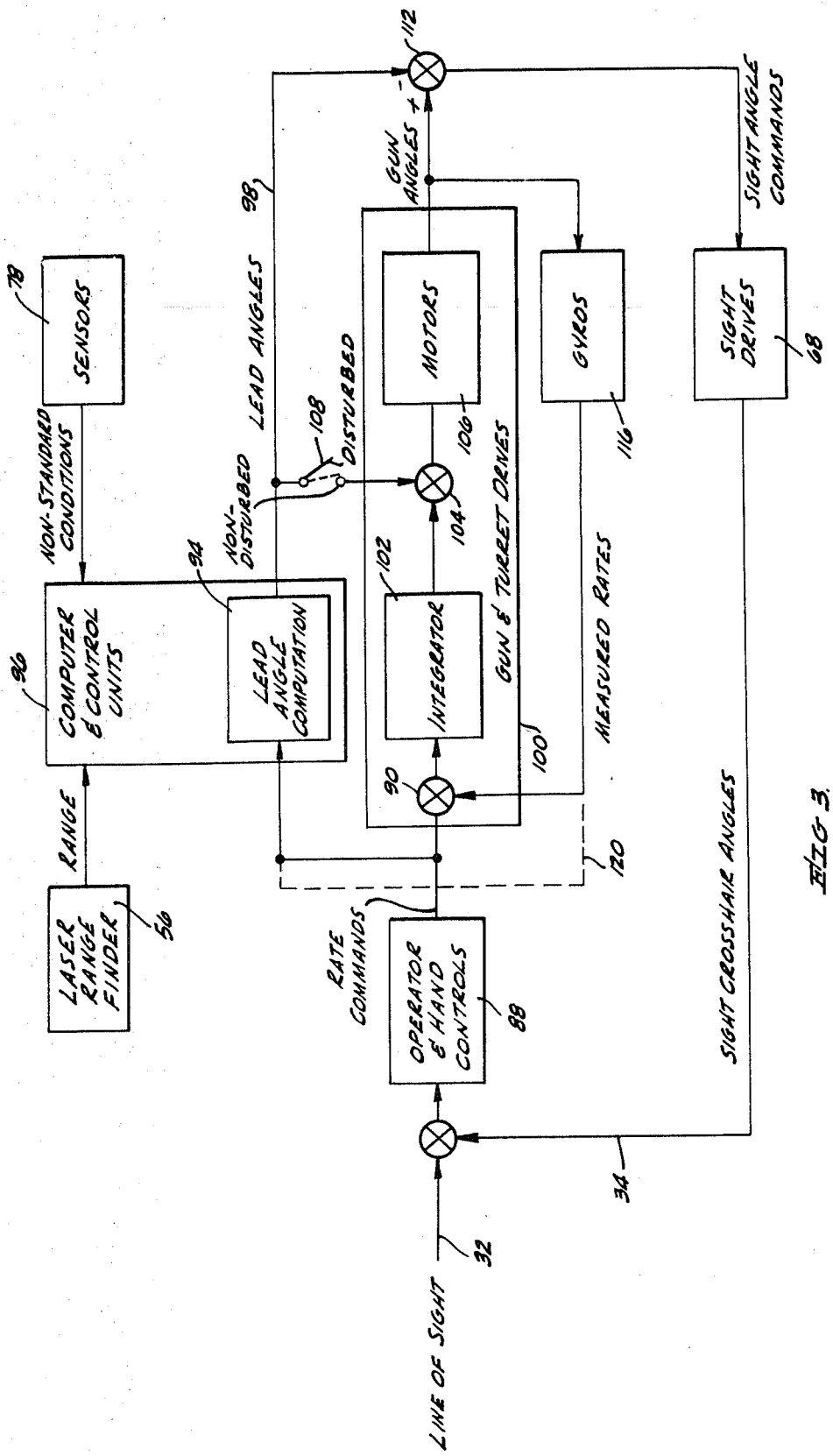
FIG. 3 is a block and circuit diagram showing a disturbed and nondisturbed sight fire control system in accordance with the invention.

Referring now to FIG. 3, which is a block diagram showing a disturbed or nondisturbed tank fire control system in accordance with the invention, a line of sight to the target 32 and a crosshair sight line 34 are observed and reacted to by an operator in an operator and hand control unit 88 to maintain coincidence between the light of sight to the target and the sight crosshair reticle. The hand control applies rate command signals to a summing unit 90 of a gun and turret drive unit 100, and to a lead angle computation unit 94 of a computer and control unit 96 which develops lead angles on a lead 98. The unit 96 is also responsive to range from the laser range finder 56 and to sensed information from the sensor unit 78. The gun and turret drive unit 100 also includes an integrator 102, summing means 104 and a drive motor unit 106 with the integrator 102 responding to rate commands from the summing unit 90 and the summing unit 104 responding to lead angle signals through a switch 108 which is closed for nondisturbed operation. A summing unit 112 responds to sensed gun angle signals and to lead angle signals on the lead A dotted line 166 is shown as an alternate source of measured rate information signals to the computer and control unit 96.

Figure 5:
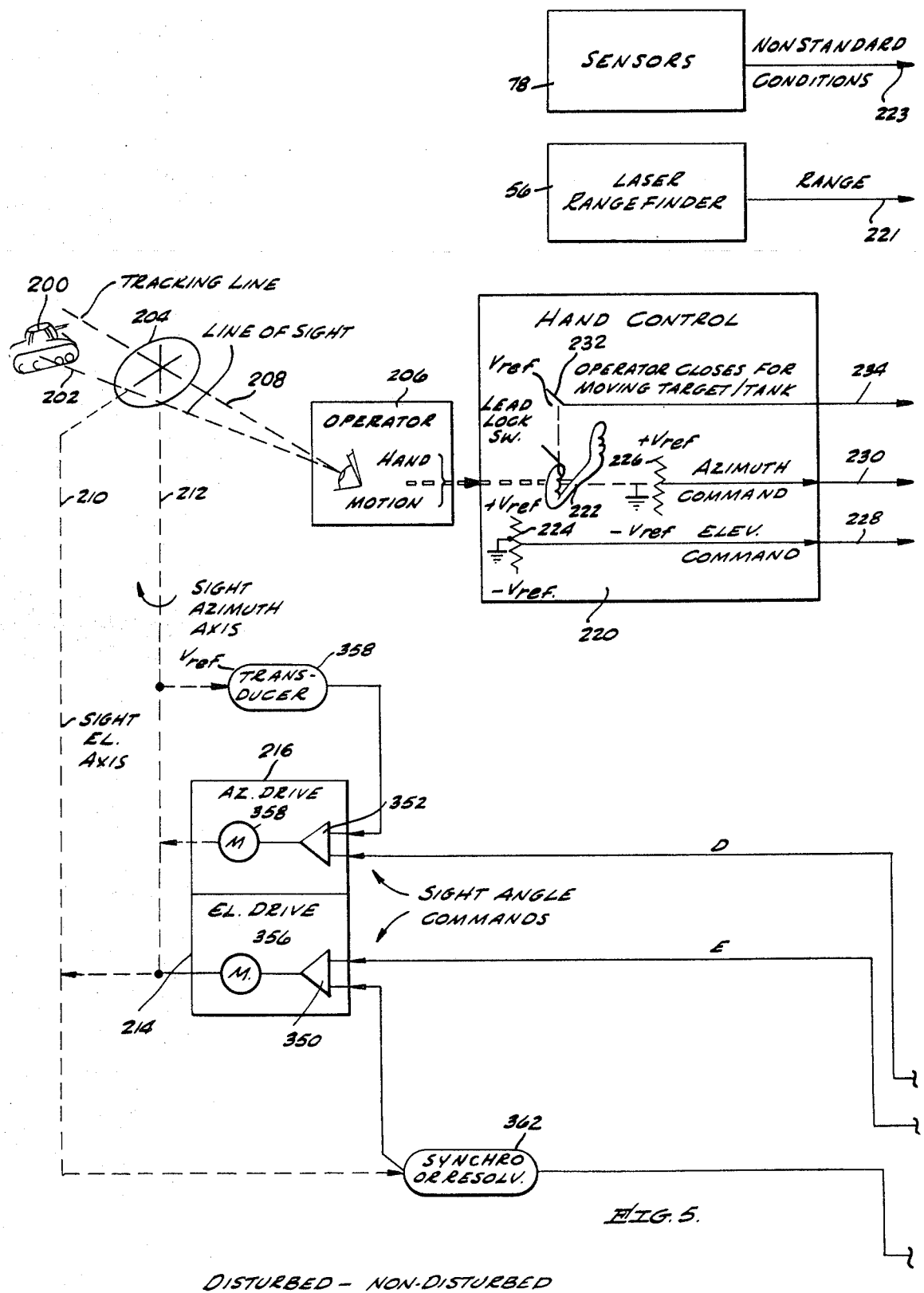
FIGS. 5 and 6 are schematic block and circuit diagrams showing a disturbed and nondisturbed fire control system of the invention in further detail.
Figure 6:
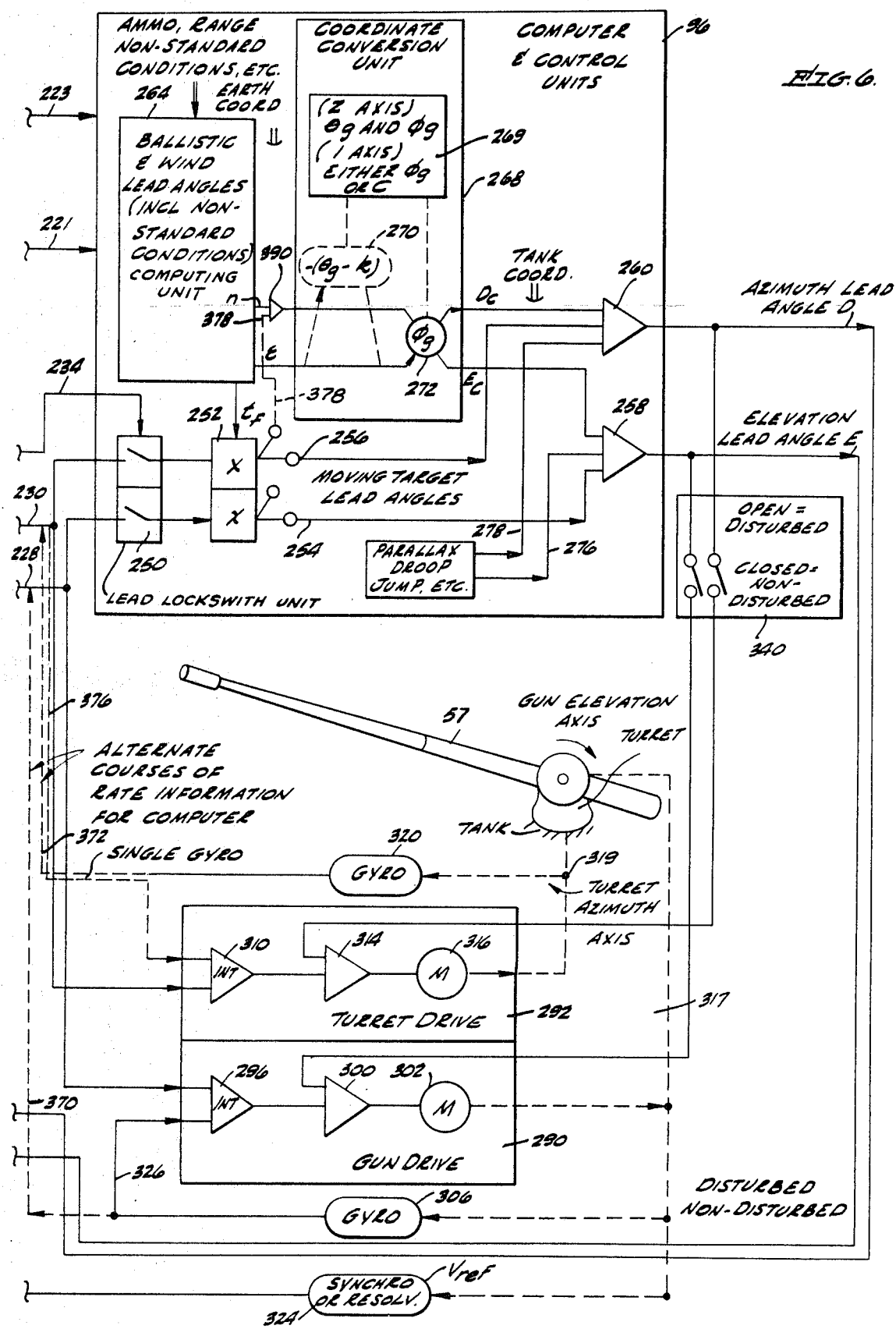

Referring now to FIGS. 5 and 6 which show the disturbed or nondisturbed system in accordance with the invention, the arrangements thereof will be explained in further detail. A vehicle or tank 200 is shown to illustrate a target in a line of sight 202 through a sight 204 to the eye of an operator in an operator unit 206. Also from the operator unit 206, a line 208 represents a tracking line through the crosshairs in the sight 204 that is required to be aligned with the line 202 in order to hit the target. The operator observes the angular difference between the target line of sight 202 and the crosshair tracking line 208 and provides hand motion to a hand control unit 220 which includes a suitable movable or handle unit 222 having an elevation command potentiometer 224 and azimuth command potentiometer 226 which develop elevation and azimuth command signals on respective leads 228,230. A lead lock control switch 232 allows operator control for a moving target condition by applying a signal to a lead 234. The elevation and azimuth command signals on leads 228 and 230, respectively, provide command inputs to the gun drive unit 290 and to the turret drive unit 292.

The gun drive unit 290 which drives a gun 56 in elevation includes an integrator 296 supplying a signal to a summing amplifier 300 which drives a motor 302 which in turn applies a movement to the gun along the gun elevation axis 317. A gyro unit 306 responds to the movement of the gun elevation axis to apply a feedback term through a lead 326 to the integrator 296 in order to stabilize the gun against any disturbances caused by vehicle motion. For control in the azimuth dimension or for the turret drive control, an integrator 310 supplies a signal to apply a term to a summing amplifier 314 which drives a motor 316 and moves the turret about the turret azimuth axis 319. A gyro 320 responds to the turret azimuth movement and applies a feedback signal to the integrator 314 also in order to provide stabilization.

Since the gun and turret are stabilized against vehicle disturbance motion, the hand control outputs 228 and 230 represent rate commands to the gun and turret drive units. Thus these signals are measures of angular rate and are used as inputs to the computer and control unit 96 which includes a lead lock switch unit 250 for receiving the elevation and azimuth command signals and controlled by the lead lock signal on the lead 234, and includes multiplying unit 252 responsive to time of flight signal $t_f$ and to the command signals to apply moving target/tank lead angles on leads 254 and 256 to elevation and azimuth lead angle summing amplifiers 258 and 260. In response to input information such as range and nonstandard conditions on respective leads 221 and 223, a computing unit 264 determines in earth coordinates azimuth signal $\eta$, elevation signal $\epsilon$ and time of flight $t_f$. A coordinate conversion unit 268 includes a vertical gyro or pendulum device 269 on the gun, a resolver unit 270,272 to apply elevation $E_c$ and azimuth $D_c$ signals in turret coordinates to the respective summing amplifiers 258 and 260. Additional sensed information such as parallax, droop and jump are applied on respective leads 276 and 278 to the respective summing amplifiers 258 and 260. The total elevation lead angle signals E and azimuth lead angle signals D are applied from the respective summing amplifiers 258 and 260 to summing amplifiers 350 and 352 of the elevation and azimuth sight drives 214 and 216. Motors 356 and 358 are respectively responsive to the amplifiers 350 and 352 to respectively apply motion to the sight elevation axis 210 and to the sight azimuth axis 212. These axes control the position of the crosshairs in the sight 204. A linear transducer 358 is responsive to the movement on the azimuth axis 212 to apply a feedback term to the summing amplifier 352. The synchro or resolver unit 324 is responsive to the gun elevation axis 317 movement and feeds a signal through the synchro or resolver unit 362, which is responsive to sight elevation axis movement to apply a feedback term to the summing amplifier 350. The total lead angles E and D from the amplifiers 258 and 260 are also applied through a switch unit 340 including two switches which are open for a disturbed-type system and which are closed for a nondisturbed-type system. The elevation and azimuth signals are applied from the unit 340 to the respective summing amplifiers 300 and 314 of the gun and turret drive units.

Lines 370 and 372 shown dotted illustrate alternate sources of rate information that may be utilized by the computer within the principles of the invention. It should be noted that the gun, or sight in the case of a director system, need not be stabilized against vehicle motion for the system to operate satisfactorily from a stationary vehicle against stationary or moving targets. It may be desirable to include such stabilization when firing from a moving vehicle.

For single gyro operation as provided in one arrangement in accordance with the invention, a lead 376 shown coincident with 372 is coupled from the single gyro unit 320, through the switch 250 and the multiplier 252 and through a dotted lead 378 and a summing unit 390 to the resolver 272. In this arrangement the leads 254,256 are not utilized. It is to be noted that the single gyro approach utilizes the azimuth angular rate information from the gun and as a result implies the angular elevation rate information with substantial accuracy.

Figure 7:
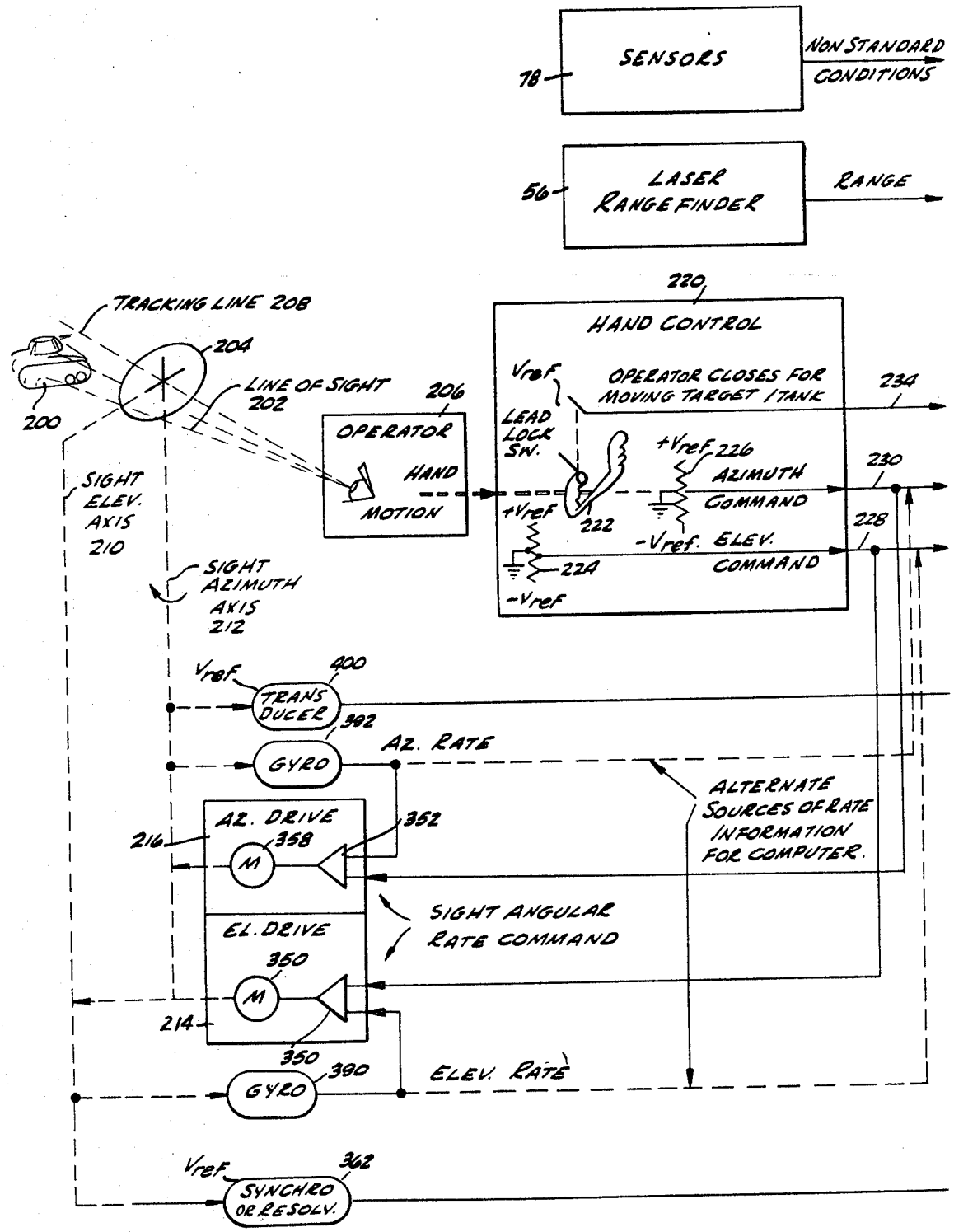
FIGS. 7 and 8 are schematic block diagrams showing a director-type system in accordance with the invention.
Figure 8:
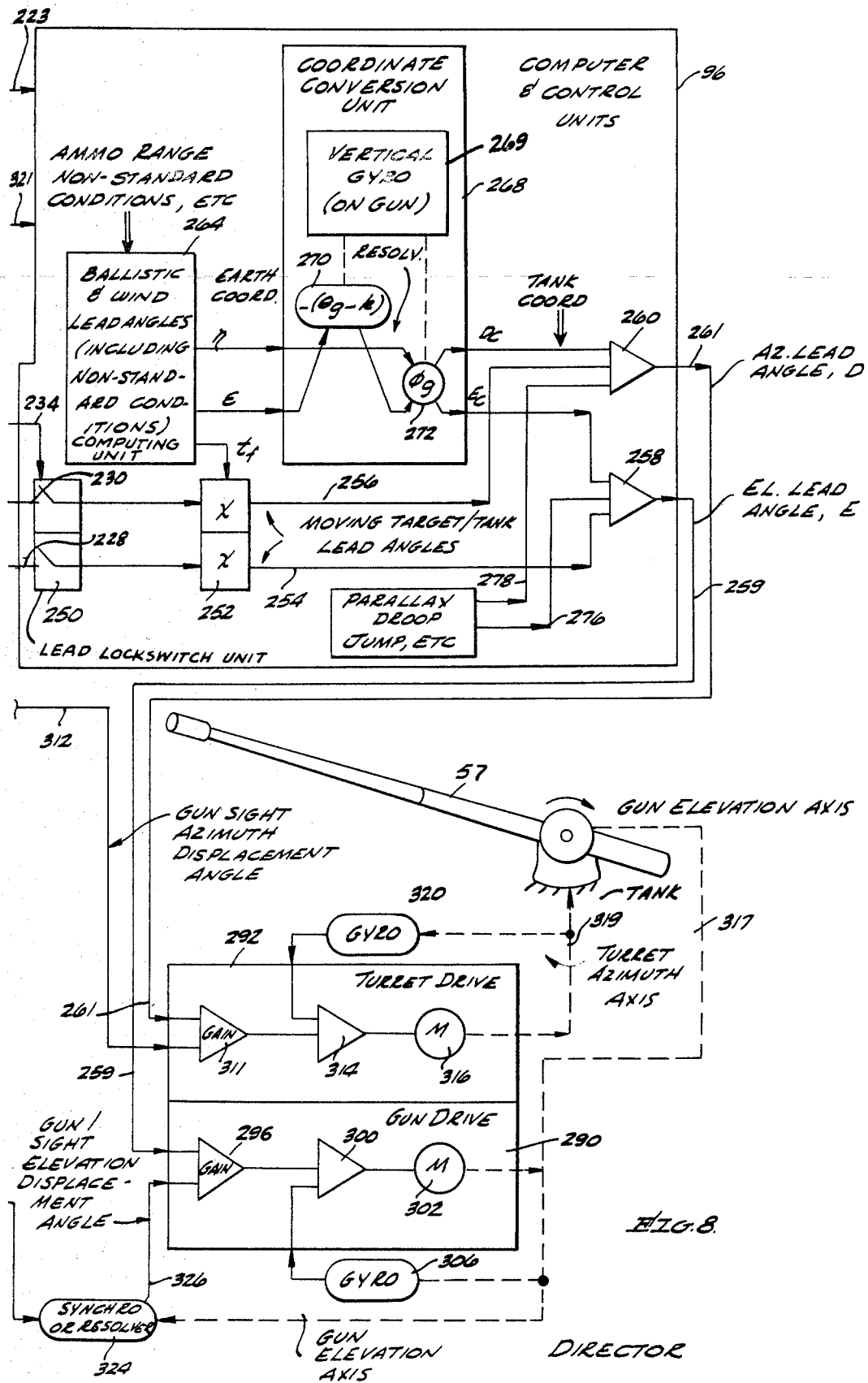

Referring now to FIGS. 7 and 8, which is a block diagram of the director-type system in accordance with the principles of the invention, the operator applies hand motion signals to the hand unit 222 of the hand control unit 220 which in turn develops elevation and azimuth command signals on respective leads 228 and 230 for driving the sight. The elevation drive unit 214 responds to the signal on the lead 228 and an elevation rate signal from a gyro unit 390 to move the motor 356 and rotate the sight elevation axis 210. The azimuth drive unit 216 responds to the signal on the lead 230 and a signal from a gyro unit 392 to control the motor 358 and rotate the gun on the sight azimuth axis 212. Gyro units 390 and 392 respectively respond to motion of the sight elevation axis and the sight azimuth axis to provide the desired sight motion control. The computer unit 96 responds to the elevation and azimuth command signals on leads 228 and 230 to provide moving target lead angles on the leads 254 and 256 which are applied to respective summing amplifiers 258 and 260 where they are respectively combined with $E_c$ and $D_c$. The elevation lead angle and azimuth lead angle on leads 259 and 261 are applied to the gun drive unit 290 and to the turret drive unit 292 at gain amplifiers 297 and 311. The control of the gun in response to gyros 306 and 320 is similar to that explained relative to FIGS. 5 and 6 and will not be explained in further detail. The gain amplifier 311 responds to the signal on the lead 312 from a transducer 400 and the gain amplifier 296 responds to a signal on the lead 326 as developed by the synchro or resolver unit 324. The synchro or resolver unit 362 applies a term to the synchro or resolver unit 324 representative of the sight elevation axis position.

Figure 9:
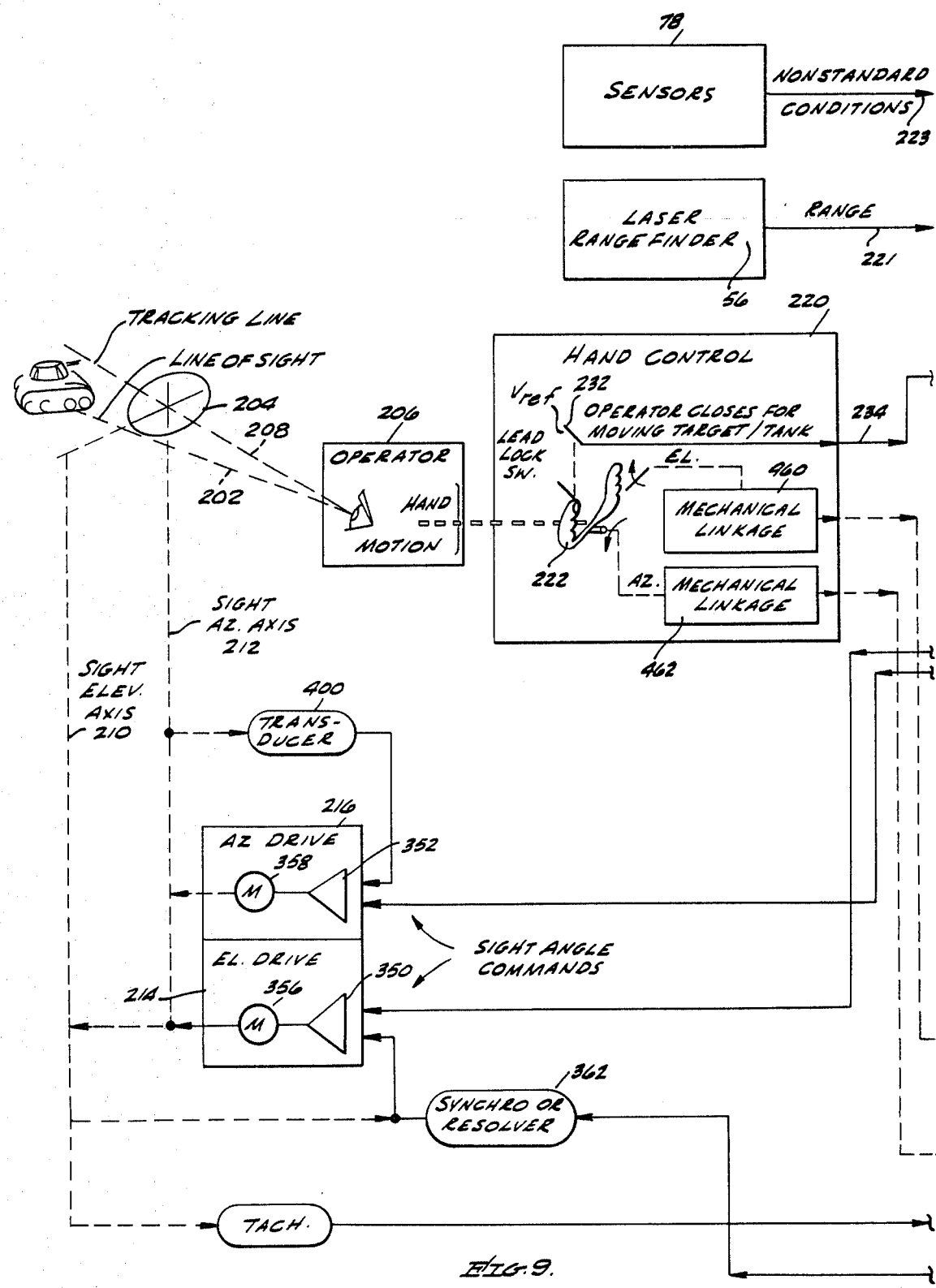
FIGS. 9 and 10 are schematic block diagrams showing an improved system disturbed in azimuth and nondisturbed in elevation in accordance with the invention.
Figure 10:
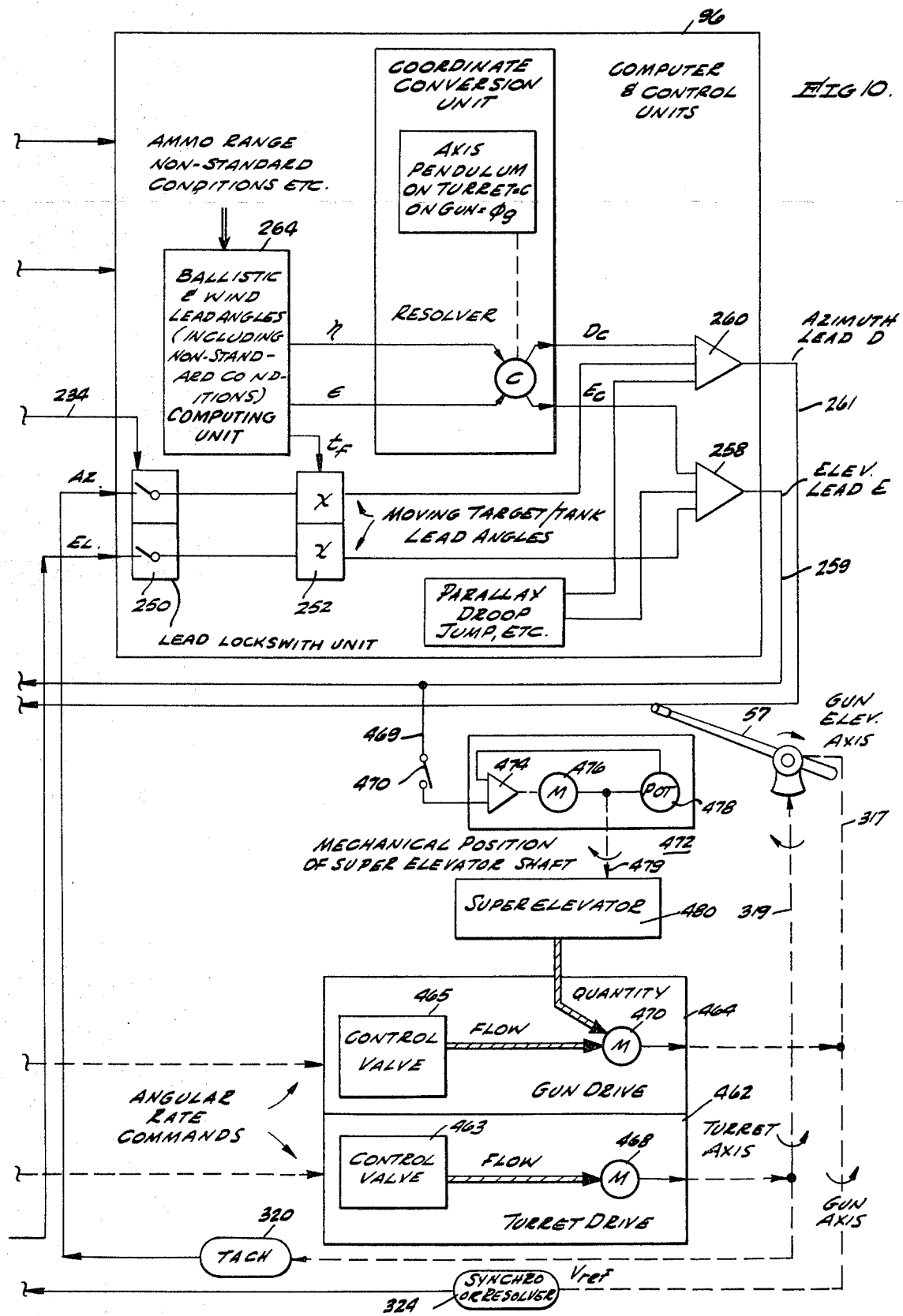
Figure 11:
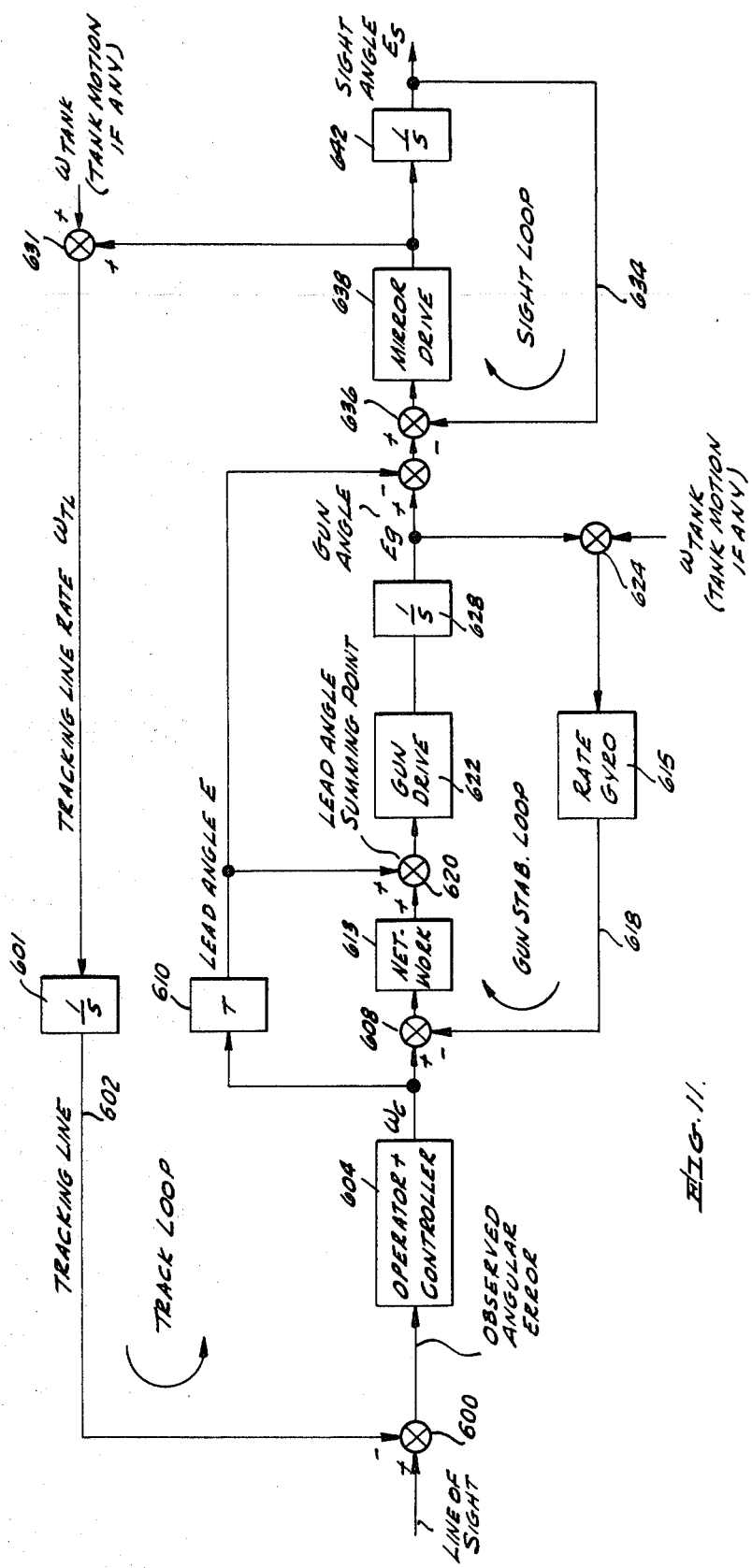
FIG. 11 is a schematic block diagram for explaining the nondisturbed system in the elevation dimension.

Referring now to FIGS. 9 and 10, which shows one arrangement in accordance with the principles of the invention, which is nondisturbed in elevation and disturbed in azimuth, the operator control handle 222 moves elevation and azimuth linkage units 462 and 460 which in turn may be mechanically coupled to respective control valves 463 and 465 of turret and gun drive units 462 and 464. The control valves 463 and 465 control a flow to suitable motors 468 and 470 with the turret drive motor 468 controlling the azimuth axis 319 and a tachometer 320 and the gun elevation drive motor 470 controlling the gun elevation axis 317 and the synchro resolver 324. The elevation and azimuth lead angles as provided by respective summing amplifiers 258 and 260 are applied to respective azimuth and elevation sight drive units 214 and 216. The elevation lead angle from the summing amplifier 258 is applied through a lead 469 and a switch 470 to a super elevator unit 472 including an amplifier 474 controlling a motor 476 to move a potentiometer 478 and provides a feedback signal to the summing amplifier 474. Motion of the motor 476 is also applied to a super elevator 480 which responds to the mechanical position of the super elevator shaft 479 to provide a quantity of fluid flow proportional to the input voltage on the lead 469. The super elevator unit 480 may include a valve unit responsive to a voltage to control the fluid flow quantity. Gun motor 470 responds to both the flow from the control valve 465 and from the super elevator unit 480. The switch 470 is open for disturbed operation and is closed for nondisturbed operation, this control being provided in the elevation channel only. It is to be noted that a similar type of lead angle control may be provided in the azimuth channel within the principles of the invention. The elevation and azimuth drive units 214 and 216 also receive a signal from a synchro resolver unit 362 which responds both to the motion of the sight elevation axis 210 and to the output from the synchro or resolver unit 324 which in turn responds to motion of the gun elevation axis.

In another arrangement in accordance with the invention, the units 478 and 480 in the elevation channel may be replaced by a servovalve. This technique would also apply in the azimuth channel.

Before proceeding further into the description of the fire control system including features such as single gyro and multiple gyro operations, varying degrees of accuracy relative to the coordinate system and operation in response to moving target and moving tanks or vehicles, the functional operation will be further explained for disturbed sight, nondisturbed sight, director and disturbed in azimuth operation. Referring now principally to FIGS. 11 through 15, FIG. 11 shows a nondisturbed type control system in the elevation dimension with the angular line of sight input coming to a summing point 600 along with a tracking line signal from a loop 602 including an integrator 601. In response to the comparison, the operator controller 604 provides a control signal $\omega_C$ which is applied both to a summing point 608 and to the computer 610 where it is multiplied by time of flight $t_f$ to provide a lead angle signal E. A rate gyro 615 of a gun stabilizing loop 618 provides a stabilized gun and applied a signal to the summing point 608 which in turn applies a signal through an integrator network 613 to a summing point 620 also receiving a lead angle signal from the computer 610. A gun drive unit 622 is responsive to the lead angle summing point 620 to apply a signal to an integrator 628 and through a summing unit 624 to the rate gyro 615. A tank disturbance signal $\omega_{tank}$ is also applied to the summing unit 624. A summing unit 636 also receives a signal from a summing unit 630, to control the mirror drive unit 638 and apply the tracking rate signal to the tracking loop 602 through a summing unit 631. The sight loop 634 develops a sight angle signal $E_s$. It is to be noted that in a nondisturbed system both the computer and the gun drive control the sight drive.

Referring now principally to FIG. 12 for a nondisturbed operation in the azimuth channel, the operator and controller 604 respond to the line of sight and the tracking line to develop an angular rate signal $\omega_c$ which is applied through a computer unit 660 which in turn applies a lead angle signal D to a summing unit 670. The signal $\omega_c$ is applied through a summing unit 664 and an integrator network 666 to the summing unit 670. A turret drive unit 672 responds to the summing unit 670 to apply a signal to a summing unit 674 which unit also receives a signal $\omega_{tank}$. An integrating unit 676 responds also to the turret drive unit 672 to develop an azimuth angle $D_g$. A turret stabilizing loop 680 includes a rate gyro 682 coupled between the summing unit 674 and the summing unit 664. The lead angle D is also applied to a summing unit 682 which applies a signal to the mirror drive unit 684 of a sight loop 686. A gun line rate signal is applied to an integrator 690 which is a sight output signal $D_s$.

Referring now to FIGS. 13 and 14, the director-type fire control system in which the sight loop is gyro stabilized, will be further explained. When a target is tracked, a prediction angle is computed from the tracking data and the weapon is aimed with respect to the sight. The sight drive is a closed loop by itself with the tracking error as an input and the motion of the tracking line as an output. The motion of the gun line and the calculation of lead angle are external to the target tracking. The system has a sight loop 681, a gun loop 683 and a gun stabilization loop 685 in the elevation dimension and has a sight loop 687, a turret loop 689 and a gun stabilization loop 691 in the azimuth dimensions. Gyros 693 and 695 stabilize the respective sight loops 681 and 687. The stabilized sight loop provides a highly reliable system against a moving target when constantly changing angular rate is applied to the system. It is to be noted at this time that the follow and clamp arrangement need not be utilized in the director-type system as will be explained in further detail subsequently. The system constantly responds to the changing angular rate of the sight movement. Gun aiding and turret aiding signals may be optionally utilized in the director system.

Figure 15:
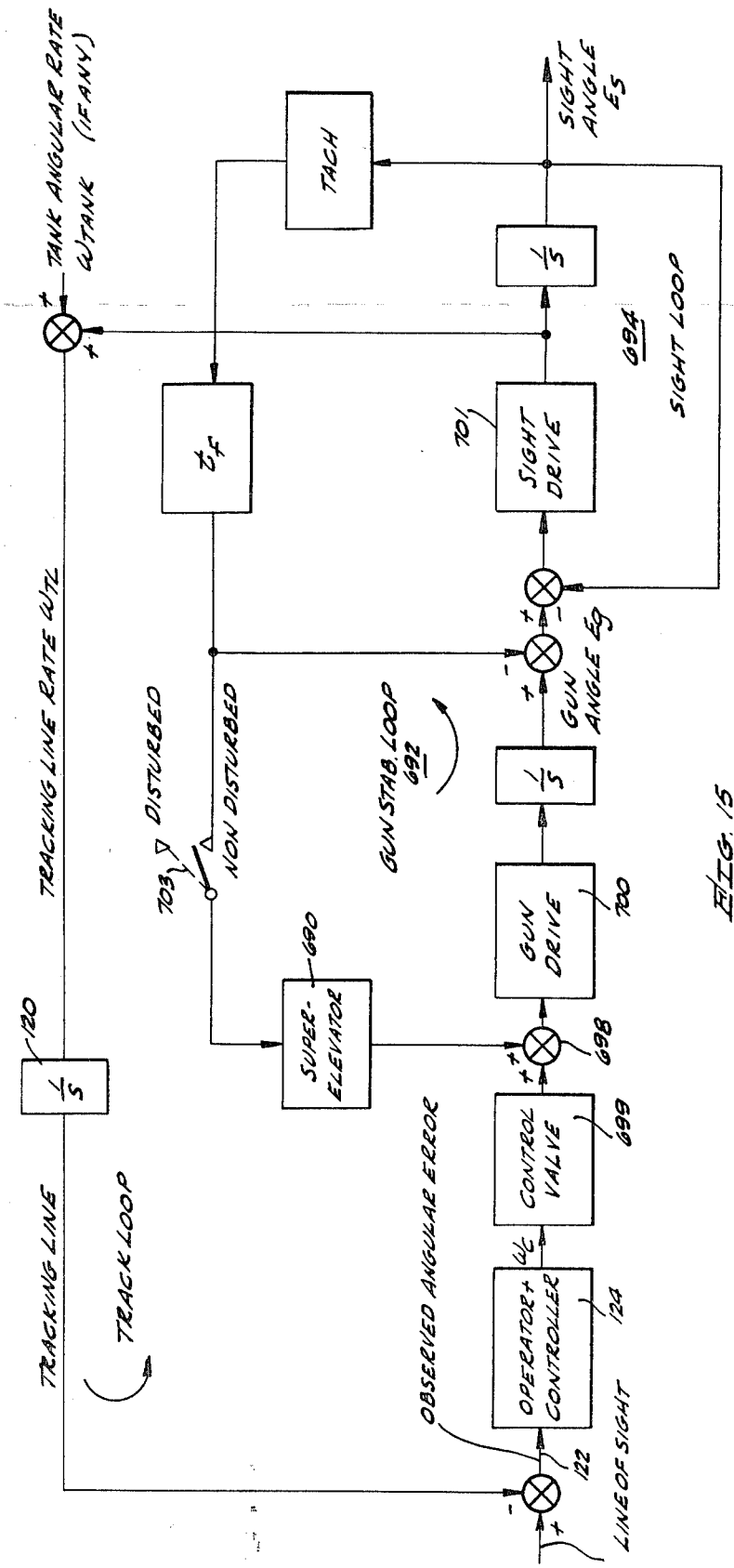
FIG. 15 is a schematic functional diagram for explaining the improved system disturbed in azimuth and nondisturbed in elevation in accordance with the invention.

Referring now to FIG. 15 which shows a system in accordance with the invention which is disturbed in azimuth and nondisturbed in elevation. The elevation channel is shown with a super elevator unit 690, a gun stabilizing loop 692 and a sight loop 694. The gun stabilizing loop 692 includes a summing unit 698 responsive to the output of a control valve 699 and super elevation unit 690. The super elevation unit applies the lead angle signal to be effectively summed with the operator signal $\omega_c$ to in turn control a gun drive 700. A sight drive 701 drives the sight in response to the gun position and computed lead angle. A switch 703 provides a selection of disturbed or nondisturbed operation which may be for the elevation dimension.

The various sensors of the system provide data in one of two coordinate systems, i.e., earth local level and turret coordinates. The mechanization scheme reduces the data to angular quantities which are utilized in the turret coordinate system to drive the sight and/or gun.

Figures 16A, 16B:
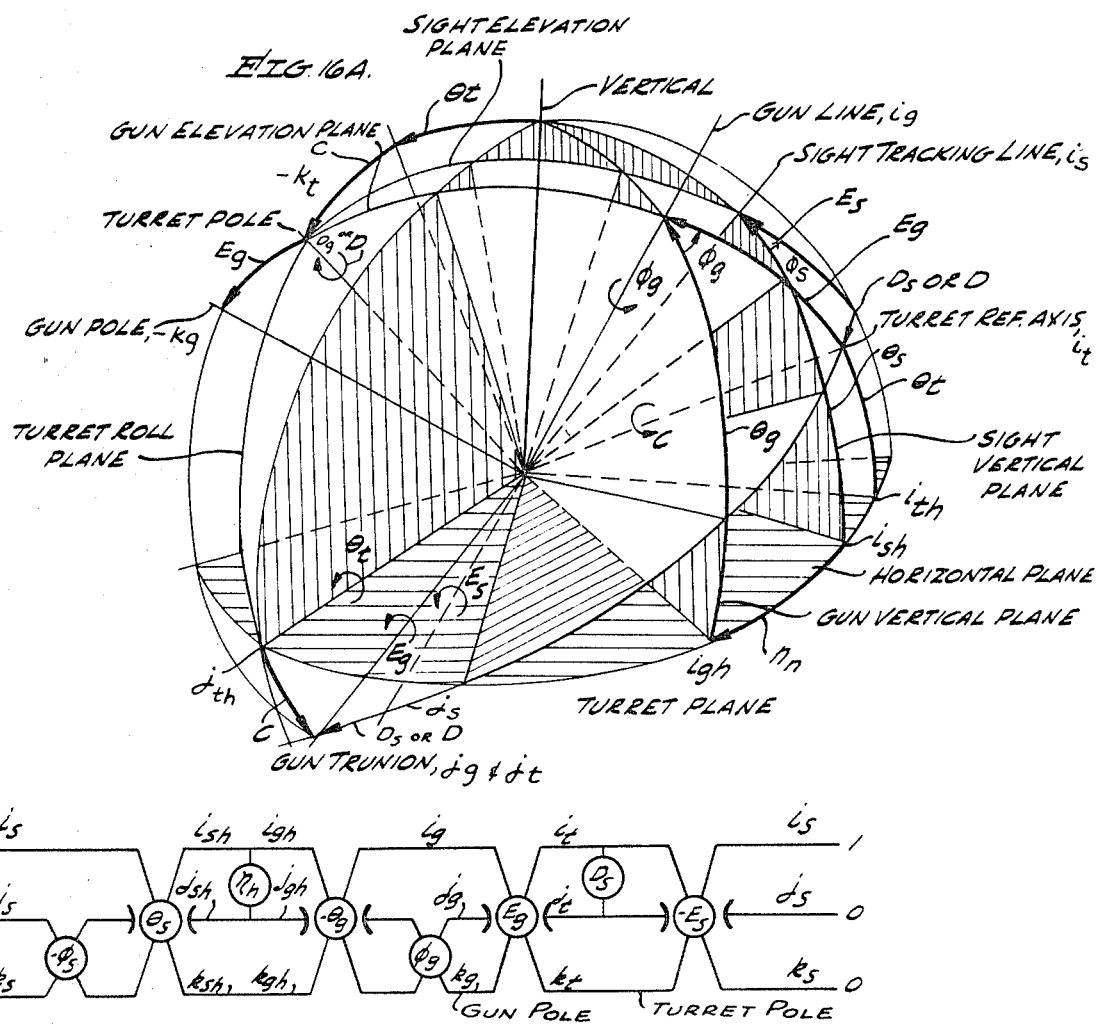
FIG. 16A is a perspective drawing of the tank coordinate system in accordance with the invention.
FIG. 16B is a drawing for explaining the coordinate transformation in accordance with the invention.

It is useful to discuss the coordinate systems and resolution schemes. Quantities are shown in FIG. 16A where the angles are defined as:

$\Theta_s$ sight tracking line pitch angle, measured in the sight vertical plane between the sight tracking line and the horizontal plane.

$\eta_h$ earth referenced azimuth lead angle, measured in the horizontal plane between the sight vertical plane and the gun vertical plane.

$\Theta_g$ gun pitch angle, measured in the gun vertical plane between the gun line and the horizontal plane.

$\epsilon_r$ earth referenced elevation lead angle, measured in the sight vertical plane (or the gun vertical plane) where $\epsilon_r = \Theta - \Theta_s$.

$\Phi_g$ gun roll angle, dihedral angle between the gun vertical plane and the gun elevation plane.

$E_g$ gun elevation angle, measured in the gun elevation plane (perpendicular to the turret plane) between the gun line and the turret plane.

$\Phi_s$ sight roll angle, dihedral angle between the sight vertical plane and the sight elevation plane.

$E_s$ sight elevation angle, measured in the sight elevation plane (perpendicular to the turret plane) between the sight tracking line and the turret plane.

E elevation lead angle, measured in the sight elevation plane (or gun elevation plane) where E is obtained from the fire control computer and the system mechanization is such as to obtain $E \approx E_g - E_s$.

$D_s$ sight azimuth deflection angle, measured in the turret plane between the gun elevation plane and the sight elevation plane.

D azimuth lead angle, measured in the turret plane, where D is obtained from the fire control computer and the system mechanization may be such that $D_s \approx D$.

$\Theta_t$ turret pitch angle, measured in the turret vertical plane between the turret reference axis (defined by $E_g = 0$) and the horizontal plane.

C cant or turret roll angle, dihedral angle between the turret vertical plane and the gun elevation plane.

Alternatively within the principles of this invention, the lead angle E may be measured in the gun elevation plane and the lead angle D measured in the gun azimuth plane which contain the $i_g$ and $j_g$ axis described below. FIG. 16B shows a symbolic representation of the resolution between the principle coordinate systems which are defined as:

$(i,j,k)_s$ sight tracking line coordinate system; where $i_s$ points in the direction of the sight tracking line (when the tracking error is zero, $i_s$ corresponds to the line-of-sight to the target), $j_s$ lies in the turret plane pointing to the right of the sight, and $k_s = i s \times j_s$ which points in a downward direction. (Note x denotes the vector cross product.)

$(i,j,k)_{sh}$ sight horizontal coordinate system; where $i_{sh}$ lies at the intersection of the horizontal plane and the sight vertical plane and points in the general direction of the target, $j_{sh}$ lies in the horizontal plane 90° to the right of $i_{sh}$ and $k_{sh} = i_{sh} \times j_{sh}$ vertically downward.

$(i,j,k)_{gh}$ gun horizontal coordinate system; where $i_{gh}$ lies at the intersection of the horizontal plane and the gun vertical plane and points in the general direction of the target, $j_{gh}$ lies in the horizontal plane 90° to the right of $_{gh}$ and $k_{gh} = i_{gh} \times j_{gh}$.

$(i,j,k)_g$ gun coordinate system; where $i_g$ lies along the gun line, $j_g$ lies in the turret plane along the gun trunnion axis to the right of the gun, and $k_g = i_g \times j_g$.

$(i,j,k)_t$ turret coordinate system; where $i_t$ lies in the turret plane along the turret reference axis, $j_t$ lies in the turret plane 90° to the right of $i_t$, and $k_t = i_t \times j_t$.

The coordinate symbols shown in FIG. 16B are well known in the art as explained in "Symbolic Representations of Coordinate Transformations," Richard L. Pio, IEEE Trans. on Aerospace and Navigational Electronics, Vol. ANE-11, No. 2, June 1964.

Figure 17:
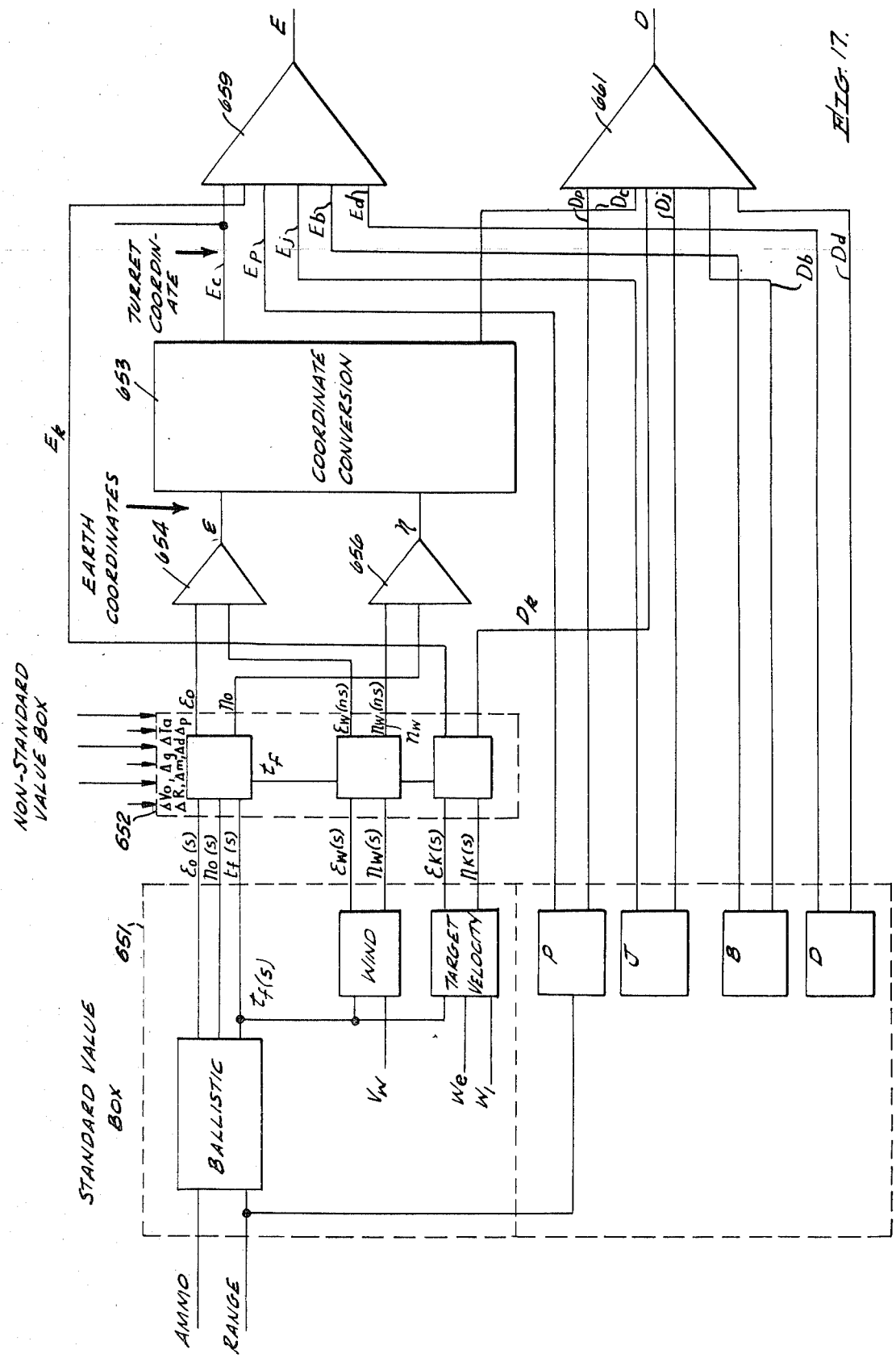
FIG. 17 is a schematic block diagram of the fire control computer in accordance with the invention for explaining the system parameters and equations.

The scheme of computer mechanization in accordance with the invention is generally summarized in FIG. 17. A standard value box 651 calculates all lead angles with respect to some predetermined independent variables and such target dependent variables as wind velocity, angular velocities and range. The outputs of this standard box 651 are operated on in a nonstandard value box 652 by the variations of the independent variables. All outputs of the nonstandard value box 652 are first summed in summers 654 and 656 to give $\epsilon$ and $\eta$, respectively, and are then resolved into the turret coordinate system by a coordinate converter 653, these outputs having been in an earth local level coordinate system.

The coordinate converted elevation and azimuth lead angles are written $E_c$ and $D_c$, respectively, but they must be corrected by parallax, boresight, jump (or zeroing), and droop parameters.

The boresight parameters $D_b$ and $E_b$ are determined at a particular range, i.e., boresight range $R_b$, and account for the misalignment between the gun axis and the sight axis. The parallax parameters $D_p$ and $E_p$ are similar to the boresight parameter, but they may be considered as the variations of the boresight parameters with respect to range. The jump or zeroing parameters $D_j$ and $E_j$ are a collection of all additional parameters not accounted for in the computer mechanization, with the principal contribution being the mean angle of departure between the gun line axis and projectile initial velocity as it leaves the muzzle. The droop parameters $D_d$ and $E_d$ are a measure of the gun deflection or bending due to temperature gradients and gravity. These terms are all in the turret coordinate system.

Azimuth and elevation terms are summed separately in summing units 659 and 661 to give the total azimuth lead angle D and the total elevation lead angle E. FIGS. 16A, 16B, and 17 may be used as a reference for the following discussion on the mechanization equations. In order to simplify the discussion on the mechanization equations, the following convention for denoting the symbols and subscripts used in the equations below has been adopted. The azimuth and elevation lead angles, $\eta$ and $\epsilon$, or D or E, respectively are subscripted in terms of their origins and condition in the mechanization equations. The subscripts $o, w, k, j, b, d$, and $p$, respectively, refer to ballistic lead angle, wind velocity lead angle, kinematic lead angle, jump lead angle, boresight lead angle, droop lead angle and parallax lead angle. If an $\eta$ or $\epsilon$ is subscripted, then the subscripted quantity is in the earth local level coordinate system; whereas a subscripted D or E indicates that the subscripted quantity is in the turret coordinate system. The subscript $(s)$ denotes that the equations have been solved for standard values of air temperature $T_a$, air pressure P, initial velocity of the projectile $V_o$, range rate $\dot{R}$, gravity $g$, projectile mass $m$, and projectile diameter $d$. The absence of a subscript denotes that the equations have been solved for nonstandard values of the seven variables listed above. A subscript 1 denotes that the equations have been partially corrected for nonstandard values and the subscript $(s)$ denotes that the equations are at standard conditions. Below are the basic equations for all elevation and azimuth lead angles:

$$R_n = \frac{K_n m T_a^{3/2}}{d^2 P(T_a^{1/2} - K_t)}$$

$$t_f = \frac{R}{V_o}(e^{R/R_n} - 1)$$

$$\epsilon_0 = \frac{gR_n}{2V_o^2} \cdot \left(\frac{e^{2(R/R_n)} - 1}{2(R/R_n)} - 1\right)$$

$$\epsilon_w = -\left[\frac{gR_n}{2V_o^2}(e^{2(R/R_n)} - 1) - \epsilon_o\left(1 + \frac{R}{V_o t_f}\right)\right]\frac{\dot{X}_w t_f}{R}$$

$$\epsilon_k = \left[\frac{gR_n}{2V_o^2}(e^{2(R/R_n)} - 1) - \epsilon_o\right]\frac{\dot{X}_T t_f}{R} - \frac{\ddot{Z}_T t_f}{R}$$

$$E_p = Z_p\left(\frac{1}{R \cos \epsilon_g} - \frac{1}{R_b}\right) + X_p\left(\frac{\sin \epsilon_g}{R}\right)$$

$$E_j = J_{ae} + K_{ae}\mathcal{Z}_e$$

$$E_b = B_e$$

$$\eta_0 = -K_d\left(\frac{gR_n}{NV_o^3}\right)\left(\frac{e^{N(R/R_n)} - 1}{N(R/R_n)} - 1\right)$$

$$\eta_w = \left(\frac{R}{V_o t_f} - 1\right)\frac{\dot{Y}_w t_f}{R}$$

$$\eta_k = \frac{\dot{Y}_T t_f}{R}$$

$$D_p = Y_p\left(\frac{1}{R \cos \epsilon_g} - \frac{1}{R_b}\right)$$

$D_j = J_{ad} + K_{ad}\mathcal{Z}_d$
$D_b = B_d$
 $\epsilon_g =$ Gun elevation above turret deck
 $d =$ Diameter of projectile
 $m =$ Mass of projectile
 $K_n =$ Constant dependent on shape of projectile
 $K_T =$ Constant relating change in temperature to change in $R_n$
 $T_A =$ Air temperature
 $P =$ Air pressure
 $K_d =$ Drift constant (dependent on spin rate and shape and mass of projectile)
 $N = 3 - (R_n C_W)$
 $C_W =$ Spin slow-down constant
 $g =$ Gravity force
 $V_o =$ Muzzle velocity
$\dot{X}_T, \dot{Y}_T, \dot{Z}_T =$ Target velocity in Earth coordinates
 $\dot{X}_W, \dot{Y}_W =$ Wind velocity in Earth coordinates
 $R =$ Range to target
 $R_b =$ Boresighting range
$X_p, Y_p, Z_p =$ Displacement of the intersection of the sight gimbal axes from the center of the gun trunnion in turret coordinates
 $B_e, B_d =$ Boresight manual settings in elevation and deflection
 $K_{ae}, K_{ad} =$ Zeroing sensitivity coefficients in elevation and deflection
 $J_{ae}, J_{ad} =$ Projectile jump in elevation and deflection
 $\mathcal{Z}_e, \mathcal{Z}_d =$ Zero manual settings in elevation and deflection
 $E_d, B_d =$ Gun droop in elevation and deflection.

If standard values of the seven independent variables $T_a$, $p, V_o, \dot{R}, g, m$, and $d$ are implied for the equations, the symbols on the left of the equal signs are written with the subscript $(s)$ by the conventions stated above. Once having solved for the standard quantities, there are two excellent approximation techniques to obtain nonstandard condition equations. Both techniques use the symbol $X_1$ to denote the standard value of $T_a, P, V_o, \dot{R}, g, m$, and $d$ respectively, and the symbol $\Delta X_1$ to denote the deviation from the standard values. Also, the subscript $i$ may denote the subscripts $o, w$, or $k$.

The first technique is an approximation by a Taylor series expansion with the partials being implemented in the mechanization of the system. The Taylor series equation summarized below for $\eta_i, \epsilon_i$, and $t_f$:

$$\eta_i = \eta_{i(s)} + \Sigma_1 X_1 \frac{\delta \eta_{i(s)}}{\delta X_1}\left(\frac{\Delta X_1}{X_1}\right)$$

$$\epsilon_i = \epsilon_{i(s)} + \Sigma_1 X_1 \frac{\delta \epsilon_{i(s)}}{\delta X_1}\left(\frac{\Delta X_1}{X_1}\right)$$

$$t_f = t_{f(s)} + \Sigma_1 X_1 \frac{\delta t_f}{\delta X_1}\left(\frac{\Delta X_1}{X_1}\right)$$

The second technique is an approximation by a calculus of variations technique. The terms $E_{i1}, N_{i1}$ and $T_{f1}$, shown in the equations below are exponents of $X_1$ in the equations for $\epsilon_i$, $\eta_i$ and $t_f$, respectively. This technique is referred to as the "in line partials" technique and the equations are:

$$\eta_i = \eta_{i(s)} \Pi_1\left(1 + N_{i1}\frac{\Delta X_1}{X_1}\right)$$

$$\epsilon_i = \epsilon_{i(s)} \Pi_1\left(1 + E_{i1}\frac{\Delta X_1}{X_1}\right)$$

$$t_f = t_{f(s)} \Pi_1\left(1 + T_{f1}\frac{\Delta X_1}{X_1}\right)$$

All earth local level coordinate quantities are summed to give:

$$\epsilon = \epsilon_o + \epsilon + \epsilon_k$$

$$\eta = \eta_o + \eta + \eta_k$$

Since the lead angles between sight and gun must be physically developed in turret coordinates, the angles $\epsilon$ and $\eta$ are then transformed into turret coordinates by any of the following approaches.

Figure 18:
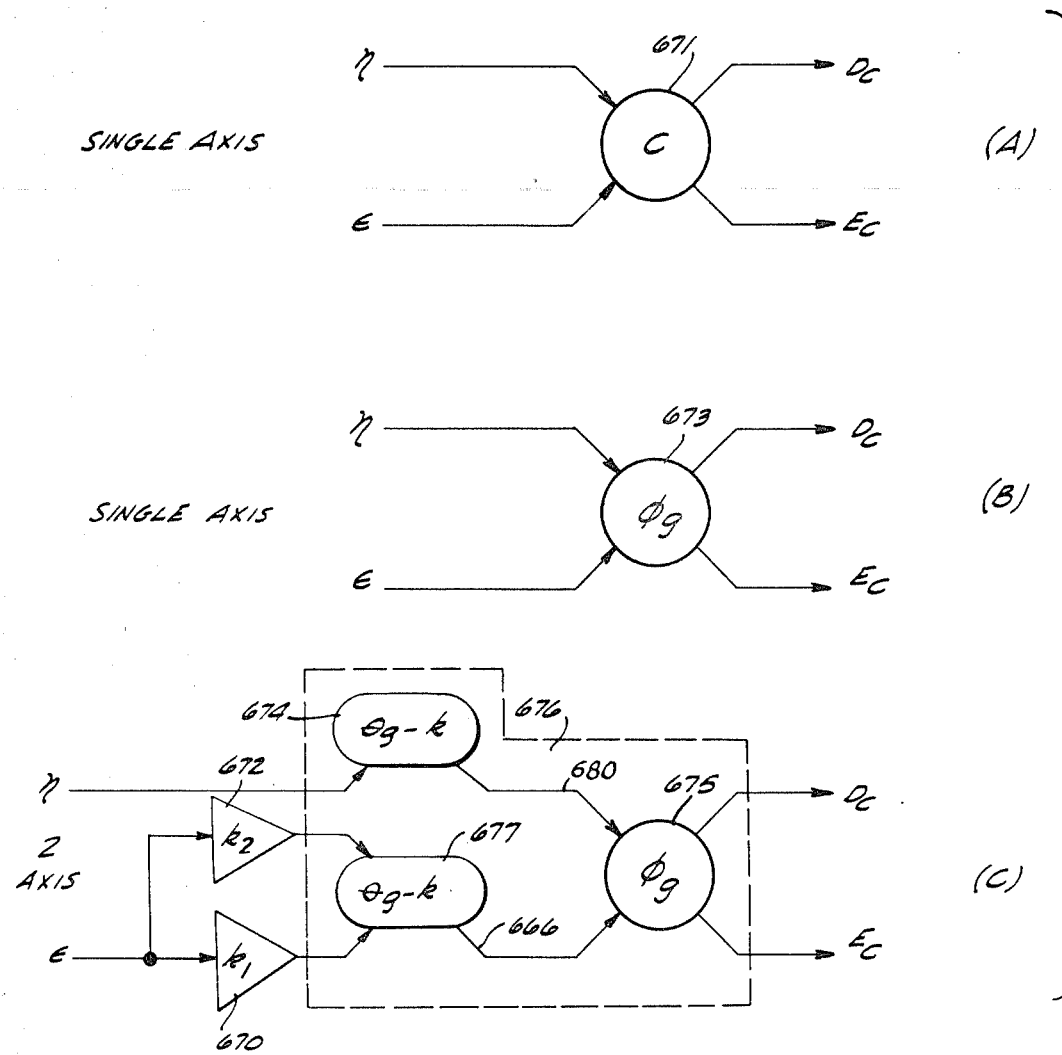
FIG. 18 is a schematic drawing for explaining the earth local level to turret coordinate transformation in accordance with the invention.
Figure 23A:
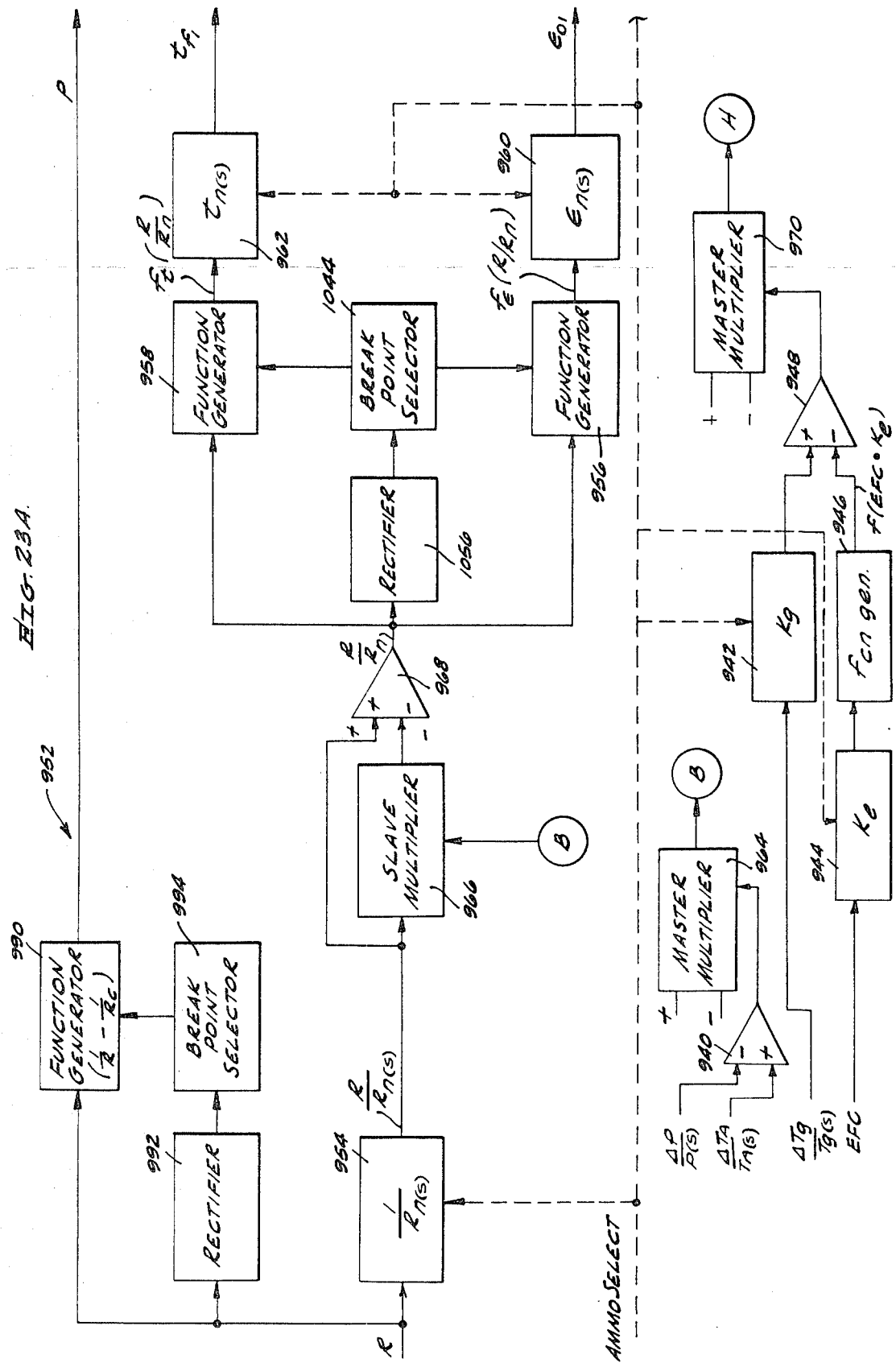
FIG. 23A is a schematic circuit and block diagram of a first portion of the computer system in accordance with the invention.
Figure 23B:
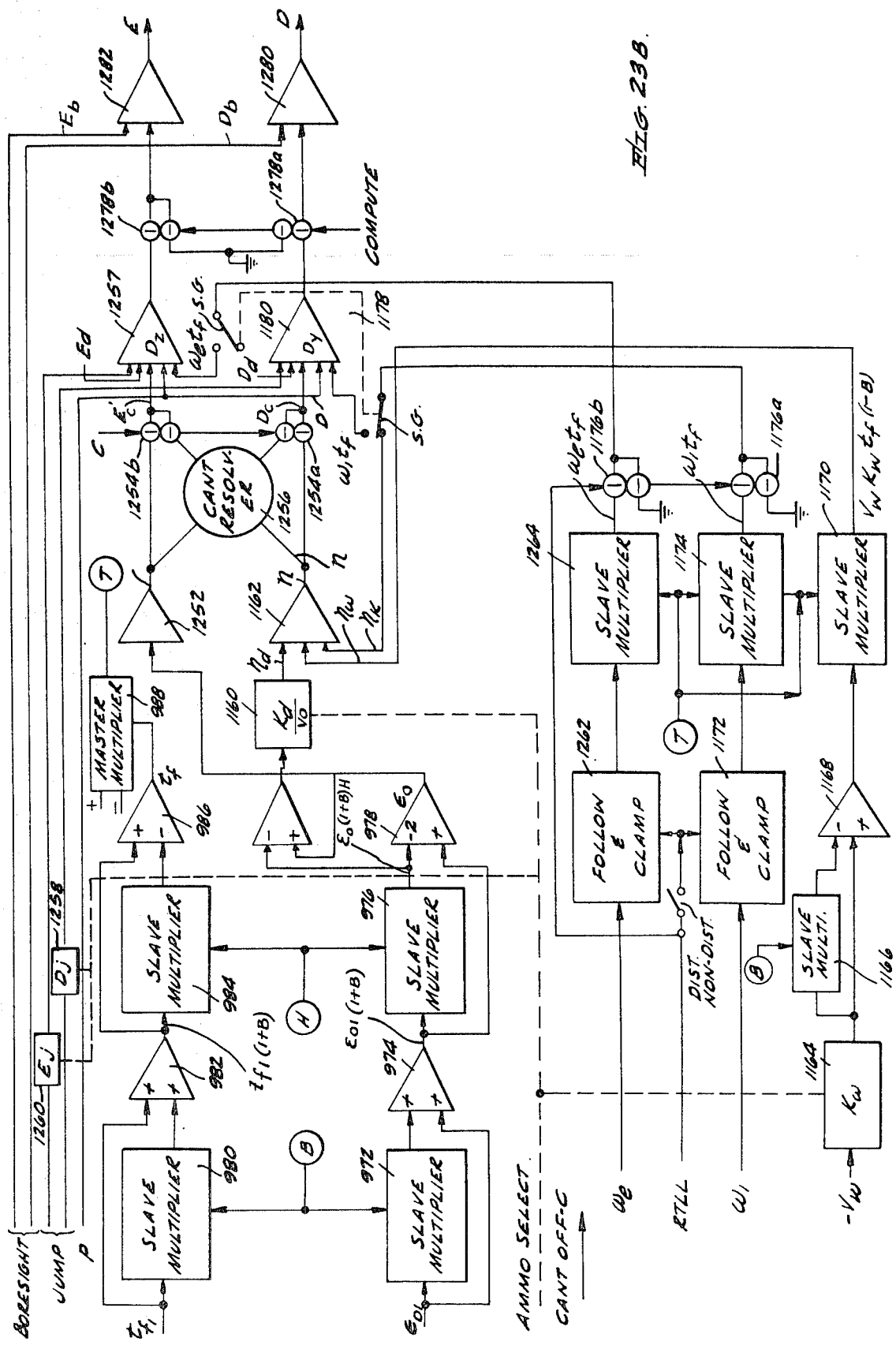
FIG. 23B is a schematic and circuit block diagram of a second portion of the computer system in accordance with the invention.

The simplest coordinate transformation for the unit 1256 of FIG. 23B may be obtained from a single resolution through a cant resolver 671 as shown in FIG. 18A, where C is the roll or cant angle of the turret (shown previously in FIG. 16A) and the equations are:

$$D_c = \eta \cos C + \epsilon \sin C$$

$$E_c = -\eta \sin C + \epsilon \cos C$$

This has been the most frequently employed scheme in the past because the cant sensor is easily installed in the turret and because most engagements occurred with the target nearly coaltitude with the gun.

A more exact transformation is obtained from a single resolution through a gun roll resolver 673 as shown in FIG. 18B, where $\Phi_g$ is the gun roll angle (also shown previously in FIG. 16A) and the equations are:

$$D_c = \eta \cos \Phi_g + \epsilon \sin \Phi_g$$

$$E_c = -\eta \sin \Phi_g + \epsilon \cos \Phi_g$$

In this case the angle sensor is installed on the gun rather than the turret. The gun roll transformation is more exact than the cant transformation for all vehicle or platform attitudes and for nearly coaltitude targets.

For the general case against noncoaltitude targets, it becomes necessary to compensate for the difference in altitudes. FIG. 18C shows a transformation means where the angle $\epsilon$ is passed through amplifiers 670 and 672 to form proportional quantities $k_1\epsilon$, and $k_2\epsilon$, respectively, where $k_1$ and $k_2$ are constants.

These are then passed through a resolver 677 which transforms said proportional quantities through an angle $(\Theta_g - k)$ where $\Theta_g$ is the gun vertical angle above horizontal and $k$ is a constant. The output quantity on lead 666 is $k_1\epsilon \cos (\Theta_g - k) + k_{2a}\epsilon \sin (\Theta_g - k)$. Also, the quantity $\eta$ is passed through another $\eta_g - k$ resolver 674 to form the quantity on a lead 680 which is $\eta \cos (\Theta_g - k)$. Finally, the outputs of 666 and 680 are transformed through a gun roll resolver 675, as described above relative to FIG. 18B, to form the quantities $D_c$ and $E_c$. The equations are:

$$D_c = \eta \cos \Phi_g \cos (\Theta_g - k) + \epsilon \sin \Phi_g [k_1 \cos(\Theta_g \mathbf{by} l k)$$
$$+ k_2 \sin(\Theta_g \mathbf{bh} l k)]$$

$$E_c = \eta \sin \Phi_g \cos (\Theta_g - k) + \epsilon \cos \Theta_g [k_1 \cos(\Theta_g \mathbf{by} l k)$$
$$+ k_2 \sin(\Theta_g \mathbf{bh} l k)]$$

The two angles $\Theta_g$ and $\Phi_g$ are obtained through use of a two axis pendulum or a vertical gyro 676 mounted on the gun with outer axis measuring gun roll $\Phi_g$, and inner axis measuring gun vertical elevation angle $\Theta_g$. The resolution through $(\Theta_g - k)$ may be obtained by offsetting the inner axis resolvers 677 and 674 through $k$ degrees. Note, an alternate means, using only one $\Theta_g - k$ resolver 677, would be to transform $\epsilon$ through $\Theta_g - k$ as described above and then form $\eta^*$, equivalent to quantity on the lead 680, according to the equation $$\eta^* = \frac{-K_d}{V_0} \epsilon^*$$

where $\epsilon^*$ is the transformed value of $\epsilon$.

Referring again to FIG. 17, the outputs of the coordinate converter are then summed with droop, parallax, jump and zeroing and boresight corrections to form the total elevation and deflection angles by which the gun line should be displaced from the line-of-sight:

$$D = D_c + D_d + D_p + D_j + D_b$$

$$E = E_c + E_d + E_p + E_j + E_b$$

A less complex system is often more desirable than the more accurate full solution system discussed above, because such factors as limited space available for the installation of the system and cost must be considered by any designer of a tank fire control system. But it is one of the features in accordance with the principles of the invention that this improved system, while significantly decreasing its own mechanization complexity, has not detracted noticeably from its performance. This feature results from a diligent approach in applying the techniques of approximations discussed above. Certain independent variables do not, in fact, require additional mechanization other than their initial implementation into the computer. The independent variables of mass $m$ and diameter $d$ of the projectile are nearly constant because of good manufacturing techniques. The independent variable of gravity $g$ is nearly constant at most locations. Finally, the independent variable of range rate $\dot{R}$ is considered negligible because it has been difficult to obtain, although future systems may very well include range rate sensors which produce this term for mechanization. Since these four independent variables are constants in this simplified system, their respective partials are equal to zero.

Further simplification results from the use of approximate equations for the elevation and azimuth lead angles. These approximate equations result from the following assumptions with the applicable equation being written below the assumption:

1. The wind velocity in the X and $\mathcal{Z}$ direction may be ignored, i.e., $$(\dot{X}_w = \dot{Z}_w = 0), \text{ hence } \epsilon_w = 0.$$

2. The coefficient N appearing in the ballistic azimuth lead angle $\eta_{o(s)}$ equation equals 2 (i.e. N=2) as is most frequently true.

$$\eta_{0(s)} = -\frac{K_d}{V_o} \epsilon_{0(s)}$$

3. The azimuth lead angle due to wind $\eta_w$, may be approximated by the equation $\eta_w \approx K_w t_f V_w$ (where $V_w \overset{\Delta}{\approx} \dot{Y}_w$).

4. The azimuth lead angle due to target velocity $\eta_k$, and the elevation lead angle due to target velocity $\epsilon_k$, are approximated in the turret coordinate system rather than the earth local level system because it is easier to measure azimuth angular rotation $\omega_1$ or $\omega_{AZ}$ and elevation angular rotation $\omega_e$ or $\omega_{EL}$ of the gun or sight.

$$\eta_k \rightarrow D_k = \omega t_f$$

$$\epsilon_k \rightarrow E_k = \omega t_f$$

From these approximations and the other equations it is possible to solve for the gun and turret motion (in the earth local level coordinate system) in terms of the nonstandard conditions of a change in initial velocity $\Delta V_o$, and a change in atmospheric conditions $\Delta R_n$. It is noted here that $\Delta V_o$ is a function of the grain temperature $T_g$ in the shell and of the effective full charge, while $\Delta R_n$ is primarily a function of air temperature $T_a$ and air pressure P. The application of the second approximation technique, referred to as the "in line partial" technique, in conjunction with one of the resolving techniques is used in calculating the desired quantities of total azimuth and elevation lead angles D and E. The equations are listed below:

Time of Flight $$t_f(s) = \frac{R_n}{V_0} (e^{(B/R_n)} - 1)$$

$$t_{(1)} = \frac{R_n}{V_0} \left[ e^{(R/R_n)} \left(1 - \frac{\Delta R_n}{R_n}\right) - 1 \right]$$

$$t_f = t_{f(1)} \left[ \left(1 - \frac{\Delta V_0}{V_0}\right) \left(1 + \frac{\Delta R_n}{R_n}\right) \right]$$

Elevation Lead Angles $$\epsilon_{0(s)} = \left(\frac{gR_n}{2V_0^2}\right)\left(\frac{e^{2(R\ R_n)}-1}{2(R/R_n)}-1\right)$$

$$\epsilon_{0(1)} = \left(\frac{gR_n}{2V_0^2}\right)\left[\frac{e^{2(R\ R_n)}(1-\Delta R_n/R_n)-1}{2(R/R_n)(1-\Delta R_n/R_n)}-1\right]$$

$$\epsilon_0 = \epsilon_{0(1)}\left[\left(1-2\frac{\Delta V_0}{V_0}\right)\left(1+\frac{\Delta R_n}{R_n}\right)\right]$$

$$\epsilon_{w(s)} = 0$$

$$E_k = \omega_e t_f$$

$$E_b = B_e$$

$$E_j = J_{ae} + K_{ae} Z_e$$

$$E_p = Dz\left(\frac{1}{R_b}-\frac{1}{R}\right)$$

$$E_d = E_d(d_e)$$

Azimuth Lead Angle $$\eta_0 = -\frac{K_d}{V_0}\left[\epsilon_0 - \epsilon_{01}\left(1+\frac{\Delta R_n}{R_n}\right)\frac{\Delta V_0}{V_0}\right]$$

$$\eta_w \approx K_w t_f V_w$$

$$D_k = \omega_1 t_f$$

$$D_b = B_d$$

$$D_p = D_y\left(\frac{1}{R}-\frac{1}{R_b}\right)$$

$$D_d = D_d(d_d)$$

The quantities $\epsilon_o$ and $(\eta_o + \eta_\omega)$ which represent $\epsilon$ and $\eta$ in the generalized equations, are then resolved into a particular tank coordinate system as previously discussed. In this case the respect to the cant angle C because of the simplicity in measuring the cant angle C.

$$E_c = \epsilon_o \cos C - (\eta_o\ \eta_\omega) \sin C$$

$$D_c = \epsilon_o \sin C + (\eta_o\ \eta_\omega) \sin C$$

After resolution the various angles are summed to provide D and E.

$$D = D_c + D_k + D_p + D_j + D_b + D_d$$

$$E = E_c + E_k + E_p + E_j + E_b + E_d$$

Figure 19:
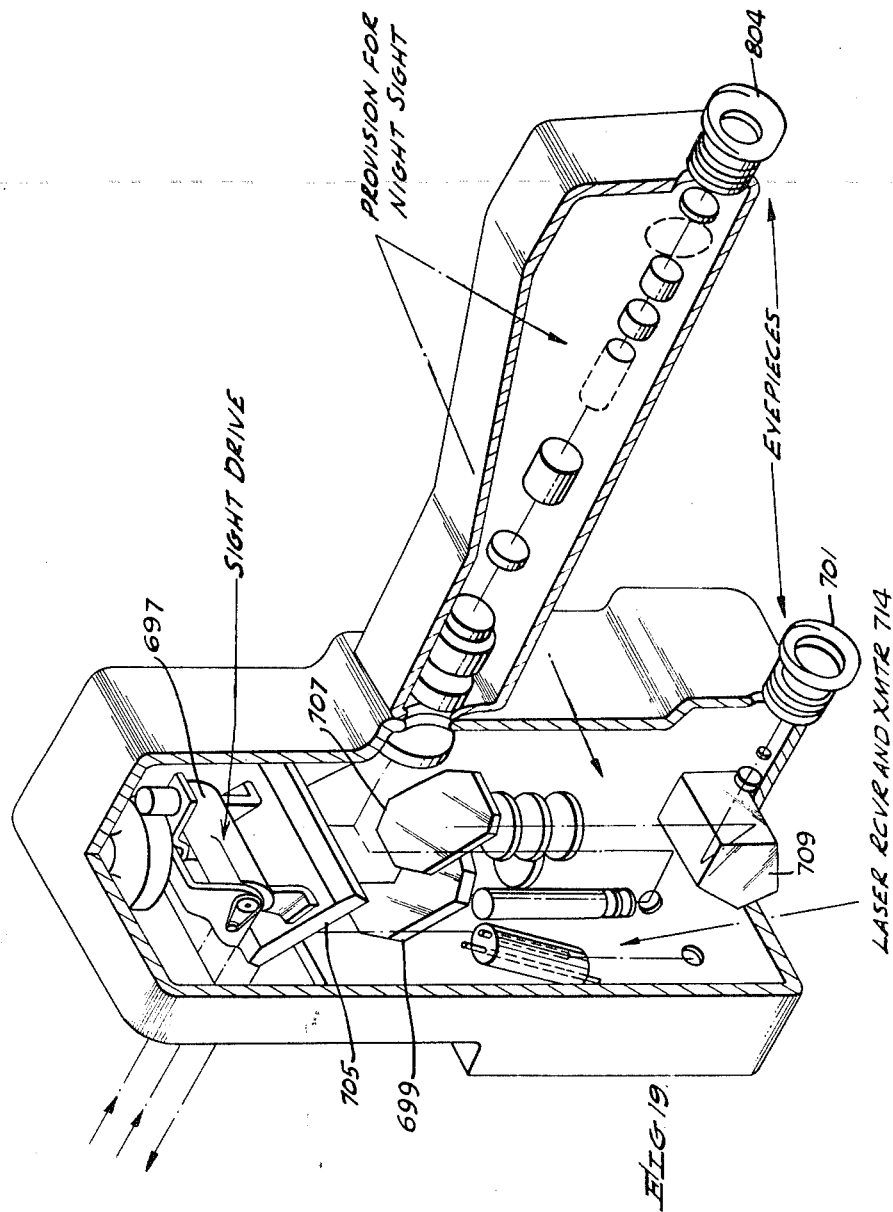
FIG. 19 is a perspective drawing of a range finder and sight combination that may be utilized in the system in accordance with the invention.

FIG. 19 shows a perspective drawing of an optical sight that may be utilized in the optical sight unit 36 of FIG. 2. In the system of the invention, the laser range finder and the sight system are combined to be colinear with each other. In one sighting arrangement eyepieces 701 and 804 are provided respectively for the tank operator and for the gunner with the line of sight from the eyepiece 804 passing through suitable lens arrangements which may include a prism and night or infrared sight (not shown) and additional lens arrangement which passes into a beam splitter 699 and to the mirror 705. Thus light is reflected from the mirror 705 along the sight axis and passes through the beam splitter 699 to the eyepiece 804. Light also entering and reflected from the mirror 705 is passed through a lens system 707 into a prism 709 and out of the eyepiece 701. A laser receiver and transmitter 714 applies a pulse of light to the beam splitter 699 and to the mirror 705 which is transmitted into space colinear with the light entering and passing into the eyepieces 701 and 804. A suitable mirror drive 697 is provided for moving the mirror 707 in both azimuth and elevation. The reticle may be provided on the surface of the mirror 707 or at any suitable position in the optical path.

Figure 20:
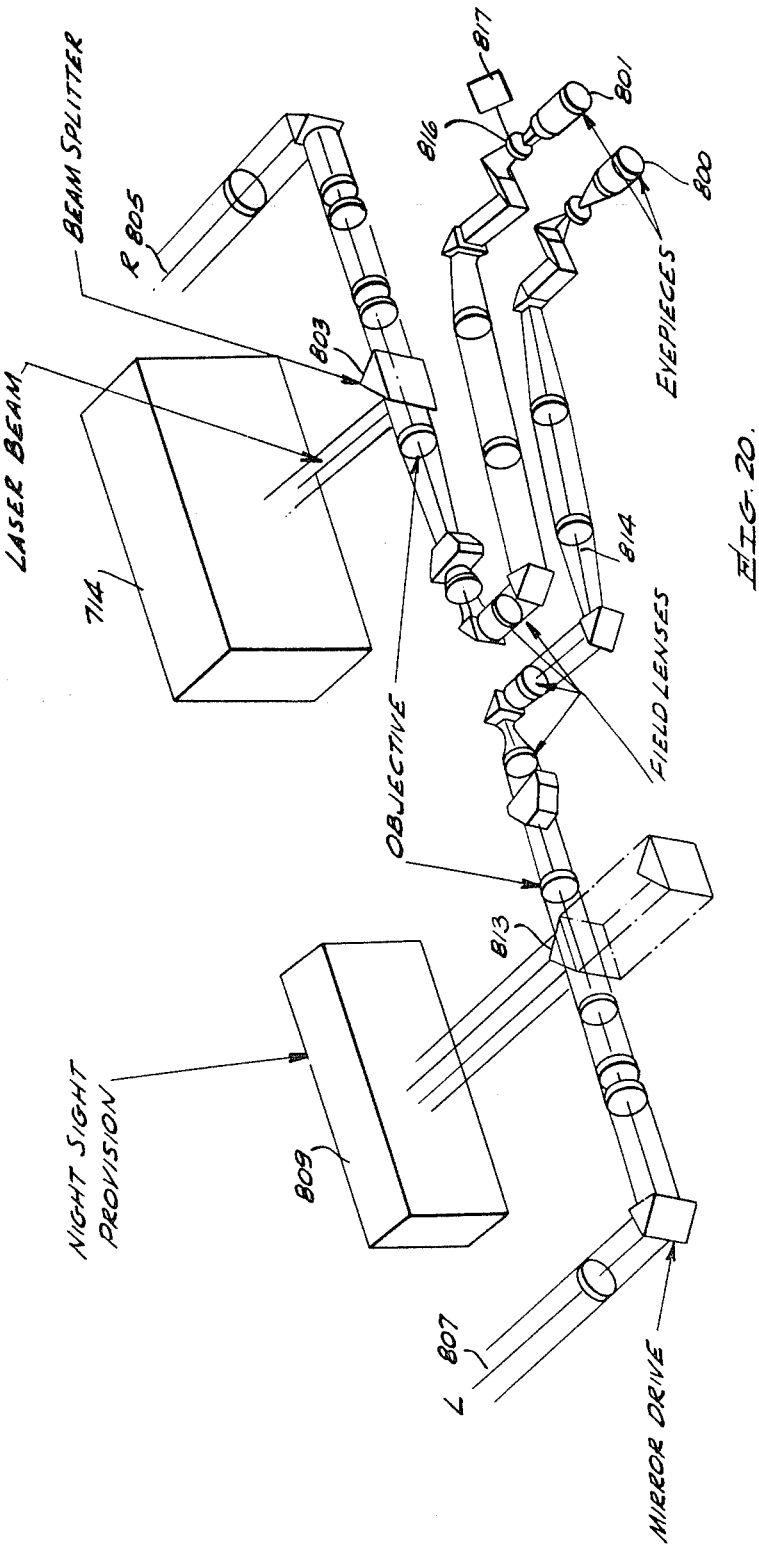
FIG. 20 is a perspective drawing of a sight and laser range finder arrangement operable in a stereoscopic manner in accordance with the principles of the invention.

Referring now to FIG. 20, another sight arrangement in accordance with the principles of the invention is a stereo sight for providing highly reliable optical or target discrimination. Eyepieces 800 and 801 for the gunner provide an optical path for responding to light from both the right and left input paths 805 and 807. Suitable lens and prisms such as 814 are provided for directing the light as required. A beam splitter 803 is provided in the right light path for responding to pulses or coherent light from the laser in the transmitter and receiver 714 and applying the light into space along the axis 805. In this type of arrangement, the beam splitter in the light path functions to reflect the laser beam to or from the laser transmitter and receiver 714, while letting daylight go through and reach the right eyepiece 801 of the gunner. On the left side, a provision for a night sight unit 809 is provided with a suitable beam splitter 813 coupled in the light path 807. The night sight unit may be of any conventional infrared type, such as described in U.S. Pat. No. 2,989,643. The principles of the invention are equally applicable for systems utilizing night sight or utilizing only normal sighting. A prism 813 is out of the light path in normal vision and is inserted in the path during operation by the night sight 809. This prism 813 deflects the light beam toward an element converting the IR beam (infrared) into visible light which is then forwarded through the optical path of the lens 814 to the left eyepiece 800. A driven reticle 816 may be provided responsive to a controlled drive structure 817.

Figure 21:
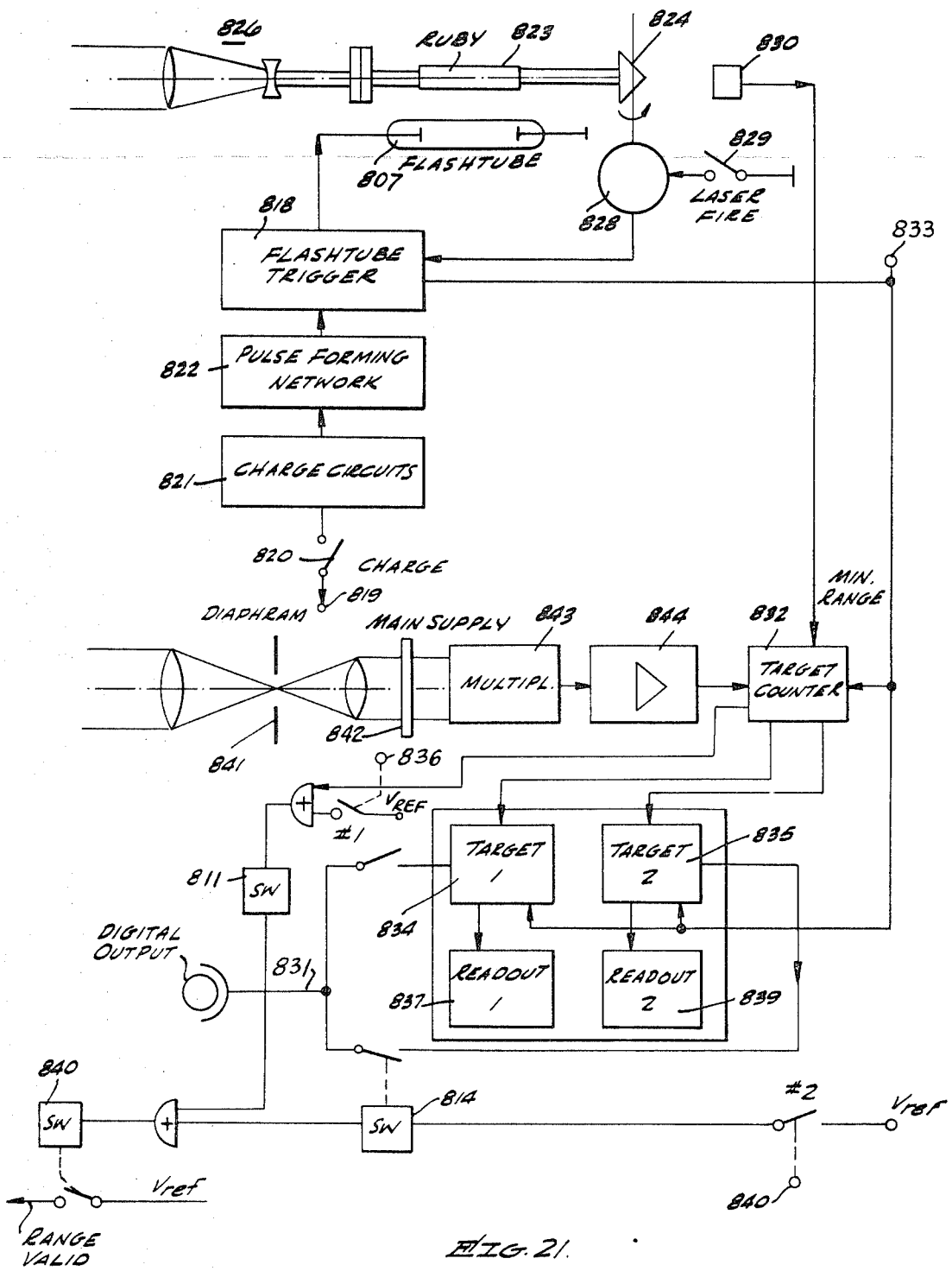
FIG. 21 is a schematic circuit and block diagram of the laser range finder that may be utilized in the system of FIG. 1.

Referring now to FIG. 21, the laser range finder 56 of a type that may be utilized in the system of the invention will be explained. A flash tube 807 is fired in response to a flash tube trigger circuit 818 which is charged from a main supply terminal 819 and a switch 820 through a suitable charge circuit 821 and pulse forming network 822. A suitably ruby 823, as is well known in the art, is lased in response to a Q-switch 824 to transmit a pulse of coherent light through an optical system 826 into space. A motor 828 responds to a laser fire switch 829 to rotate or suitably vary the Q-switch 824 for transmitting the pulse of energy as well known in the art. Upon firing, a range trigger 830 responds to control a target counter 832 which starts counting in response to a clock source (not shown). A reset pulse is applied from the trigger 818 through a line 833 to the target counter and to target storage units 834 and 835 upon firing the flash tube. Readout units 837 and 839 may be provided. Upon reflection of the pulse of energy from a target, the light is received in an optical system 841, applied through a filter 842 to a multiplier 843 and through an amplifier 844 to the target counter 832, which includes a range counter for transferring the count thereof to unit 834 so as to represent range. Suitable range gating may be provided to eliminate noise if desired. The count or contents of the counter 832 is transferred to the target storage registers 834, 835 through suitable gating (not shown). In response to a first target condition passing a signal from the target counter 832 to the OR gate or to switches 811 or 814, the binary range is applied to a composite lead 831. The switches 811 and 814 may be respectively energized by manual switch units 836 and 840. In response to either the switches 811 or 814 a switch 840 is energized to apply a range valid signal to the computer.

Referring now to FIG. 22, the sensor units and control units utilized in the system of the invention will be further explained. A DC power source 842 of FIG. 22A applies DC power to the system such as to range potentiometer 853 as well as to a reference AC (alternating current) source 848 for use in the laser ranger and throughout the system operation. A power-on switch 849 may be arranged with the DC power source 842 for energizing the fire control system. The laser ranger circuit 56 provides a digital range signal to a digital to analog converter 850 which provides an analog range signal to a switch 852 manually operable between automatic range information and manual entry range information. A manual range potentiometer 853 may be utilized to provide the manual range information R to the computer system. The converter 850 and the manual range potentiometer 853 both respond to AC reference energy from the AC power source 848 which, for example, may be at 400 Hertz. For one mode of operation where a cant signal is to be utilized to compute the angle of firing, cant being similar to roll along the longitudinal axis of the vehicle, a cant switch 855 having a normal position and a cant off position, is coupled to a lead 856 for controlling a switch at the output of the cant resolver as will be explained subsequently. An ammo select switch 857, which, for example, may have four positions, is provided to control system parameters as a function of the ammunition manually selected. An angular elevation rate signal $\omega_e$, which may be an AC signal, is provided from a sensing unit 858 which may include a tachometer or a rate gyro, for example. An atmospheric pressure signal $\Delta P/P$ may be provided by a pressure sensor 859 mounted on the outside of the tank, for example, and which may include a resistance bridge network as is well known in the art. An air temperature signal $\Delta T_a/T_a$ may be developed by a temperature sensor unit 860 which may include a thermistor temperature sensor bridge. For providing a term representative of the grain temperature of the ammunition powder utilized, a thermistor bridge in a dummy shell 861 may be provided by a suitable unit 862 to develop a signal $\Delta T_g/T_g$. To provide a parameter EFC which represents the effective full charge for the particular tube or gun, an effective full charge circuit 863 is provided as will be explained subsequently. The effective full charge signal represents the ballistic effect provided by tube or gun wear and by different tube wear conditions. A signal $\omega_1$, which represents the azimuth rate of angular movement is provided by a unit 864 which may include either a tachometer or a rate gyro, for example. The signal $\omega_1$, which is a measure of turret rate movement in the azimuth dimension represents the angular rate in the plane of the sight line and the elevation axis. For determining crosswind mass flow $V_w$, a crosswind sensor 866 is provided and may include a pitot tube of a type as is well known in the art. A pitot tube with a thermistor pair measuring $T_1$ and $T_2$ respectively is installed normal to the gun barrel in order to obtain only the crosswind component of the wind vector. The mass flow of the wind is proportional to the change in temperature between $T_1$ and $T_2$. A switch 867 is coupled between the crosswind sensor 359 and a manual switch potentiometer 868 to manually select either the automatic value $V_w$ or a manual value entered through the potentiometer 868 by moving the arm 869 along a potentiometer resistor 870 in response to a switch 871. For providing a compute signal to energize the computer, a boresight switch 872 and a laser range switch 873 are coupled in series. The switch 872 is manually movable between normal operation and boresight operation and the laser range switch 873 is manually movable between a first terminal responsive on a lead 875 to the range valid signal and to a second terminal responsive to a power on signal from the power switch 849. A Rt.LL signal from the manual control unit is provided to the system for selecting or for determining angular rate as will be described subsequently.

For determining droop of the gun barrel or tube in both the azimuth and elevation, droop calculator detecting unit 874,875 of FIG. 22B provides signals $E_d$ and $E_e$ to the system as will be described subsequently, both units being responsive to the AC reference signals. Droop may be measured by four strain guages on the gun tube and suitable scaling circuits. For boresighting the system and providing manual entries $B_e$ and $B_d$ of FIG. 22C, manual potentiometers 876 and 877 are provided.

In order to compensate for gun jump or upward moving of the barrel upon firing as is well known in the art, the system provides a jump signal as a function of selected ammunition in accordance with the principles of the invention. Jump determining circuits 878 and of FIG. 22O are provided respectively in the azimuth and elevation dimensions for developing the required correction signals $D_j$ and $E_j$. The ammo select signal is applied in the unit 878 to switches 880 and 881, each of which is movable to four contact terminals coupled to four resistors, in turn connected to suitable voltage reference sources. A unit 884 is provided to respond to the ammo select signal and provide mechanical motion to the switches 880 and 881, for example. A jump potentiometer switch 405 is movable along a potentiometer 881 for adjusting the system when different ammunition types are provided. The dump determining unit 879 is similar to the unit 878 and will not be explained in further detail.

Referring now to an embodiment of the ballistics computer 950 in more detail, reference is made to FIGS. 23A and 23B, wherein range information R and nonstandard condition information are fed into a computer which generates a ballistic superelevation signal $\epsilon_0$, a time of flight signal $t_f$, a ballistic drift signal $\eta_0$, and a crosswind coefficient $\eta_w$, in accordance with ballistic equations, whereupon these signals are used for generating fire control signals such as elevation E and deflection D.

Once the range is known, the ballistic characteristics of the projectile and environmental conditions must be known in order to generate fire control signals in accordance with the ballistic equations. For example, it is desirable to know the effects of the projectile's mass, initial velocity, shape, size, spin velocity, the air density, air temperature, air pressure, crosswind, propellant temperature, angular turret rate, etc.

Since many of the ballistic characteristics will differ for different projectiles, or ammunitions, the resulting signals such as superelevation $\epsilon_0$, time of flight $t_f$, ballistic drift $\eta_0$, and crosswind coefficient $k_w$ will also differ for each projectile.

It has been discovered that the nonlinear equations of ballistic flight from which standard condition superelevation $\epsilon_0(s)$ and standard condition time of flight $t_f(s)$ are derived can be produced for a plurality of projectiles by a first variable multiplier 954 which multiplies the range signal R by an individual ballistic term $1/R_n$ for each individual projectile; function generating circuits 956 and 958 for generating the functions $f_\epsilon(R/R_n)$ and $f_t(B/B_n)$, respectively, which are related to a plurality of the projectiles; and variable multipliers 960 and 962 for multiplying the functions by second ballistic terms $\epsilon_{n(s)}$ and $t_{n(s)}$, which are related to each particular projectile. It should be stated that the ballistic terms $R_n$, $\epsilon_n$, and $t_n$ can be considered constants for set of standard conditions.

For example, the equation for ballistic superelevation at standard conditions $\epsilon_o(s)$ which is the angle by which the projector (such as a gun) is pointed above the line of sight to a target is:

$$\epsilon_{o(s)} = \frac{gR_n}{2V_o^2} \frac{e^{2R/R_n}}{2R/R_n} - 1 \qquad (1)$$

and the equation for standard conditions time of flight $t_f(s)$ of the projectile is:

$$t_{f(s)} = \frac{R_n}{V_o} e^{R/R_n} - 1 \qquad (2)$$

where
R = range $$R_n = \frac{K_{nm} T_a^{3/2}}{d^2 P_a (T_a^{1/2} - K_t)}$$

P = air pressure
d = projectile diameter
m = projectile mass
$V_o$ = projectile initial velocity
$K_n$ = projectile ballistic constant
$T_a$ = air temperature
$K_t$ = temperature coefficient
g = gravity Ballistic drift $\eta_o$ for standard conditions is proportional to ballistic superelevation $\epsilon_o$ according to the following equation:

$$\eta_0 = \frac{-K_d \epsilon_0}{V_0} \qquad (3a)$$

where $k_d$ is a term, dependent upon projectile inertia, spin velocity, and lift and moment coefficients, which may be determined for each ammunition. The crosswind coefficient $N_w$ for standard conditions is found by $$\eta_w = V_w K_w \cdot t_f \quad (3b)$$

where $K_w$ is an ammunition dependent coefficient.

As previously stated, it has been determined that signals which are a function of the ballistics equations can be produced by circuits which operate on the range information R in accordance with ballistic terms and normalized functions.

For example, ballistic superelevation $\epsilon_0$ is produced by a circuit which operates on a range signal R in accordance with the following equation:

$$\epsilon_0 = \epsilon_n \left( \frac{e^{2(R/R_n)} - 1}{2(R/R_n)} - 1 \right) = \epsilon_n f_\epsilon(R/R_n) \quad (4)$$

where $$\epsilon_n = \frac{gR_n}{2V_0^2} \quad (5)$$

$$R_n = \frac{K_{nm} T_a^{3/2}}{d^2 P(T_a^{1/2} - K_t)} \quad (6)$$

A signal related to time of flight $t_f$, for standard conditions is produced by a circuit which operates on a range signal R in accordance with the following equation:

$$t_f = t_n \, e^{(R/R_n)} - 1 = t_n f_t (R/R_n) \quad (7)$$

where $$t_n = \frac{R_n}{V_0} \quad (8)$$

From these equations, it can be seen that, in implementing the circuits, $R_n$, $\epsilon_n$, and $t_n$ are terms which are related to the particular projectile or ammunition and condition, and can be treated as constants for any fixed set of standard conditions, while $f_\epsilon(R/R_n)$ and $f_t(R/R_n)$ are functions which are independent of the projectile and condition or, in other words, which are applicable to all of the projectiles. The advantage of this is that only one function generator need be mechanized for a plurality of the projectiles and that nonstandard conditions signals can be applied to the computer outside of the function generator, as will now be explained.

Referring now to the block diagram of FIG. 23A in more detail, the range signal R is first normalized by multiplying by a standard condition term $1/R_n(s)$ using a ballistics constant multiplier circuit 954, which is hereinafter also referred to as ballistic term multiplier, and which is adjustable for each ammunition.

As will be explained in more detail subsequently, the normalizing term $1/R_{n(s)}$ is corrected for changes $\Delta R_n$ resulting from variations in air pressure $\Delta P$ and changes in air temperature $\Delta T_A$ by multiplying the term by an inline partial multiplication factor $(1-B)$ where:

$$B = \frac{\Delta R_n}{R_{n(s)}}$$

Consequently, the equation for superelevation, $\epsilon_1$ and time of flight $t_{f1}$ partially corrected for nonstandard conditions become:

$$\epsilon_1 = \epsilon_{0(s)}(1 - B)$$

$$\epsilon_1 = \left( \frac{gR_{n(s)}}{2V_{0(s)}^2} \right) \left[ \frac{e^{2(R/R_{n(s)})\left(1 - \frac{\Delta R_n}{R_{n(s)}}\right)} - 1}{2(R/R_{n(s)})\left(1 - \frac{\Delta R_n}{R_{n(s)}}\right)} - 1 \right]$$

$$t_{f1} = \frac{R_{n(s)}}{V_{0(s)}} \left[ e^{(R/R_{n(s)})}\left(1 - \frac{\Delta R_n}{R_n}\right) - 1 \right]$$

As previously stated, the normalizing term $1/R_n$ is inversely proportional to a function of air temperature $T_A$ and proportional to air pressure P whereupon the factor $\Delta R_n$ can be produced by the portion of the circuit of FIG. 23A which includes a summing amplifier 940. The summing amplifier 940 receives the sensed air temperature input signal $\Delta T_A/T_{A(s)}$ at one input and multiplies it by a temperature constant K. The summing amplifier 940 also receives the sensed air pressure input signal $\Delta P/Ps$ at a second input terminal. These signals are summed and the output signal B of the amplifier 940 then becomes:

$$B = \frac{\Delta R_n}{R_{n(s)}}$$

$$= \frac{\Delta P}{P_{(s)}} - K \frac{\Delta T_A}{T_{A(s)}}$$

As will be explained in more detail subsequently with reference to FIGS. 23A and 23B, the superelevation signal $\epsilon_1$ and the time of flight signal $t_{f1}$ are fully corrected for nonstandard conditions by further multiplying them by the inline partial multiplication factors $(1+B)$ and $(1-KH)$ which are respectively dependent upon variations in the normalizing term $1/R_n$ as a result of variations in air temperature $\Delta T_A$ and air pressure $\Delta P$ and dependent upon variations in initial velocity $\Delta V_0$ as a result of variations in a function of effective full charge EFC and variation in propellant grain temperature $\Delta T_g$.

The partially corrected superelevation signal $\epsilon_1$ is thus further corrected for nonstandard conditions and is identified by the equation:

$$\epsilon = \epsilon_1 (1+B)(1-2H)$$

$$= \epsilon_1 \left(1 + \frac{\Delta R_n}{R_{n(s)}}\right) \left(1 - 2\frac{\Delta V_0}{V_0}\right)$$

$$B = \frac{\Delta R_n}{R_{n(s)}}$$

The partially corrected time of flight signal $t_{f1}$ is further corrected for nonstandard conditions and becomes:

$$t_f = t_{f1}(1+B)(1-H)$$

$$= t_{f1} \left(1 + \frac{\Delta R_n}{R_{n(s)}}\right) \left(1 - \frac{\Delta V_0}{V_0}\right)$$

The factor H can be produced by the circuit of FIG. 23A wherein a sensed propellant grain temperature signal $\Delta T_g T_{g(s)}$ is received by an adjustable ballistic term multiplier 942, multiplied by a separate ballistic term $K_g$ for each selected ammunition, and is then fed to one input of summing amplifier 948. An effective full charge signal EFC is received by an adjustable ballistic term multiplier 944, is multiplied by a separate ballistic term $K_e$ for each selected ammunition, and is fed through a function generator 946. The function generator 946 can be a two or more straight line approximation function generator of a type to be described in more detail subsequent for producing an output signal $f(K_e \cdot EFC)$ which is fed to another input of the summing amplifier 948. The resulting output signal with a sign conversion occurring in amplifier 948, is the factor H where:

$$H = \frac{\Delta V_0}{V_{0(s)}}$$

$$= f(K_e \cdot EFC) - K_g \frac{\Delta T_g}{T_{g(s)}}$$

A nonstandard temperature-pressure coefficient signal B, which is to be applied to the standard condition normalized range signal $R/R_{n(s)}$ is produced by a master multiplier 964 in response to air temperature and pressure sensor inputs $\Delta T/T_{A(s)}$ and $\Delta P/P_{(s)}$. The standard condition normalized range signal $R/R_{n(s)}$, when fed through a slave multiplier 966, is multiplied by the pressure-temperature coefficient B to produce an output signal $R/R_{n(s)}$ which is fed to an inverting input of an operational amplifier 968. The signal $R/R_{n(s)}$ is also fed directly to a noninverting input of the operational amplifier 968 to produce an output signal:

$$R/R_{n(s)}(1-B) = R/R_n$$

where $R/R_{n(s)}$ is the normalized range signal for standard conditions; and $R/R_n$ is the normalized range signal for nonstandard pressure-temperature conditions; and $$B = \frac{\Delta P}{P_{(s)}} - \frac{K_t \Delta T_A}{T_{A(s)}}$$

$\Delta P$ is the change in air pressure from a standard condition pressure;

$P_{(s)}$ is the standard condition air pressure;

$K_t$ is a temperature coefficient;

$\Delta T_A$ is the change in air temperature from a standard condition air temperature; and $T_{A(s)}$ is the standard condition air temperature.

The normalized range signal $R/R_n$ is then fed to function generators 956 and 958 which are connected in parallel circuit relationship to produce ballistic function output signals $f_e(R/R_n)$ and $f_t(R/R_n)$, respectively. These function output signals are then fed to ballistic constant multipliers 960 and 962 respectively, which are hereinafter also referred to as ballistic term multiplier, and which multiply them by the standard condition ballistic terms $\epsilon_{n(s)}$ and $t_{n(s)}$, respectively. Consequently, the output signal $\epsilon_{n(s)} f_e(R/R_n)$ of the ballistic constant multiplier 960 is related to the superelevation $\epsilon_1$ for the particular projectile at the particular range R in accordance with the preceding ballistic equation which is partially corrected for nonstandard temperature-pressure conditions. The output signal $t_{n(s)} f_t(R/R_n)$ of the ballistic constant multiplier 962 is related to the time of flight $t_{f1}$ of the selected projectile at the particular range R in accordance with the preceding equation for time of flight $t_f$ (Equation 7), which is partially corrected for nonstandard temperature-pressure conditions.

Referring still to FIG. 23A, a master multiplier 970 receives grain temperature and effective full charge sensor input signals $\Delta T_g/T_{g(s)}$ and EFC for producing, as previously discussed a muzzle velocity coefficient H which, along with the temperature pressure coefficient B is applied to correct the partially corrected superelevation $\epsilon_1$ and time of flight $t_{f1}$ signals by means of the circuit illustrated in FIG. 23B. The partially corrected superelevation signal $\epsilon_{01}$ is fed through a first slave multiplier 972 wherein it is multiplied by the temperature-pressure coefficient B to produce an output signal which is fed to an input of an operational amplifier 974. The partially corrected superelevation signal $\epsilon_{01}$ is also fed directly to another input of the operational amplifier 974, whereupon the output signal thereof becomes $\epsilon_{01}(1+B)$. This signal is then fed through a second slave multiplier 976 wherein it is multiplied by the muzzle velocity coefficient H to produce a signal $\epsilon_o(1+B)H$ which is fed to an input terminal of the operational amplifier 978 to invert and amplify the input signal by a factor $-2$. The signal $\epsilon_{01}(1+B)$ is also fed directly to another input of the operational amplifier 978, whereupon the operational amplifier produces a superelevation output signal $\epsilon_o$ which is corrected for nonstandard conditions where:

$$\epsilon_0 = \epsilon_{01}(1+B)(1-2H)$$

$$H = \frac{\Delta V_0}{V_{0(s)}}$$

$$= f(K_e \cdot EFC) + \frac{\Delta T_g}{T_{g(s)}} \cdot K_g$$

where $f(k_e EFC)$ is a function of effective full charge for a selected ammunition;

$\Delta T_g$ = change in propellant grain temperatures from standard value;

$T_{g(s)}$ = standard condition propellant grain temperature;

$K_g$ = a temperature coefficient for a selected ammunition.

The partially corrected time of flight signal $t_{f1}$ is fed through a first slave multiplier 980 wherein it is multiplied by the temperature pressure coefficient B to produce an output signal $t_{f1}B$ which is fed to one input of an operational amplifier 982. The partially corrected time of flight signal $t_{f1}$ is also fed directly to another input of the operational amplifier 982 wherein the further corrected time of flight output signal $t_{f1}(1+\alpha\lambda_n)$ is produced. This further corrected time of flight signal is fed through a second slave multiplier 984 wherein it is multiplied by the muzzle velocity coefficient H to produce a signal $t_{f1}(1+B)H$ which is fed to an inverting input of an operational amplifier 986. The further corrected time of flight signal $t_{f1}(1+B)$ is also fed directly to another input of the operational amplifier 986 which produces a nonstandard condition time of flight output signal $t_f$ where:

$$t_f = t_{f1}(1+B)(1-H)$$

This time of flight signal $t_f$ is fed to a master multiplier 988 for use as a time of flight multiplier signal T, as will be explained in more detail shortly.

The computer also generates a parallax correction signal $p$ to compensate for the offset distance at the turret between the line of sight and the gun line. The range signal R is fed to a function generator 990 and a rectifier 992. As will be explained in more detail subsequently, the output of the rectifier is fed to a break point selector 994 which determines the gain slope and offset of the function generator 990 for producing a parallax correction output signal $p$ at the range R where:

$$p = \frac{1}{R} - \frac{1}{R_c}$$
$$= (1/R - 1/R_c)$$

R is the measured range;

$R_c$ is a crossover range where line of sight crosses the gun line. The parallax correction output signal $p$ must be multiplied by the correct offset distance between the line of sight and the gun line for each channel, i.e., elevation and deflection.

For parallax elevation corrections:

$$E_p = D_z \cdot p$$
$$= D_z(1/R - 1/R_c)$$

where;

$E_p$ is the parallax correction in elevation.

$D_z$ is a constant offset distance (in elevation) for each tank.

For parallax deflection correction:

$$D_p = D_y \cdot p$$
$$= D_y(1/R - 1/R_c)$$

where:

$D_p$ is the deflection parallax correction;

$D_y$ is a constant offset distance (in deflection) for each tank.

Figure 24:
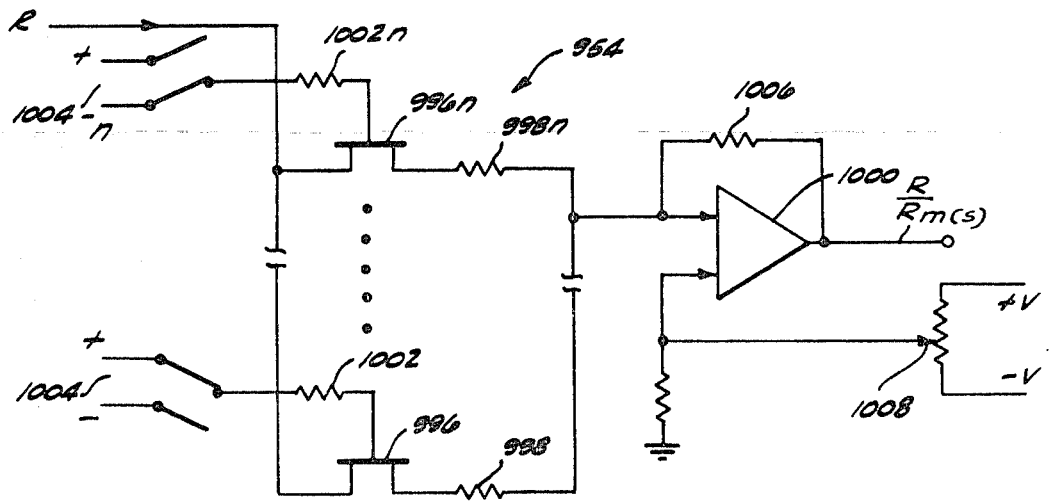
FIG. 24 is a schematic diagram of a ballistic term multiplier in the computer of FIGS. 23A and 23B.

Referring now to the ballistic computer in more detail, the range signal R is fed to the ballistic term multiplier 954, illustrated in FIG. 24 for producing a normalized range signal $R/R_{n(s)}$ for each selected one of a plurality of projectiles. More specifically, the ballistic term multiplier 954 is an operational amplifier having a plurality of $n$ parallel selectable gain set input resistance circuit branches which each include one of a plurality of junction FET transistors 996 through 996n connected in series with one of a plurality of resistors 998a through 998n respectively, the resistance circuit branches being connected to one input of an amplifier 1000. The subscript $n$ represents the circuit elements in the $n$th resistance circuit and is equal to a corresponding number of projectiles. In operation, only one of the junction FET transistors 996 through 996n is turned on by a positive voltage signal +V applied to its gate terminal through a resistor of resistors 1002 through 1002n, respectively, while all other ones of the FETS 956 are turned off by a negative voltage −V applied to the gate terminals thereof through the other ones of respective resistors 1002 through 1002n.

Assume, then, that the projectile or ammunition selected has a ballistic term $1/R_n$, which is set into the ballistic term multiplier 954 by the sum of the series resistances in the circuit branch between the source terminal and drain terminal of FET transistor 996 when it is turned on, and the resistor 998 connected between the FET transistor 996 and one input of the operational amplifier 1000. In operation, an ammunition selection switch 1004 through 1004n is positioned so that a +V voltage is applied through the resistor 1002 to the gate terminal of FET transistor 996 to turn it on while all other FET transistors will have a −V voltage applied to their gate terminals by the switch, such as 956n, and are turned off. The operational amplifier 1000 can be a μA709 High Performance Operational Amplifier, manufactured by Fairchild Semiconductor Corporation and described and illustrated in their handbook, Fairchild Semiconductor Linear Integrated Circuits Applications Handbook, 1967.

The operational amplifier 1000 is compensated for a gain of unity and a feedback resistor 1006 is connected between the output terminal of the operational amplifier 1000 and one input terminal thereof so that the gain of the ballistic term multiplier 954 is proportional to the ratio of the resistance of feedback resistor 1006 and the sum of the resistances between the source terminal and drain terminal of the turned on FET transistor 996 and resistor 998 and can be expressed by the term $1R_{n(s)}$. The received range signal R is multiplied by the ballistic term $1/R_{n(s)}$, whereupon the output signal of the ballistic term multiplier 954 is a normalized range signal $R/R_{n(s)}$ for standard conditions for the selected ammunition.

Any gain resulting from the resistance circuits associated with turned off FET transistors can be disregarded since the resistance between the source and the drain terminal is very high relative to other circuit resistances. The zero offset of operational amplifier 1000 can be set by a center pickoff on a potentiometer 1008 wherein the pickoff voltage is substantially 0 volts and is applied to one input terminal of the operational amplifier 1000 through a resistor network.

For other projectiles, the ballistic term $1/R_{n(s)}$ will be different since the resistance of resistors 998 through 998n is selected to fit the different ballistic terms for different projectiles. Thus, the selected normalized range output signal $R/R_{n(s)}$ is specifically related to the selected projectile. The output signal $R/R_{n(s)}$ is then fed through the multiplier 966 and the adder 968 to the ballistic function generator 956 and the ballistic function generator 958.

Before being fed to the function generators the normalized range signal $R/R_{n(s)}$ is corrected for nonstandard air temperature and air pressure conditions in the multiplier 964—966. The multiplier can be an electronic master-slave time division multiplier in which the output is the average of a train of pulses in which the duty cycle is the ratio of two variables and the amplitude is controlled by another variable. Such a master-slave time-division multiplier is illustrated in FIG. 25 which is comprised of the master portion 964 and the slave portion 966. Even though only one slave 966 is illustrated in FIG. 25, one master can be used to drive a plurality of slave circuits as is illustrated in FIG. 23A.

The master-multiplier illustrated in FIG. 25 is coupled to receive DC input signals $e_d$ and $$\frac{\Delta P}{P_{(s)}} - K\frac{\Delta T_A}{T_{A(s)}}$$

for providing two rectangular wave output signals B and $\overline{B}$ that are equal in magnitude and phase but opposite in polarity. The master-multiplier 966 includes a first master inverter 1010 that is coupled to receive the DC input signal $e_d$ and performs an inversion operation thereon, and provides a signal $-e_d$ which is the inverse of the received signal. A second master inverter 1012 receives the inverted DC input signal $-e_d$, performs an inversion operation thereon and provides an output signal $e_d$. Accordingly, the first master inverter 1010 and the second master inverter 1012 provide opposite polarity output signals $e_d$ and $-e_d$, respectively, to a first master switch 1014 and a second master switch 1016.

The first master inverter 1010 also operates to adjust the gain of the $-e_d$ signal applied to the first master switch 1014 and through the second master inverter 1012 to adjust the gain of the $e_d$ signal applied to the second master switch 1016. If a system gain of one is desired, the first master inverter 1010 can be adjusted to provide signals to the switches 1014 and 1016 that have a unity gain in relation to the amplitude of the DC output signal $e_d$. The second master inverter 1012 always operates with a gain of one. With a unity system gain, the $e_d$ input must be larger than the DC input $$\frac{\Delta P}{P_{(s)}} - K\frac{\Delta T_A}{T_{A(s)}}$$

for proper circuit operation.

The first master switch 1014 and the second master switch 1016 are further coupled to receive opposite polarity gating signals B and $\overline{B}$ from the output terminals 1018 and 1020 of a switch driver 1022 which are selectively applied to the first master switch 1014 and the second master switch 1016 to allow sequential operation of the respective switches.

A summing integrator 1024 is coupled to the output of the first master switch 1014 and the second master switch 1016 and to receive the $$\frac{\Delta P}{P_{(s)}} - K\frac{\Delta T_A}{T_{A(s)}}$$

signal for summing or integrating the currents produced by the $$\frac{\Delta P}{P_{(s)}} - K\frac{\Delta T_A}{T_{A(s)}}$$

signal and the $-e_d$ and $e_d$ signals. A threshold detector 1026 is coupled to receive the output of the summing integrator 1024 and is responsive to each threshold level change from the summing integrator 1024 in response to the trigger output of a trigger circuit 1028 for causing the switch driver 1022 to switch the polarity of its opposite polarity gating signals at the terminals 1018 and 1020. The output of the trigger circuit 1028 is applied to the threshold detector 1026 to cause the threshold detector to change output states upon receiving trigger signals from the trigger circuit 1028, thereby maintaining the period of the master portion gating signal output equal to the period of the trigger circuit 1028. The gating signal outputs B and $\overline{B}$ at terminals 1018 and 1020 are in duty cycle from (ratio of on-time to the sum of on-time and off-time) and are alternately switched from $$+\left(\frac{\frac{\Delta P}{P_{(s)}} - K\frac{\Delta T_A}{T_{A(s)}}}{e_d}\right) \text{ to } -\left(\frac{\frac{\Delta P}{P_{(s)}} - K\frac{\Delta T_A}{T_{A(s)}}}{e_d}\right)$$

The slave multiplier 966 includes a first slave inverter 1030, a second slave inverter 1032, a first slave switch 1034 and a second slave switch 1036 that operates as described above for the master inverters 1010 and 1012 and the master switches 1014 and 1016, respectively, of the master portion 964. However, the input to inverter 1030 is an AC signal $R/R_n \sin(\omega t)$, having a period that is long with respect to the period of the output of the master multiplier. First slave switch 1034 and second slave switch 1036 are coupled to terminals 1018 and 1020 of the master portion 964 via gate terminals 1038 and 1040, respectively, of the slave multiplier 966 to alternately cause the first slave switch 1034 and the second slave switch 1036 to change state in accordance with the threshold levels being detected by the threshold detector 1026. The outputs of the first slave switch 1034 and the second slave switch 1036 are coupled together and applied to a filter 1042 to produce a filtered output signal product that can be represented by the following relationship:

$$\left(\frac{R}{R_n}(\sin \omega t)\right)\left(\frac{\Delta P}{P_{(s)}}-K\frac{\Delta T_A}{T_{A(s)}}\right)$$

The master portion 964 divides the quantity $$\left(\frac{\Delta P}{P_{(s)}}-K\frac{\Delta T_A}{T_{A(s)}}\right)$$

by the quantity $e_d$ to provide a quotient equal to $$\left(\frac{\Delta P}{P_{(s)}}-K\frac{\Delta T_A}{T_{A(s)}}\right)/e_d$$

while the slave portion 966 multiplies that quotient by the quantity $R/R_n \sin(\omega t)$ to produce a product illustrated above.

The operation of the master-slave time-division multiplier of FIG. 25 can best be understood with reference to the waveforms of FIG. 26A, FIGS. 26B which illustrate the gating voltage outputs of the switch driver 1022 at the terminals 1018 and 1020, respectively; with reference to FIGS. 26C and 26D which illustrate the output current waveforms of the first master switch 1014 and the second master switch 1016, respectively; with reference to FIG. 26D which illustrates the output voltage waveform of the summing integrator 1024 and with reference to FIG. 26F which illustrates the output voltage waveform of the threshold detector 1026. All of the waveforms of FIG. 26 are correlated to the specific times of $t_0$, $t_1$, $t_2$, $t_3$ and $t_4$ with the period $T_1$ equal to $t_1-t_0$ and the period $T_2$ equal to $t_2-t_1$.

At time $t_o$ the gating signal B at terminal 1018 goes negative and gates the first master switch 1014 to the "off" or nonconducting state, and the gating signal $\bar{B}$ at terminal 1020 goes positive and gates the second master switch 1016 to the "on" or conducting state, as illustrated in FIGS. 26A and 26B. For the $T_1$ period the first switch 1014 remains "off" and the second switch 1016 remains "on." During the $T_1$ period the summing integrator 1024 is caused to be charged by the $e_d$ current provided by the second master switch 1016, FIG. 26D and by the $$\left(\frac{\Delta P}{P_{(s)}}-K\frac{\Delta T_A}{T_{A(s)}}\right)$$

current (not shown), and produces the negative-going ramp voltage as illustrated in FIG. 26E. There is no $-e_d$ charging current from the first master switch 1014 applied to the summing integrator 1024 during the $T_1$ period. When the negative-going ramp voltage provided by the summing integrator 1024 of FIG. 25 reaches a negative (−) threshold level of the threshold detector 1026 at time $t_1$, the output of the threshold detector 1026 changes from a negative output value to a positive output value. When the output of the threshold detector 1026 goes from a negative value to a positive value the output of the switch driver 1022 changes the polarity of its gating signals B and $\bar{B}$ at terminals 1018 and 1020.

Therefore, at time $t_1$, the gating signal B at terminal 1018 goes positive and the first switch 1014 changes from the "off" or nonconductive state to the "on" or conducting state, and the gating signal $\bar{B}$ at terminal 1020 goes negative and causes the second master switch 1016 to change from the "on" or conducting state to the "off" or nonconducting state. During the $T_2$ period, the first master switch 1014 remains "on."

Furthermore, during the $T_2$ period the summing integrator 1024 is charged from the negative (−) threshold level toward the positive (+) threshold level by the $-e_d$ current from the first master switch 1014 (FIG. 25) and by the $$\left(\frac{\Delta P}{P_{(s)}}-K\frac{\Delta T_A}{T_{A(s)}}\right)$$

current, and produces the positive-going ramp voltage illustrated in FIG. 26E. There is no $e_d$ charging current from the second switch 1016 during the $T_2$ period. When the positive-going ramp voltage reaches the positive (+) threshold level at the threshold detector 1026 at time $t_2$, the output of the threshold detector 1026 changes from a positive output value to a negative output value. When the output of the threshold detector 1026 goes from a positive value to a negative value, the output of the switch driver 1022 changes the polarity of its gating signals at terminals 1018 and 1020. From time $t_2$ on in time the operation of the circuit of FIG. 25 repeats, since the time interval $t_3-t_2$ is identical with $T_1$ and the time interval $t_4-t_3$ is identical with $T_2$.

Upon further analysis of the waveforms of FIG. 26, the master portion 964, or time-division portion of the time-division multiplier of FIG. 25, carries its division information ($e_m/e_d$) in the form of a duty cycle. The duty cycle is the ratio of the total "on" time ($T_2-T_1$) to total time ($T_1+T_2$). It should be recalled that there are three charging currents being applied to the summing integrator 1024 during this "total cycle time" ($T_1+T_2$). The $$\left(\frac{\Delta P}{P_{(s)}}-K\frac{\Delta T_A}{T_{A(s)}}\right)$$

current is applied during the ($T_1+T_2$) periods, while the $e_d$ current from the switch 1016 is only applied during the $T_1$ period (FIG. 26D) and the $-e_d$ current from the switch 1014 is only applied during the $T_2$ period (FIG. 26). The average value of the charging currents applied to the summing integrator is therefore given by the equation:

$$\frac{\left(\frac{\Delta P}{P_{(s)}}-K\frac{\Delta T_A}{T_{A(s)}}\right)}{R_1}(T_2+T_1)+\frac{e_d}{R_2}(T_1)+\frac{(-e_d)(T_2)}{R_3}=0$$

with $R_1$, $R_2$, and $R_3$ being various circuit resistances (not shown) which help control the system gain. For example, the summing integrator 1024 may contain an operational amplifier (not shown) in which $R_1$, $R_2$ and $R_3$ are the input resistances, each being responsive to its respective one of the input signals $$\left(\frac{\Delta P}{P_{(s)}}-K\frac{\Delta T_A}{T_{A(s)}}\right)$$

$e_d$ and $-e_d$ and connected to a common summing point. When the master portion 964 and its components are designed for a system gain of one, $R_1=R_2R_3$ and the equation then becomes $$\left(\frac{\Delta P}{P_{(s)}}-K\frac{\Delta T_A}{T_{A(s)}}\right)(T_2+T_1)+e_d(T_1)+(-e_d)(T_2)=0$$

Dividing all the terms of the equation by $e_d$ $T_2+T_1$) combining like terms, and transposing terms, the resulting expression then becomes:

$$\frac{\left(\frac{\Delta P}{P_{(s)}}-K\frac{\Delta T_A}{T_{A(s)}}\right)}{e_d}=\frac{T_2-T_1}{T_2+T_1}$$

It has therefore been shown that the quotient $$\left(\frac{\frac{\Delta P}{P_{(s)}} - K \frac{\Delta T_A}{T_{A(s)}}}{e_d}\right)$$

is obtained by pulse width modulation and is contained in the duty cycle form of $$\frac{T_2 - T_1}{T_2 + T_1}$$

The multiplication by the time-division multiplier is accomplished by the slave portion 966 by selectively applying the derived duty cycle and the negation thereof to the first slave switch 1034 and the second slave switch 1036 via the terminals 1038 and 1040, while applying the $R/R_n \sin(\omega t)$ signal to switch 1034 and the $R/R_n \sin(\omega t)$ signal to switch 1036.

Since the switch 1036 is "on" or in the conducting state during $T_2$ of the total time $(T_1+T_2)$ and "off" or in the nonconducting state during T, as shown in FIG. 26A $R/R_{n(s)} \sin(\omega t$ current only flows through the switch 1036 to the filter 1042 during the $T_2$ period. Also, since the switch 1034 is "on" or in the conducting state during the $T_1$ of the total time $(T_1+T_{2a'}$ and "off" or in the nonconducting state during $T_2$ as shown in FIG. 26B, $R/R_n \sin(\omega t)$ current only flows through the switch 1034 to the filter 1042 during the $T_1$ period. If the slave portion 966 is operated having a gain of one and the output signal of filter 1042 is represented by $R/R_{n(s)} \sin(\omega t)B$, then the flow of $R/R_{n(s)} \sin(\omega t)$ and $R/R_{n(s)} \sin(\omega t)$ currents can be represented by the equation $$e_{(s)} = \frac{R}{R_n} \sin(\omega t) \frac{T_2}{T_2 + T_1} + \left[-\frac{R}{R_{n(s)}} \sin(\omega t) \frac{T_1}{T_2 + T_1}\right]$$

Factoring out the quantity $R/R_n \sin(\omega t)$ from the right-hand terms and combining terms, the equation becomes $$\frac{R}{R_{n(s)}} \sin(\omega t) \left[\frac{(T_2 - T_1)}{(T_2 + T_1)}\right]$$

with the substitution of $$\frac{T_2 - T_1}{T_2 + T_1}$$

by its equality of $$\frac{\frac{\Delta P}{P_{(s)}} - K \frac{\Delta T_A}{T_{A(s)}}}{e_d}$$

, the resulting equation becomes $$\frac{R}{R_n} \sin(\omega t)B = \frac{e_a \cdot e_m}{e_d} \frac{\frac{R}{R_n} \sin(\omega t) \left[\frac{\Delta P}{P_{(s)}} - K \frac{\Delta T}{T_{(s)}}\right]}{e_d}$$

It should be noted that in the above equations that the value represents the value of $R/R_n \sin(\omega t)$ during the period of a particular duty cycle, and, as noted above, the period of the duty cycle is much shorter than the period of $R/R_n \sin(\omega t)$, and hence the change in magnitude of $R/R_n \sin(\omega t)$ during any duty cycle is relatively small. This output signal $R/R_n \sin(\omega t)B$ is the correction term for normalized range signal $R/R_n$ (ns) which is fed to the function generators 956 and 958.

Figure 27:
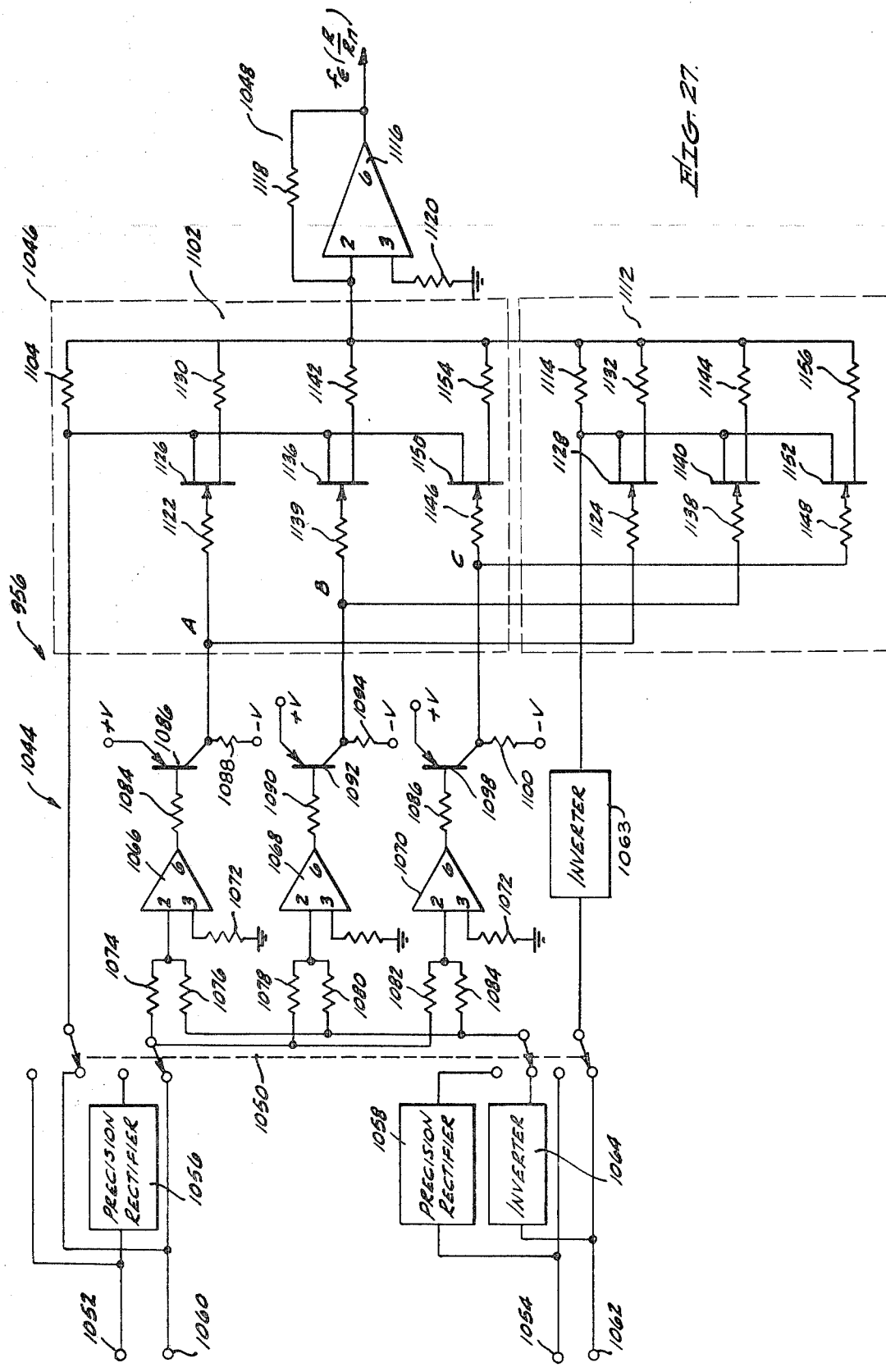
FIG. 27 is a schematic diagram of a function generator, a rectifier, and a break apart selector of the type used in the computer system of FIGS. 23A and 23B.

FIG. 27 illustrates a function generator 956 for producing an output function $f_\epsilon R/R_n$ via a plurality of line slope segments. The circuit includes a break point selector 1044 and a switched resistor network 1046, including a plurality of resistance branches which are selectively summed in response to output signals received from the break point selector 1044 wherein the selectively summed resistances are coupled to the input of an operational amplifier 1048 to vary its gain approximately in accordance with a desired function, such as the $f_\epsilon R/R_n$ function shown in FIG. 28.

The circuitry of FIG. 27 can be used with either a DC or an AC input analog voltage such as the normalized range signal $R/R_n$. With an AC input signal a four-pole, two-position switch 1050 is placed in the AC position (reverse of that shown), so that both the range input signal $R/R_n \sin(\omega t)$ and the AC reference voltage being applied to input terminals 1052 and 1054, respectively, can be converted into output DC voltages which are respectively proportional to the rms value of the respective AC voltages, by the use of precision rectifiers 1056 and 1058. Precision rectifier 1056 produces a +DC output voltage proportional to normalized range $R/R_n$, while precision rectifier 1058 produces a −DC output voltage proportional to the AC reference signal input. Normalized range signal $R/R_n \sin(\omega t)$ and the AC reference voltages are directly applied to the switch resistor network 1046 since they can be utilized therein without being converted into DC voltages first.

With a DC input analog voltage and a DC constant reference voltage, switch 1050 is placed in the DC position, as shown in FIG. 27. The DC normalized range signal $R/R_n$ is then directly applied to both the break point selector 1044 and the switched resistor network 1046 via input terminal 1060. The DC constant reference voltage is applied via input terminal 1062 and an inverter 1063 directly to the switched resistor network 1046, and also applied through inverter 1064 to the break point selector 1044, since a negative (−) DC reference voltage is required for proper operation of the break point selector 1044.

The circuitry of FIG. 27 will hereinafter be described for use with a DC normalized range signal $R/R_n$ and a DC reference voltage. In the light of the foregoing and subsequent explanation it should be apparent how the function generator would operate with an AC normalized range signal $R/R_n \sin(\omega t)$ and an AC constant reference voltage.

The break point selector 1044 includes a plurality of operational amplifiers 1066, 1068 and 1070. Each operational amplifier has an inverting input terminal designated by the number 2, a noninverting input terminal designated by the number 3, and an output terminal designated by the number 6. A resistor 1072 is connected between the noninverting input and ground in order to minimize the bias current error inherent in operational amplifiers. Comparison circuits composed of resistors 1074 and 1076, 1078 and 1080, and 1082 and 1084 are respectively parallel coupled through switch 1050 between input terminal 1060 and the output terminal of inverter 1064 for respective reception and comparison of the normalized range signal $R/R_n$ and the DC constant reference voltage. The respective junctions of the pairs of resistors contained in each comparison circuit are respectively coupled to the inverting inputs of operational amplifiers 1066, 1068 and 1070. Each of operational amplifiers 1066, 1068 and 1070 produces a negative output signal when a positive voltage is coupled to its inverting input. With a distant target, the range and hence the amplitude of the normalized range signal $R/R_n$ is greater than with a close target. The size of the resistances 1074, 1076, 1078, 1080, 1082 and 1084 are chosen such that if the range R progressively increases operational amplifier 1066 is turned on first; then with a further increase in range R operational amplifier 1068 is turned on next; and with a still further increase in range R operational amplifier 1070 is turned on last. These turn on points for the operational amplifiers are reached when the normalized range signal $R/R_n$ reaches voltage $V_A$, voltage $V_B$, and voltage $V_C$, as indicated by points, A, B, and C in FIG. 28. When the voltage level $V_A$ is exceeded by the input normalized range signal $R/R_n$, the output of operational amplifier 1066, which can be a Fairchild μA709 high performance operational amplifier, manufactured by Fairchild Semiconductor Corporation and described and illustrated in their handbook, Fairchild Semiconductor Linear Integrated Circuits, Application Handbook, 1967, goes low or negative. The output of operational amplifier 1066 is fed through resistor 1084 to the base terminal of a PNP transistor 1086 to turn on the transistor and cause the voltage drop across the collector resistor 1088 to change from a negative to a positive voltage. The signal taken off the collector of transistor 1086 will hereinafter be referred to as switching or break point select signal A and will be positive in potential at this time.

When the normalized range signal $R/R_n$ exceeds the voltage level $V_B$, due to a further increase in the target range R, the output of operational amplifier 1068 goes low or negative. The output of operational amplifier 1068 is fed through resistor 1090 to the base terminal of a PNP transistor 1092 to turn on the transistor 1092 and cause the voltage drop across its collector resistor 1094 to change from a negative to a positive voltage. The signal taken off the collector of transistor 1092 will hereinafter be referred to as switching or break point select signal B and will be positive in potential at this time.

If the target range should further increase, the amplitude of normalized range signal $R/R_n$ will also increase. When the normalized range signal $R/R_n$ exceeds the voltage level $V_C$, as indicated by point C in FIG. 28, the output of operational amplifier 1070 goes low or negative. The output of operational amplifier 1070 is fed through resistor 1096 to the base terminal of transistor 1098 to turn on the transistor 1098. Upon the conduction of transistor 1098 the voltage drop across the collector resistor 1100 changes from a negative to a positive voltage. The signal taken off the collector of transistor 1098 will hereinafter be referred to as switching or break point select signal C and will be positive in potential at this time.

These switching or break point select signals A, B, and C are fed to the resistor network 1046 to selectively vary the gain of the operational amplifier 1048.

The resistor network 1046 includes a first set of parallel resistance branches 1102 which are coupled to receive the normalized range signal $R/R_n$ and are responsive to the application of the break point select signals A, B and C for setting the gain slope, or $a_i$ slope factor of the $a_ix$ term, of the function $f_e R/R_n$ produced at the output of operational amplifier 1048. The $R/R_n$ factor of the $a_ix$ term is the input analog voltage $R/R_n$ which is applied through switch 1050 to resistor 1104 and to the source terminals of FET transistors 1102, 1136 and 1150. This input analog voltage $R/R_n$, or $R/R_n$ factor, in cooperation with the resistance presented to the inverting terminal of the operational amplifier 1048 by the first set of parallel resistance branches 1102, effectively results (through previously described circuit operation) in the production of the $a_ix$ term of the function $f_e R/R_n$ as produced at the output of operational amplifier 1048. The resistor network 1046 also includes a second set of parallel resistance branches 1112 which are connected in common to input terminal 1062 through inverter 1063 and switch 1050 for reception of the reference voltage, and are responsive to the application of the reference voltage and the break point selector signals A, B and C to bias the projected gain slope level to intercept the coordinates of the function $f_e R/R_n$ at the points A, B and C of FIG. 28 which respectively represent the voltages $V_A$, $V_B$ and $V_C$. These coordinate intercepts determine the ordinate intercept points, or voltages, $b_2$, $b_3$, and $b_4$. The intercept voltage $b_1$ occurred before the break point select voltage $V_A$, since it is part of the $a_ix+b_i$ equation of the first line segment. The production of the $b_i$ term (representing the intercept voltages $b_1$, $b_2$, $b_3$ and $b_4$) of the function $f_e R/R_n$ at the output of operational amplifier 1048 is achieved by the circuit operation of the resistance presented to the inverting terminal of the operational amplifier 1048 by the second set of parallel resistance branches in cooperation with the reference voltages.

More specifically, when the amplitude of the input analog range voltage is less than that of break point voltage $V_A$, only the slope set resistor 1104 and an intercept set resistor 1114 are connected to the input of operational amplifier 1048, since no positive point select signals A, B or C are received to turn on the junction FET transistors contained in the first set of parallel resistance branches 1102 and the second set of parallel resistance branches 1112. Therefore, the output of the operational amplifier 1048 will be described by the equation $$f_e \frac{R}{R_n} = a_1 x + b_1$$

of the first line slope segment.

The operational amplifier 1048 includes an amplifier 1116 such as previously referenced μA709 and has a feedback resistor 1118 connected between its output terminal 6 and its inverting input terminal 2. In addition, the noninverting input terminal 3 is connected through resistor 1170 to the reference potential to minimize the bias current error inherent in operation amplifiers. The combination of the slope set resistor 1104 and the intercept set resistor 1114 operate as gain set resistances wherein the gain of the operational amplifier is proportional to the ratio of the resistance of the feedback resistor 1118 and the sum of the parallel resistances of the slope set resistor 1104 (operating on the input signal $R/R_n$) and the intercept set resistor 1114 (operating on the reference voltage).

Figure 28:
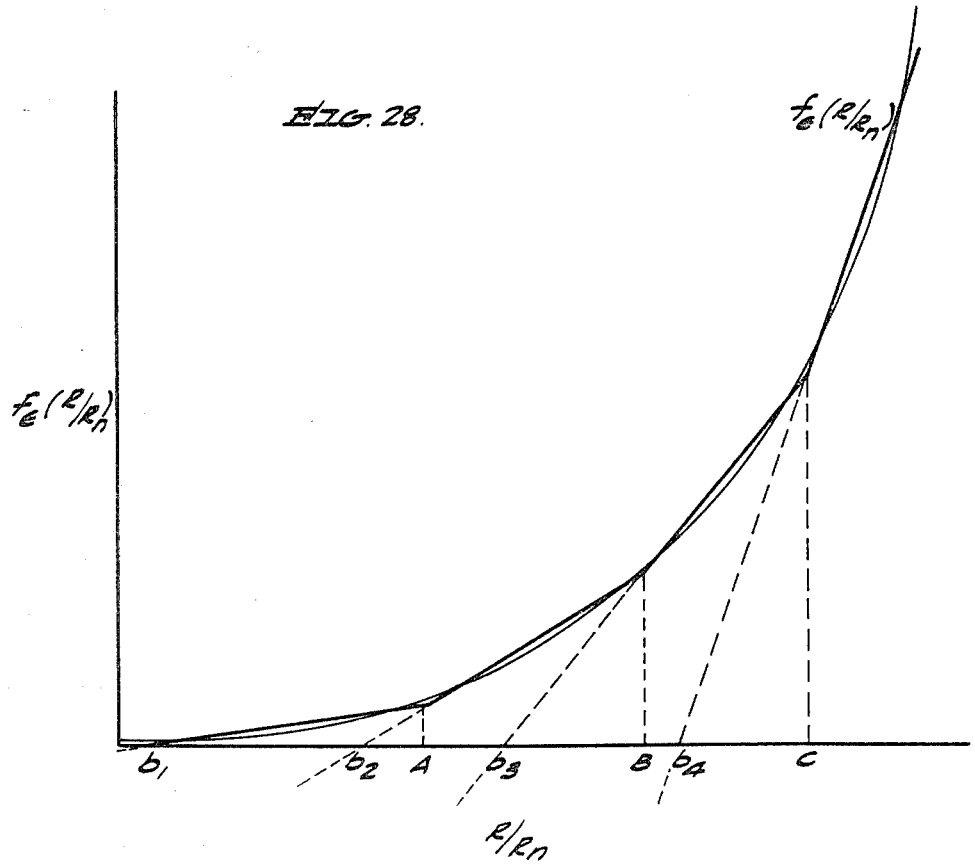
FIG. 28 is a graph illustrating one function $f_e$ (R)/$R_n$ generated by the function generator circuit illustrated in FIG. 27.

Under these conditions the function generator 956 will generate the first line segment illustrated in FIG. 28 until the increasing input analog voltage exceeds the voltage $V_A$ (represented by point A in FIG. 28). When the amplitude of the input normalized range signal $R/R_n$ exceeds the first break point or switching voltage $V_A$, the positive switching, or break point select, signal A is produced by the break point selector circuit 1044 and is fed through resistors 1122 and 1124 to the gate terminals of FET, transistors 1126 and 1128 in the first set of parallel resistors 1102 and the second set of parallel resistors 1112, respectively, to turn them on. The sum of the parallel resistances of resistor 1122 and the resistance branch, including the resistance between the source terminal and the drain terminal of turned on FET transistor 1126 and resistance 1130 will effectively reduce the gain slope resistance of the operational amplifier 1048, thereby effectively increasing the slope of the second line slope segment between the voltage levels $V_A$ and $V_B$, designated as points A and B in FIG. 28. In addition, for the intercept set bias, the sum of the parallel resistances of resistor 1114 and the resistance branch including the resistance between the source terminal and the drain terminal of turned on FET transistor 1128 and resistor 1132 operate on the reference voltage to bias the operational amplifier 1048 gain, so that a projection of the second line slope segment will intercept the ordinate of the graph in FIG. 28 at a predetermined point $b_2$ (not shown).

Similarly, third line slope segment between break point voltages $V_B$ and $V_C$, as represented by points B and C in FIG. 28, is produced when the break point select signal B changes from a negative potential to a positive potential and is applied through resistor 1139 to the base electrode of FET transistor 1136 and through resistor 1138 to the base electrode of FET transistor 1140, respectively. The positive switching or break point select signal B turns on FET transistors 1136 and 1140 so that their respective source to drain resistances and the resistance of resistors 1142 and 1144, respectively, are summed in parallel with the previously described resistance branches to respectively further reduce the gain slope resistance of the operational amplifier 1048, thereby effectively increasing the slope of third line slope segment between voltage level $V_B$ and $V_C$ (designated as points B and C in FIG. 28) and, in cooperation with the reference voltage, to further bias the operational amplifier 1048 gain so that a projection of the third line slope segment will intercept the ordinate of the graph in FIG. 28 at a predetermined point $b_3$ (not shown).

The fourth line slope segment following the break point voltage $V_C$, as represented by point C in FIG. 28, is produced when the switching or break point select signal C changes from a negative voltage to a positive voltage and is applied through resistors 1146 and 1148 to the gate terminals of FET transistors 1150 and 1152, respectively, to turn them on. The resistance branch, including the resistance between the source terminal and the drain terminal of FET transistors 1150 and 1152 and the respective resistors 1154 and 1156 are respectively added in parallel to the previously described resistances to further increase the gain slope of the operational amplifier 1048 and to further bias the operational amplifier so that the fourth line slope segment, is so projected, would intercept the Y coordinate at a new intercept point $b_4$ (not shown).

It should be emphasized that although a function generator which is capable of generating four line segments has been described, it is possible to increase the accuracy of the curve approximation of this function generator by adding additional comparison circuits, operational amplifier circuits and transistor circuits to the break point selector 1044, and additional resistance branches in each of the first and second sets of parallel resistance branches 1102 and 1112 including FET transistors and the resistors, for each additional line segment desired. The generation of additional line segments at additional break points would more closely approximate the desired smooth curve for which the function is required. The resulting output signal $f_c$ $R/R_n$ on the output terminal of operational amplifier 1048 is approximately the function previously described in the equations.

The resulting output signal $f_c$ $R/R_n$ on the output terminal of operational amplifier 1048 is received by the adjustable ballistic term multiplier 960 (FIG. 23A) wherein it is multiplied by the ballistics term $\epsilon_{n(s)}$. Structurally, the adjustable ballistics term multiplier 960 is the same as the adjustable ballistics term multiplier 954 illustrated in FIG. 24 with the exception that the value of the resistances 998–998n and feedback resistor 1006 are selected in accordance with the ballistics constant $\epsilon_{n(s)}$ for each ammunition. The output signal from this adjustable ballistics constant multiplier 960 is proportional to superelevation $\epsilon_o$ in accordance with the previously described superelevation equations.

The ballistics function generator 958 for generating the ballistic function $f_t$ $R/R_n$ and the adjustable ballistic term multiplier 962 for multiplying the function by the ballistic term $t_n$ illustrated in FIG. 23A are embodied in the same way as the ballistic function generator 956 of FIG. 27 and the adjustable ballistic term multiplier 954 of FIG. 24, respectively, with the exception that the resistances of the resistors therein are selected so that the resultant ballistic function and multiplication term will closely approximate the smooth curve and expression represented by time of flight equations for generating the partially corrected time of flight signal $t_{f1}$.

As previously described with reference to FIG. 23B the partially corrected superelevation signal $\epsilon_{o1}$ and the partially corrected time of flight signal $t_{f1}$ are each fed through a pair of slave multipliers to further correct for nonstandard conditions in accordance with the partial derivatives B and H. More specifically, the partially corrected superelevation signal $\epsilon_{o1}$ is fed through the slave multiplier 972, the operational amplifier 974, the slave multiplier 976 and the operational amplifier 978 to produce the ballistic superelevation output signal for nonstandard conditions:

$$\epsilon_o = \epsilon_{o1}(1+B)(1-2H);$$

where $$B = \frac{\Delta R_n}{R_n}$$

and $$H = \frac{\Delta V_0}{V_0}$$

The partially corrected time of flight signal $t_{f1}$ is fed through the slave multiplier 980, the operational amplifier 982, the slave multiplier 984 and the operational amplifier 986 to produce the time of flight output signal $t_f$ for nonstandard conditions:

$$t_f = t_{f1}(1+B)(1-H)$$

where $$B = \frac{\Delta R_n}{R_n}$$

$$H = \frac{\Delta V_0}{V_0}$$

These four slave multipliers 972, 976, 980 and 984 are all implemented the same way as the slave multiplier 966 as illustrated in FIG. 25. The master multiplier 970 for driving the slave multipliers 976 and 984 is implemented in the same manner as master multiplier 964 illustrated in FIG. 25.

The parallax correction signal $p$ is produced by the function generator 990, rectifier 992 and break point selector 994 which are implemented in the same manner as the circuits of FIG. 27. Since, however, the parallax correction signal $p$ is equal to $$\left(\frac{1}{R} - \frac{1}{R_e}\right)$$

the function of parallax correction vs. range is generated when the function generator decreases the number of parallel resistance branches as the range increases, which is just the opposite of the mode of operation described with reference to FIG. 27.

Referring back to the circuit of FIG. 23B, the elevation control signals E and deflection control signals D for driving the fire control system in elevation and deflection, respectively, are generated in response to the superelevation signal $\epsilon_o$ and time of flight signal $t_f$ correcting for ballistic drift angle $\eta_o$, wind deflection angle $\eta_w$, kinematic lead angle $\eta_k$, parallax $D_p$, $E_p$, jump $D_j$, $E_j$ and droop $E_d$, $D_d$.

The signals $\epsilon_o(1+B)H$ and $\epsilon_o$ are fed through an amplifier 1159 and to a ballistic term multiplier 1160 of the type illustrated in FIG. 24 wherein it is multiplied by a selected ballistic drift constant $$-\frac{K_d}{V_0}$$

for each selected ammunition to generate a ballistic drift angle signal $\eta_o$ in accordance with the previously described equation. This drift angle signal $\eta_o$ is then fed to summing input of an operational amplifier 1162 whereafter the circuit will utilize the ballistic drift angle signal to connect the elevation control signal E and the deflection control signal D as will be explained in more detail shortly.

The crosswind signal $V_w$ received from a wind sensor is fed through a variable ballistic term multiplier 1164 of the previously described type wherein it is multiplied by a crosswind coefficient $K_w$ for each selected ammunition to generate the signal $V_w K_w$. This signal is then fed through a slave multiplier 1166 of the type illustrated in FIG. 25 wherein it is multiplied by the temperature pressure coefficient B to generate an output signal $V_w K_w B$ which is fed to an inverting input of a summing operational amplifier 1168. The signal $V_w K_w$ is also fed directly to a noninverting input of the operational amplifier 1168 wherein the output signal $V_w K_w(1-B)$ is produced to correct for nonstandard conditions. This signal is fed through a slave multiplier 1170 wherein it is multiplied by the time of flight signal T ($T=t_f$) to produce the wind deflection angle signal $\eta_w$ which is fed to a second input of the summing operational amplifier 1162 whereafter it is used to correct the deflection signal D and the elevation signal E.

The time of flight multiplication factor T for the slave multiplier 1170 is produced when the time of flight signal $t_f$ is fed to the master multiplier 988. The master-slave time-division multiplier 988—1170 are of the type illustrated in FIG. 25 and described above and can be operated with an AC input signal $e_m = t_f \sin \omega t$ received by the master multiplier 988 and a DC input signal $V_u K_{tc}$ received by the slave portions 1170. As previously stated, the period of the AC signal $t_f \sin \omega t$ must be many times longer than the duration of the duty cycle of the master multiplier 988. As a result, the master portion will operate substantially as described above for a DC input signal for any particular duty cycle.

However, when the input signal $t_f \sin \omega t$ is an AC signal, the output $$\frac{t_f \sin \omega t}{e_d} = \frac{T_2 - T_1}{T_2 + T_1}$$

of the master portion 988 will change from duty cycle to duty cycle giving a pulse width modulated output signal. For example, for an input of $e_m = t_f \sin$ of 0, no $e_m$ current will be applied to the summing integrator 1024 and the output signal will be a rectangular wave where $T_1 = T_2$. As the $t_f \sin \omega t$ signal increases from sin 0° to sin 90°, the time $T_2$ increases until the duration of $T_1$ is very short with respect to time $T_2$. When the $t_f \sin \omega t$ signal changes through its period from sin 90° to sin 270°, the duration of $T_1$ will increase until $T_2$ is short with respect to $T_1$. As the $t_f \sin \omega t$ signal changes from sin 270° to sin 360°, the duration $T_2$ will increase and the duration of $T_1$ will decrease until a square wave output signal in which $T_1 = T_2$ results. The output of the master portion 988 will change as described above for each cycle of $e_m$.

The first slave switch 1034 and the second slave switch 1036 receive the output T of the master portion 988 as described above and provide an output signal at their common outputs corresponding to the pulse width modulated output of the master portion 988. The output of the first slave switch 1034 and the second slave switch 1036 are applied to an averaging filter 1042 to produce a filtered output signal that can be represented by the following relationship:

$$\frac{V_w K_w (1-B) t_f \sin \omega t}{e_d}$$

The waveforms illustrated in FIGS. 26A through 26F are applicable to the master-slave time-division multiplier for an AC signal $t_f \sin \omega t$ applied to the master portion 988 and a DC signal $V_u K_w (1-B)$ applied to the slave portion 1170.

The angular rate in azimuth, $\omega_1$ of the turret is fed through a follow and clamp circuit 1172 wherein it is stored as a DC signal when the input signal R$t$LL is received.

A typical follow and clamp circuit operable to sample $\omega_e$ or $\omega_1$ in a disturbed or nondisturbed fire control system is illustrated in FIG. 29 and includes a switch 1182 in series with a DC signal $\omega_1$. An amplifier 1184 has an input coupled to ground through a suitable resistor 1186 and coupled through a resistor 1188 to the switch 1182. Also, the output of the amplifier 1184 is coupled through a series connected feedback resistor 1190 and switch 1192 to the input thereof as well as being coupled through a capacitor 1194 to the input of the amplifier. The switches 1188 and 1192 are respectively responsive to switch control units 1198 which is responsive to the right lead lock control signal R$t$LL. The switches 1182 and 1192 are normally closed for filter operation but are opened for hold operation when the R$t$LL signal is present, this condition being for disturbed and nondisturbed operation. For director operation, the switches 1182 and 1192 remain closed as shown so that filter action is always provided. For all mechanizations, switch driver 1198 is open in the absence of an R$t$LL signal. When utilizing the sample and hold circuit closure of the R$t$LL, switch 1198 causes the switches 1182 and 1192 to open so that the angular rate is stored as a DC signal $\omega_1$.

This DC signal is then fed through a slave multiplier 1174 of the type previously described wherein it is multiplied by the time of flight signal T to generate a kinematic lead angle signal $\omega_1 T$. If it is a one gyro system, this kinematic lead angle signal $\omega_1 T$ is fed through an analog switch 1176a as a single gyro kinematic lead angle signal $\eta_k$ to another input of the operational amplifier 1162 for correcting the deflection signal D and elevation signal E.

Figure 30:
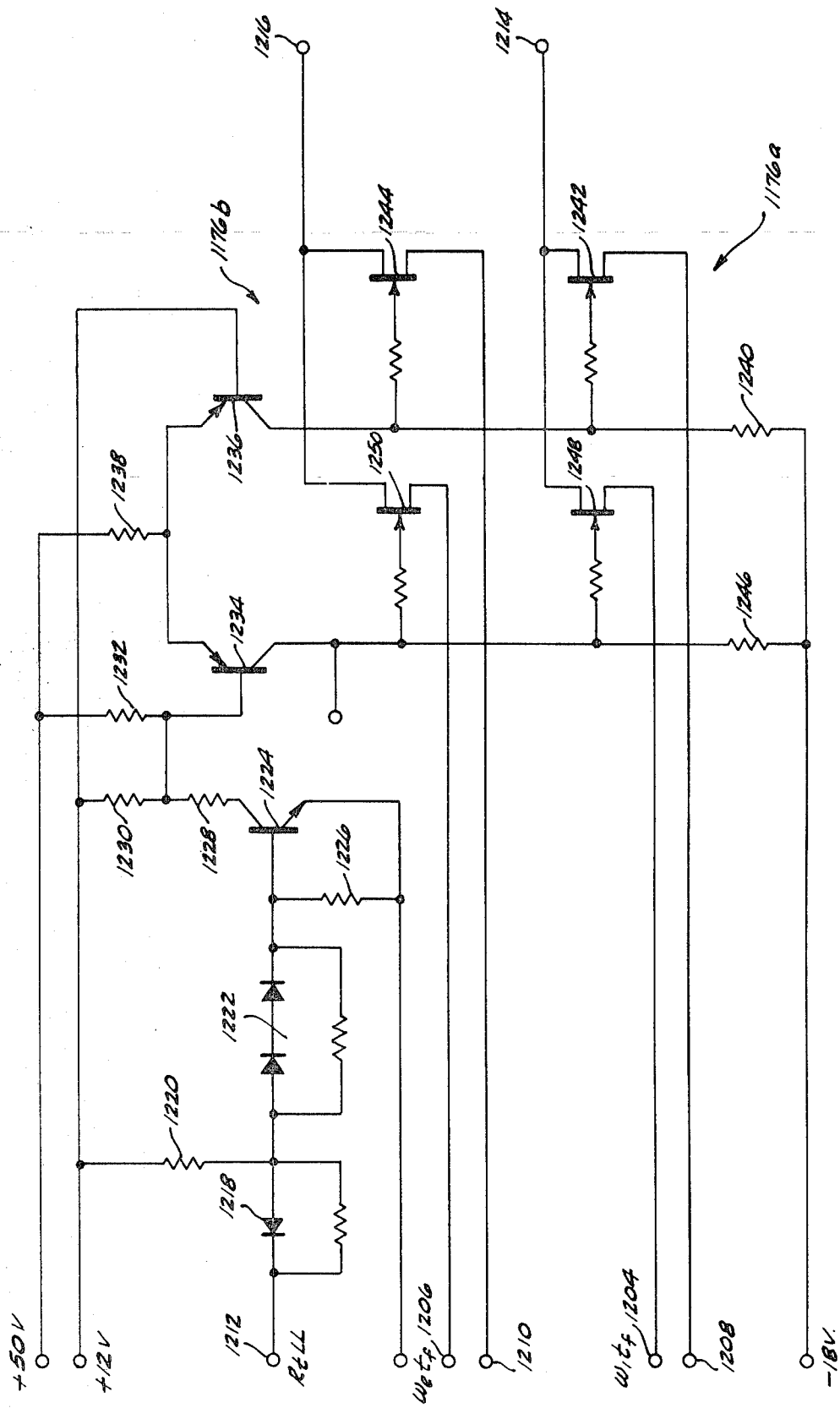
FIG. 30 is a schematic diagram of an analog switch of the type used in the computer of FIG. 23B.

The analog switches 1176a and 1176b illustrated in FIG. 30 receive the single gyro kinematic lead angle signal $\eta_k = \omega_1 t_f$ at one input terminal 1204 and the optional second gyro kinematic lead angle signal $\omega_e t_f$, as will be explained in more detail subsequently, at a second input terminal 1206. The other two input terminals 1208 and 1210 are connected to a ground terminal. A switch signal R$t$LL is received at an input terminal 1212. This switch signal R$t$LL is normally at a low level when the computer is not in a COMPUTE mode, so that the inputs at terminals 1208 and 1210, which are at ground level, are coupled to the output terminal 1214 and 1216, respectively.

More specifically, when the switch signal R$t$LL applied to terminal 1212 is low, the interface diode circuit 1218 is forward biased so that one end of the base current resistor 1220 is at the ground level. This ground level signal is fed through the threshold circuit 1222, including two series diodes to reverse bias an NPN transistor 1224 off. In addition, a base emitter resistor 1226 is connected between the base terminal of the transistor 1224 and its emitter terminal. A biasing network including resistors 1228 and 1230 connected between the emitter terminal and a +12V terminal and a resistor 1232 are connected between the +12v terminal and the +50V level terminals at one end and the base terminal of transistor 1234 to maintain the base terminal voltage at around 12V±ΔV, depending upon the state of transistor 1224. For example, with transistor 1224 in its normally off condition, the level of the signal applied to the base terminal of transistor 1234 is above +12V and reverse biases the transistor 1234 which is part of a differential amplifier circuit. With the transistor 1234 turned off, the other transistor 1236 of the differential amplifier is forward biased on as a result of the voltage level at the emitter terminal, resulting from current flow through a current source resistor 1238 and the potential developed across the collector resistor 1240.

With the differential amplifier in this state, the junction FET transistors 1242 and 1244 are turned on by a signal applied to the gate terminals from the collector terminal voltage developed across collector resistor 1240. With the FET transistors 1242 and 1244 turned on, the ground level signal received at the input terminals 1208 and 1210 are conducted through the source and drain terminals of FET transistors 1242 and 1244 to the output terminals 1214 and 1216, respectively. Since transistor 1234 of the differential amplifier is turned off, the voltage drop across a collector resistor 1246 is low, resulting in a low voltage level signal which is applied to the gate terminals of the FET transistors 1248 and 1250, thereby turning them off. As a result, the input signals $\omega_1 t_f$ and $\omega_e t_f$ applied to the input terminals 1204 and 1206 cannot be conducted to the output terminals 1214 and 1216, respectively.

When the switch signal R$t$LL applied to input terminal 1212 goes high, the interface resistor circuit 1218 is back biased, thereby raising the level of the signal at the lower end terminal of base current resistor 1220. This signal level is fed through the threshold circuit 1222 to forward bias the transistor 1224 to an on condition. When transistor 1224 goes on, current flow through the bias network, including resistors 1228, 1230 and 1232, causes the signal to the base terminal of transistor 1234 to go lower than +12V, thereby turning on transistor 1234.

With the transistor 1234 of the differential amplifier turned on, the other transistor 1236 is turned off. Consequently, the voltage drop across collector resistor 1246 increases, and the voltage drop across collector resistor 1240 decreases. As a result, the collector voltage of transistor 1234 is fed to the gate terminal of FET transistors 1248 and 1250 to turn them on, whereupon the input signal $\omega_1 t_f$ and $\omega_e t_f$ are conducted through the source and drain terminals of the FET transistors to the output terminals 1214 and 1216, respectively. The decrease in the voltage at the collector terminals of transistor 1236 is applied to the gate terminals of the FET transistors 1242 and 1244 to turn them off, whereupon the ground level signal applied to the input terminals 1208 and 1210 cannot be conducted to the output terminal.

Referring again to FIG. 23B, the output signal $\eta$ of the operational amplifier 1162 then becomes $\eta=\eta_o+\eta_w+\eta_k$. If, however, it is a two-gyro system, switch contacts of single gyro switch 1178 are switched and then this kinematic lead angle signal $\omega_1 t_f$ is fed to an input of operational amplifier 1180 whereupon the signal $\eta$ becomes $\eta_o+\eta_w$.

The ballistic superelevation signal $\epsilon_o$ is also fed directly to the input of an operational amplifier 1252 to produce an output signal $\epsilon$ where:

$$\epsilon=\epsilon_o$$

These output signals $\eta$ and $\epsilon$ from the operational amplifiers 1162 and 1252 can be fed directly through analog switches 1254a and 1254b of the previously described type to an input of the operational amplifiers 1180 and 1257, respectively, when the cant resolver signal C is at the off level. If the cant signal C is on, it can be first fed through a cant resolver 1256 before being fed through the analog switches 1254a and 1254b to the inputs of the operational amplifiers 1180 and 1257, respectively, when the cant resolver is turned on. Although a cant resolver is specifically referred to, it should be understood that other types of resolvers could be used instead.

Assuming that the cant resolver 1256 is in operation, the output signals $\eta$ and $\epsilon$ from the operational amplifiers 1162 and 1152 respectively are fed to one winding thereof and are resolved into turret coordinates which take into account the incline angle of the turret relative to the horizontal and produces output signals which are resolved in accordance with this cant angle. One way to perform this operation would be to have a first winding which is connected to pendulum so that the first winding is moved relative to a stationary second winding, whereupon the inductive coupling between the legs of the windings will vary with the position of the movable winding. The output signal of the cant resolver 1256 then becomes an uncorrected deflection signal D and an uncorrected elevation signal E where:

$$D_c=\eta \cos C + \epsilon \sin C$$

and $$E_c=\epsilon \cos C - \eta \sin C$$

These uncorrected deflection and elevation signals $D_c$ and $E_c$ are then fed through the analog switches 1254a and 1254b, respectively, to an input of the summing inputs of operational amplifiers 1180 and 1257, respectively, wherein they are further corrected. Another input of the operational amplifiers 1180 and 1257 receives Jump signals $D_j$ and $E_j$, respectively, which are produced by the variable attenuators 1258 and 1260, respectively, for each selected ammunition. Another input of the operational amplifiers 1180 and 1257 receives the parallax coefficient ($1/R-/R_c$) generated by the function generator 990 of FIG. 23A. Another input to the operational amplifiers is gun barrel droop in deflection $D_d$ and elevation $E_d$. The input terminals of operational amplifier 1180 has a gain set resistor therein which multiplies the parallax coefficient by the deflection parallax constant $D_y$ determined for each tank. The operational amplifier 1257 has a gain set resistor associated with the input thereof which effectively multiplies the parallax coefficient by the elevation parallax constant $D_2$ determined for each tank. If the system is a two-gyro system, the angular gun-line rate in elevation signal $\omega_e$ times time of flight signal $\omega_e t_f$ is fed to another input of the operational amplifier 1257 to compensate for the kinematic lead angle in elevation.

When the two-gyro system of the disturbed or nondisturbed type embodiment is being used, the angular gun-line rate in elevation signal $\omega_e$ is fed to a second follow and clamp circuit 1262 of the type previously described with reference to FIG. 29 which stores it as a DC signal $\omega_e$. This DC signal $\omega_e$ is fed through a slave multiplier 1264 of the type previously described wherein it is multiplied by the time of flight signal T to produce an output signal $\omega_e t_f$ which is the kinematic lead angle in elevation. This kinematic lead angle in elevation $\omega_e t_f$ is fed through the analog switch 1176b and SG switch 1178 to an input of operational amplifier 1257 and the kinematic lead angle in deflection $\omega_1 t_f$ is fed through SG switch 1178 to an input of the operational amplifier 1180 in the deflection channel.

The outputs of the operational amplifiers 1180 and 1257 are passed through the analog switches 1278a and 1278b of the previously described type which will conduct the signals only when the COMPUTE signal is received by them.

Operational amplifiers 1280 and 1282 receive the output signals from the analog gates 1278a and 1278b, respectively, along with a bore sight correction signal $D_b$ in deflection and a bore sight correction signal $E_b$ in elevation, respectively. These operational amplifiers 1278a and 1278b generate the deflection correction signal D and elevation correction signal E which are fed to servo amplifiers.

The wear weighting function generator in accordance with the principles of this invention is generally indicated at 1402 in FIG. 31. It is associated with gun 1404 which has a bore which wears out upon firing thereof. Presuming that the gun 1404 is capable of firing a plurality of different types of ammunition, and these different types cause different amounts of wear of each shot, it is necessary to provide signals relating to the type of ammunition, and relating to the number of firings.

Firing switch 1406 is mechanically connected to gun 1404 so that it momentarily closes upon each gun firing. Preferably, it is actuated by the recoil mechanism of the gun. Thus, a firing signal is transmitted to the effective full charge rate multiplier 1408 upon the firing of each round. Another signal delivered to the EFC multiplier is from ammunition selector 1410.

Assuming four different types of ammunition to be fired through gun 1404, exemplary values of wear rates and wear multipliers are given in the table below:

| Ammunition: | No. of counts desired | Switch pattern |
|---|---|---|
| A1 | 12 | 1,100 |
| A2 | 8 | 1,000 |
| A3 | 15 | 1,111 |
| A4 | 6 | 0,110 |

The number of rounds to wearout, for particular ammunition, is found experimentally. Any convenient means to determine wearout of the barrel can be used, including micrometer measurement of the gun bore, or by change in muzzle velocity, as compared to a new barrel. The least common multiple of the number of rounds to wearout is 3,000. The wear multiplier in the table is the least common multiple divided by the number of rounds of a particular ammunition to wearout. Thus, the wear multiplier is a relative value of wear in the gun barrel, which relate the amount of wear caused in the barrel by the different ammunitions.

With input signals from the firing switch 1406 and ammunition selector switch 1410, the effective full charge rate multiplier 1408 multiplies the round fired by its wear multiplier. This amount of effective full charge by that particular round is delivered to counter 1412 which totalizes the effective full charge units received from the EFC rate multiplier. Output of counter 1412 is delivered to digital to analog converter 1414 by signal line 1416 so that the output of wear weighting function generator 1402 appears in signal line 1418 as an analog value. It is suitably employed in a gun fire control computer to compensate aiming in accordance with the total wear of the barrel.

In view of the fact that guns to which such aiming equipment is applied are subject to power failure and are subject to being placed in storage with power shutdown for considerable periods, when counter 1412 is of solid state, it normally loses count upon power shutdown. Thus, memory 1420 is associated with counter 1412 in order to provide the correct count to the counter after such a power shutdown. Power condition detector 1422 is connected to the electric power source which serves to retain the count in the counter. Power condition detector 1422 is connected to read-write control 1424, which is in turn connected to memory 1420 for the purpose of providing in the memory a count of the total on counter 1412 when power is off, and for the purpose of writing into the counter the count when power is restored. Counter 1412 can either update memory 1420 with each count, or memory 1420 can be connected to interrogate counter 1412 upon incipient power failure and store the memory in the counter. Memory 1420 is preferably a ferrite core memory, although any convenient memory system can be employed.

Referring to FIG. 32, a schematic diagram in more detail of the effective full charge multiplier is shown therein, in connection with associated equipment. Clock 1426 either generates a square wave of appropriate frequency, or squares off an available frequency. In some equipment with which the wear weighting function generator is employed, 400 cycle alternating current is available. In such cases, clock 1426 need only square the available frequency. The output from firing switch 1406 and clock 1426 are inputs to AND gate 1428. The output of AND gate 1428 goes to OR gate 1430. The output of OR gate 1430 is connected to counter 1432.

In the example illustrated, counter 1432 is a 4-bit counter capable of counting to 16. The four outputs from the four bits of counter 1432 are connected to OR gate 1434. The output of OR gate 1434 is connected to AND gate 1436 which also receives the clock signal as an input thereto. The output of AND gate 1436 is the other input to OR gate 1430. Counter 1432 has at least one high state output whenever the count thereon is other than zero. Thus, as long as the count is other than zero, there is a signal to OR gate 1434, which provides energization to AND gate 1436 so that the clock pulse passes through OR gate 1430 to keep the counter 1432 counting. This continues until the full count of 16 is made by the counter, when all of the counter outputs are at zero so that there is no output from OR gate 1434 into AND gate 1436. Thereupon, the counter stops until the next firing switch energization. This system provides 16 pulses in line 1438 each time firing switch 1416 is actuated.

Line 1438 is connected to the input of binary scaler 1440 which has sections 1442, 1444, 1446, and 1448. Thus, each time counter 1432 goes through its 16 counts, it delivers 8 counts to AND gate 1452, 4 counts to AND gate 1454, 2 counts to AND gate 1456, and 1 count to AND gate 1458. The ammunition selector switch 1410 is connected to each one of AND gates 1452 through 1458 so that the number of counts desired can be selected by selecting particular ones of the AND gates.

The following table indicates the switch pattern of the ammunition selector switch to obtain the desired number of counts. The switch pattern indicates the high or low state of the lines from the ammunition selector switch to AND gates 1452 through 1458, reading from top to bottom in FIG. 32

|  | Rounds to wearout | Wear multiplier |
|---|---|---|
| Ammunition: |  |  |
| A1 | 250 | 12 |
| A2 | 375 | 8 |
| A3 | 200 | 15 |
| A4 | 500 | 6 |

The output of AND gates 1452 through 1458 are connected to OR gate 1460 so that the output is totalized and the signal into line 1416 is the effective full charge count for the round just fired, and as previously stated, this is delivered to counter 1412 through signal line 1462 to add to the count on counter 1412 the factor corresponding to wear for the firing of the latest round. As a round having a different wear factor is loaded, the ammunition selector switch 1410 is changed to a position corresponding to the new round, so that upon firing thereof the wear factor for that round is totalized in counter 1412.

Referring now to FIG. 33, gunner's control unit included in the control unit 58 of FIG. 2, shows the elements explained relative to FIG. 22. For controlling the ballistic computation the power on switch 849 energizes the system, a range switch 1500 and a wind switch 1502 allow either automatic or manual entries, and a cant off switch 1504 allows use of the cant parameter. The boresight switch 872 has both a normal and a boresight position. A switch 1506 provides for energizing the periscope and in some tank arrangements, a periscope wiper switch position is provided. Manual range is entered through the manual range potentiometer control 853 and manual wind is entered through the manual potentiometer 1508. The switch 857 provides selection of ammunition for four ammunitions, for example. The manual elevation and deflection boresight entries are provided through potentiometers 1510 and 1512 and the manual elevation and deflection jump entries are provided through potentiometers 1514 and 1516.

Figure 34:
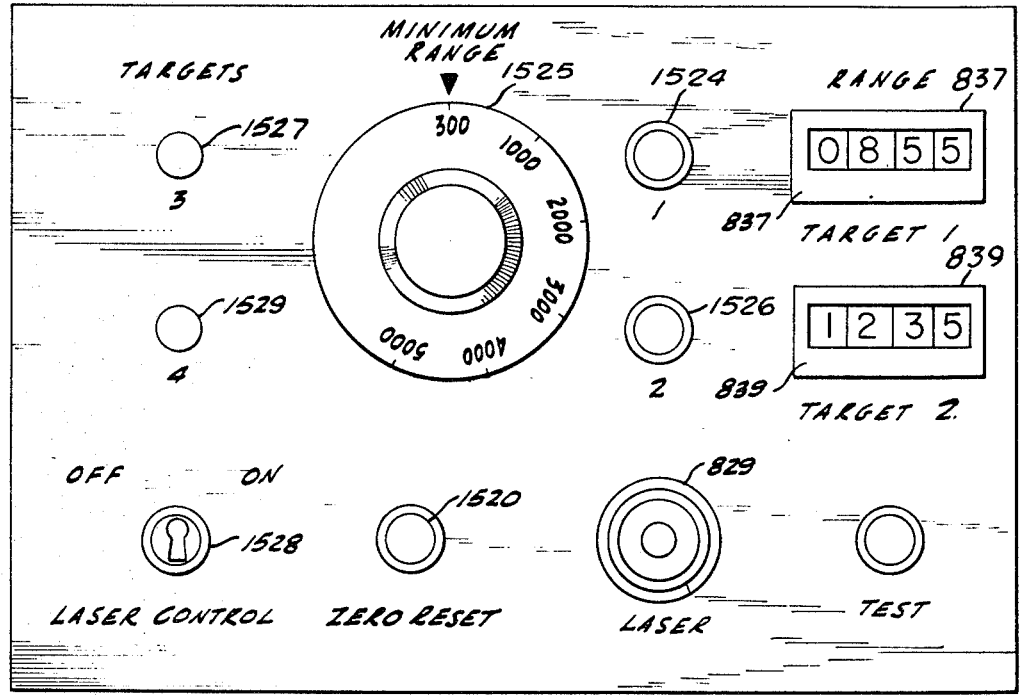
FIG. 34 is a schematic diagram of the laser control panel.

Referring now to the laser control panel of FIG. 34, buttons 1524 and 1526 control the selection of either of two targets. A switch 1528 energizes the laser system and the switch 829 is utilized to fire the laser. A zero reset button 1520 may be provided for manually resetting the counters. When range gating is utilized, a minimum range selection unit 1525 is included. Lights 1527 and 1529 indicate additional targets 3 and 4 which can be selected through proper setting of the minimum range unit 1525. A test button may be included on the panel for adding laser testing to the system. It is not necessary for the operator to reset the counter during operation. The coincident or slaved laser and sight allows rapid determination of range and rapid firing. The system includes a single gyro concept which measures azimuth rate with a gyro rate motor or any suitable rate sensor on the turret in tank coordinate and from this employ the elevation rate normal to the azimuth rate. The azimuth rate in tank coordinates is assumed to be substantially the same as if in earth coordinates.

Thus there has been described an improved fire control system useful for vehicle or tank fire control It is to be understood that the principles of the invention are applicable to fire control from any stationary or moving platform and at stationary or moving targets and are applicable to other types of directional control.

I claim:

1. A fire control system comprising:
sighting means having an optical path and movable line of sight means,
a laser range finder having a transmitting and receiving path substantially coincident with the path of said sighting means,
means for developing angular rate of movement signals of said line of sight means in the azimuth dimension, and
analog computing means responsive to the angular rate of movement signals and to said laser range finder for developing azimuth and elevation fire control signals.

2. The combination of claim 1 in which said means for developing angular rate signals also develops angular rate signals in the elevation dimension and said analog computing means also responds thereto.

3. A tank fire control system comprising:
a laser range finder,
a movable sight,
a computer responsive to said laser range finder for calculating azimuth and elevation angles under standard firing conditions,
sensing means for developing signals representative of nonstandard firing conditions, and
means responsive to said computer and said sensing means for developing lead angle fire control signals.

4. The combination of claim 3 further including means responsive to movement of said sight to develop angular rate signals and means for applying said angular rate signals to said means for developing lead angle fire control signals.

5. A gun fire control system comprising:
a sight having a movable axis,
a laser range finder having a transmission and reception axis parallel with the axis of said sight,
computing means for calculating gun lead angles as a function of standard conditions and as a function of nonstandard conditions,
sensing means coupled to said computing means, said means sensing nonstandard conditions and applying signal representative thereof to said computing means, and
coupling means coupled between said computing means and sight for indicating said lead angles.

6. The combination of claim 5 in which said coupling means is coupled between said computing means and said gun instead of said sight for controlling the gun pointing direction.

7. A gun fire control system comprising:
sighting means having a movable axis,
a range finder having a transmission and reception axis substantially coincident with the axis of said sight,
computing means for developing gun elevation and azimuth lead angle signals as a function of standard conditions and as a function of nonstandard conditions,
sensing means coupled to said computing means for sensing nonstandard conditions and applying signals representative thereof to said computing means,
means coupled between said computing means and said sighting means so that said sighting means indicates said lead angles, and
means coupled between said computing means and said gun for applying said lead angle signals thereto.

8. A vehicle gun fire control system comprising:
gyro means responsive to said gun for sensing azimuth rate of motion,
sensing means for sensing nonstandard conditions,
sighting means,
computing means responsive to said sensing means for developing elevation and azimuth signals,
means responsive to said elevation and azimuth signals and to said gyro means for developing elevation and azimuth lead angle signals, and
means for applying said lead angle signals to said sighting means.

9. The combination of claim 8 in which said means for applying said lead angle signals applies said lead angle signals to said gun instead of said sight.

10. A system for controlling gun fire from a vehicle comprising:
ranging means,
computer means responsive to said ranging means for determining lead angles in reference coordinates for standard conditions,
coordinate conversion means including means for sensing the vehicle movement in the cant dimension and responsive to said computer means for developing elevation and azimuth lead angle signals in vehicle coordinates.

11. The combination of claim 10 further including means for sensing variations from nonstandard conditions, and combining means coupled to said conversion means and to said means for sensing for developing said lead angle signals under said nonstandard conditions.

12. A vehicle gun fire control system for controlling fire to a target comprising:
computer means for determining elevation and azimuth lead angles in earth coordinates,
coordinate conversion means coupled to said computer means for sensing a single axis of vehicle movement and for developing elevation and azimuth lead angle signals in vehicle coordinates,
parameter determining means for developing gun parameters in vehicle coordinates, and
combining means coupled to said parameter determining means and to said conversion means for modifying said elevation and azimuth lead angle signals.

13. A system for controlling fire from a vehicle to a target comprising:
range finding means,
computing means for responding to said range finding means for determining lead angles in reference coordinates, and
coordinate conversion means including means for sensing the angular rate of target movement in a single axis and developing lead angle signals in vehicle coordinates 14. The combination of claim 13 further including means for sensing variations from nonstandard firing conditions, and combining means coupled between said conversion means and said computing means for determining said lead angles under said nonstandard firing conditions.

15. A system for controlling gun fire from a vehicle to a target comprising:
range finding means,
computer means responsive to said range finding means for determining lead angles in reference coordinates under standard conditions, and
coordinate conversion means including means for sensing angular rate of target movement in first and second gun axis in vehicle coordinates and responsive to said computer means for developing elevation and azimuth lead angle signals in vehicle coordinates.

16. The combination of claim 15 further including means for sensing variation from nonstandard conditions and combining means coupled between said computer means and said conversion means for developing said lead angle signals under said nonstandard conditions.

17. A system for controlling gun fire from a vehicle to a target comprising:
target range determining means,
computer means coupled to said range determining means for determining elevation signals in reference coordinates,
means for sensing elevation and azimuth angular rate of movement in vehicle coordinates,
means for sampling said elevation and azimuth angle rates,
conversion means responsive to said computer means for determining elevation and azimuth lead angles in vehicle coordinates, and
means responsive to said conversion means and to said means for sensing for developing lead angle signals in vehicle coordinates.

18. A tank fire control system for controlling gun fire to a target comprising:
sighting means having an axis movable to follow the target,
first and second means for providing elevation and azimuth angular rate of gun axis movement signals,
controllable means for sampling and storing the elevation and azimuth angular rate, and
means responsive to the sampled angular rates for developing elevation and azimuth gun pointing control signals.

19. The tank fire control system of claim 18 wherein first and second sensing means are mounted on said sighting means to provide signals corresponding to the motion of the sighting means axis as it follows the target, said first and second sensing means providing elevational and azimuthal angular rate of the axis of said sighting means signals, said signals provided by said first and second sensing means being connected to drive said sighting means.

20. The vehicle control system of claim 19 wherein said sighting means has elevational and azimuthal drive means thereon, said first and second means providing output signals, the output signals of said first and second means being connected to said sighting means elevational and azimuthal drive means to drive said sighting means.

21. A vehicle fire control system comprising:
sighting means, first and second means for determining elevation angular rate and azimuth angular rate of movement of said sighting means, means for sampling said elevation and azimuth angular rate, computing means for determining elevation and azimuth error signals in reference coordinates, and conversion means responsive to the computing means and to said means for sampling for developing elevation and azimuth error signals in vehicle referenced coordinates.

22. A tank fire control system for controlling a gun to hit moving targets comprising:

sighting means, means for sensing the angular rate of movement of said gun in only the azimuth dimension, computer means, and combining means coupled to said computer means and to said means for sensing to develop elevation and azimuth lead angle signals.

23. A vehicle fire control system operable with moving targets comprising:

computing means for developing elevation and azimuth lead angle signals, sighting means movable to sight the target, means for determining the angular rate of movement of said sighting means, means for sensing firing conditions, combining means responsive to said means for sensing and to said computing means for developing elevation and azimuth lead angle signals, in earth coordinates, and conversion means coupled to said combining means and to said means for determining to develop elevation and azimuth lead angle signals in vehicle referenced coordinates.

24. A vehicle gun control for controlling gun fire to a target comprising:

movable sighting means, target range determining means, computer means responsive to said range determining means for calculating elevation angle and time of flight under preselected standard conditions, angular rate sensing means responsive to movement of said sighting means, nonstandard condition sensing means, combining means coupled to said computer and to said nonstandard condition sensing means for developing elevation and azimuth lead angle signals in reference coordinates, coordinate conversion means coupled to said combining means and to said angular rate sensing means for developing elevation and azimuth lead angle signals in vehicle referenced coordinates, and means for applying said lead angle signals in vehicle referenced coordinates to said movable sighting means.

25. The combination of claim 24 further including operator controlled means coupled to said movable sighting means and control means coupled between said operator control means and said gun.

26. A vehicle gun control for controlling gun fire to a target comprising:

movable sighting means, target range determining means, computer means responsive to said range determining means for calculating elevation angle and time of flight under preselected standard conditions, angular rate sensing means responsive to movement of said sighting means, nonstandard condition sensing means, combining means coupled to said computer and to said nonstandard condition sensing means for developing elevation and azimuth lead angle signal in reference coordinates, coordinate conversion means coupled to said combining means and to said angular rate sensing means for developing elevation and azimuth lead angle signals in vehicle referenced coordinates, means for applying said lead angle signals in vehicle reference coordinates to said gun, operator-controlled means coupled to said movable sighting means, and position responsive means coupled between said movable sighting means and said gun.

27. The combination of claim 26 also including means coupling the computer to said gun for further controlling the gun pointing direction.

28. A vehicle fire control system for controlling gun fire to a target, said fire control system comprising:

sighting means having an axis movable to follow the target;

drive means connected to said sighting means to drive said sighting means in elevational and azimuthal directions;

first and second sensing means connected to said sighting means, said first and second sensing means providing elevational and azimuthal signals corresponding to elevational and azimuthal movement of the axis of said sighting means as it follows the target, said elevational and azimuthal signals being connected to said drive means to drive said sighting means respectively in elevational and azimuthal directions.

29. The vehicle fire control system of claim 28 wherein said first and second sensing means respectively provide elevational and azimuthal angular rate of sighting means axis movement signals.

30. A gun fire control system comprising:

a sight having a movable axis, a laser range finder having a transmission and reception axis substantially coincident with the axis of said sight, ammunition selection means, sensing means coupled to said ammunition selection means for sensing nonstandard conditions, computer means coupled to said ammunition selection means and to sensing means for calculating gun elevation angles as a function of nonstandard conditions, and first means coupled to said computer means and to said sensing means for developing gun pointing control signals.

31. A vehicle fire control system for controlling gun fire to a target comprising:

sighting means having an axis and including a hand control for moving said axis, range determining means, angular rate sensing means responsive to the movement of the axis of said sighting means, computer means coupled to said range determining means and to said sighting means for developing azimuth and elevation lead angle signals, first means for controlling the gun pointing direction, fluid control means coupled between said computer means and said first means for controlling the gun pointing in elevation, second means coupled between said sighting means and said first means for controlling said gun in azimuth, and third means coupled between said sighting means and said first means for further controlling said gun in elevation.

32. A fire control system for controlling fire to a target from a vehicle comprising:

computer means for determining elevation, azimuth and time of flight, sighting means, means responsive to said sighting means for determining angular rate of movement in azimuth, means for multiplying said time of flight and said angular rate to develop an azimuth signal, and resolving means responsive to said computer means and said azimuth signal for developing azimuth and elevation signals in predetermined reference planes.

33. A vehicle gun fire control system, said gun having a tube subject to changing conditions as a function of firing ammunition comprising:

range determining means, first means responsive to said gun firing to develop a signal representative of the gun tube wear, computing means coupled to said range determining means and coupled to said first means for developing elevation and azimuth signals including the ballistic effect of said tube wear; and means coupled to said computing means for developing elevation and azimuth control signals representative of the desired gun pointing direction.

34. A gun fire control system comprising:

sighting means having an optical axis;

range determining means having a transmitting and receiving path substantially parallel with said optical axis;

computer means coupled to said range determining means for developing elevation signals under predetermined firing conditions;

sensing means for determining variations of said firing conditions;

first means for determining angular rate of motion of said sighting means; and second means responsive to said sensing means and to said first means for developing signals representative of a desired gun pointing direction.

35. A tank gun fire control system for controlling fire to a target comprising:

sighting means having hand control means;

angular rate sensing means responsive to movement of said sighting means, range determining means, computing means coupled to said sighting means and to said range determining means for developing azimuth and elevation lead angle signals, and means coupled from said computing means and said sighting means to said gun for controlling the pointing direction of said gun.

36. A tank gun fire control system for controlling fire to a target comprising:

laser range determining means, sighting means having hand control means, said sighting means having an axis, angular rate sensing means responsive to movement of the axis of said sighting means, computing means coupled to said sighting means and to said range determining means for developing azimuth and elevation lead angle signals, means coupling said computing means to said sighting means for controlling the axis thereof, and means coupling the sighting means and said gun to control the gun direction.

Disclaimer 3,575,085.—*William E. McAdam, Jr.*, Thousand Oaks, Calif. ADVANCED FIRE CONTROL SYSTEM. Patent dated Apr. 13, 1971. Disclaimer filed Feb. 10, 1972, by the assignee, *Hughes Aircraft Company*.

Hereby enters this disclaimer to claims 3, 4, 5, 8, 10, 11, 12, 13, 14, 15, 16, 22, 23, 24, 25 and 33 of said patent.

[*Official Gazette June 13, 1972.*]